(12) United States Patent
Lock

(10) Patent No.: US 10,132,360 B2
(45) Date of Patent: Nov. 20, 2018

(54) UNIVERSAL JOINTS AND METHODS OF MANUFACTURE

(71) Applicant: Angle X, Inc., Huntington Beach, CA (US)

(72) Inventor: Kenneth Anthony Lock, Westminster, CA (US)

(73) Assignee: Angle X, Inc., Huntington Beach, CA (US)

( * ) Notice: Subject to any disclaimer, the term of this patent is extended or adjusted under 35 U.S.C. 154(b) by 0 days.

(21) Appl. No.: 15/939,069

(22) Filed: Mar. 28, 2018

(65) Prior Publication Data

US 2018/0283460 A1 Oct. 4, 2018

Related U.S. Application Data

(60) Provisional application No. 62/588,226, filed on Nov. 17, 2017, provisional application No. 62/478,489, filed on Mar. 29, 2017.

(51) Int. Cl.
| | |
|---|---|
| *F16D 3/16* | (2006.01) |
| *F16D 3/221* | (2006.01) |
| *F16D 3/84* | (2006.01) |
| *F16D 3/26* | (2006.01) |
| *F16D 3/226* | (2006.01) |
| *F16D 3/223* | (2011.01) |

(52) U.S. Cl.
CPC ............. *F16D 3/221* (2013.01); *F16D 3/265* (2013.01); *F16D 3/845* (2013.01); *F16D 3/2265* (2013.01); *F16D 2003/22303* (2013.01); *F16D 2200/0021* (2013.01); *F16D 2250/0007* (2013.01); *F16D 2250/0053* (2013.01)

(58) Field of Classification Search
CPC .......... F16D 3/221; F16D 3/845; F16D 3/265; F16D 2003/22303; F16D 2250/0007; F16D 2200/0021; F16D 3/2265; F16D 2250/0053
USPC ................. 464/110, 116, 119, 121, 151, 153
See application file for complete search history.

(56) References Cited

U.S. PATENT DOCUMENTS

| | | | |
|---|---|---|---|
| 243,914 | A | 7/1881 | Johnston |
| 899,913 | A | 9/1908 | Shaw |
| 919,651 | A | 4/1909 | Spicer |
| 956,912 | A | 5/1910 | Walters |
| 1,222,268 | A * | 4/1917 | Douglas .................. F16D 3/265 |
| 1,457,219 | A | 5/1923 | Dusseau |

(Continued)

FOREIGN PATENT DOCUMENTS

| | | |
|---|---|---|
| CN | 202851630 U | 4/2013 |
| CN | 103788817 A | 5/2014 |

(Continued)

OTHER PUBLICATIONS

McMaster-Carr, Packing List for Purchase Order 0921KLOCK, dated Sep. 21, 2017, in 2 pages.

(Continued)

*Primary Examiner* — Greg Binda
(74) *Attorney, Agent, or Firm* — Knobbe Martens Olson & Bear LLP

(57) ABSTRACT

An universal joint configured to transfer rotational movement from a first shaft to a second shaft at an angle and method of manufacturing the same.

21 Claims, 41 Drawing Sheets

(56) References Cited

U.S. PATENT DOCUMENTS

| | | | |
|---|---|---|---|
| 2,104,101 A * | 1/1938 | Rosenbaum | F16D 3/38 |
| | | | 464/110 |
| 2,921,451 A | 1/1960 | Helmke | |
| 3,059,948 A | 10/1962 | Thompson et al. | |
| 3,107,505 A | 10/1963 | Koss | |
| 3,609,994 A | 10/1971 | Colletti et al. | |
| 4,003,218 A | 1/1977 | Filderman | |
| 4,114,401 A | 9/1978 | Van Hoose | |
| 4,352,276 A | 10/1982 | Smith | |
| 4,460,058 A | 7/1984 | Welschof et al. | |
| 4,509,932 A | 4/1985 | Weible | |
| 4,560,368 A * | 12/1985 | Sherman, II | F16D 3/26 |
| 5,221,233 A | 6/1993 | Jacob | |
| 5,288,271 A * | 2/1994 | Nelson | E21B 4/02 |
| 5,292,285 A | 3/1994 | Ingalsbe et al. | |
| 5,409,332 A | 4/1995 | Chabot, Jr. et al. | |
| 5,586,939 A | 12/1996 | Swinney | |
| 5,613,914 A | 3/1997 | Gleasman et al. | |
| 5,618,234 A | 4/1997 | Carden | |
| 5,647,801 A | 7/1997 | Jacob | |
| 5,816,926 A | 10/1998 | Lynch et al. | |
| 6,139,437 A | 10/2000 | Thompson | |
| 6,913,540 B2 | 7/2005 | Iihara et al. | |
| 7,165,890 B2 | 1/2007 | Smith | |
| 7,604,412 B2 | 10/2009 | Smith | |
| 7,632,188 B2 | 12/2009 | Gleasman et al. | |
| 7,993,207 B2 | 8/2011 | Arden et al. | |
| 8,001,873 B2 | 8/2011 | Peng | |
| 8,246,476 B2 | 8/2012 | Chen | |
| 2005/0124422 A1 | 6/2005 | Mondragon-Parra et al. | |
| 2006/0128478 A1 | 6/2006 | Carden | |
| 2008/0102966 A1 | 5/2008 | Gleasman | |
| 2010/0004064 A1 | 1/2010 | Hu | |
| 2010/0069164 A1 | 3/2010 | Kobayashi et al. | |
| 2011/0229254 A1 | 9/2011 | Su | |
| 2011/0229255 A1 | 9/2011 | Su | |
| 2015/0094157 A1 | 4/2015 | Lock | |

FOREIGN PATENT DOCUMENTS

| | | | |
|---|---|---|---|
| CN | 103788818 A | 5/2014 | |
| CN | 103820002 B | 4/2016 | |
| CN | 106222582 A | 12/2016 | |
| DE | 4030737 C2 | 4/1992 | |
| DE | 19611273 C1 | 9/1997 | |
| DE | 10139969 A1 | 2/2003 | |
| FR | 2378977 A1 | 8/1978 | |
| GB | 2 136 090 A * | 9/1984 | 464/110 |
| JP | 07012624 U | 3/1995 | |

OTHER PUBLICATIONS

Schmelz et al., "Universal Joints and Driveshafts—Analysis, Design, Applications," 2006, $2^{nd}$ Edition, Chapter 2, pp. 53-79, Springer-Verlag Berlin Heidelberb.

International Search Report and Written Opinion in Application No. PCT/US18/24365 dated Jun. 6, 2018.

* cited by examiner

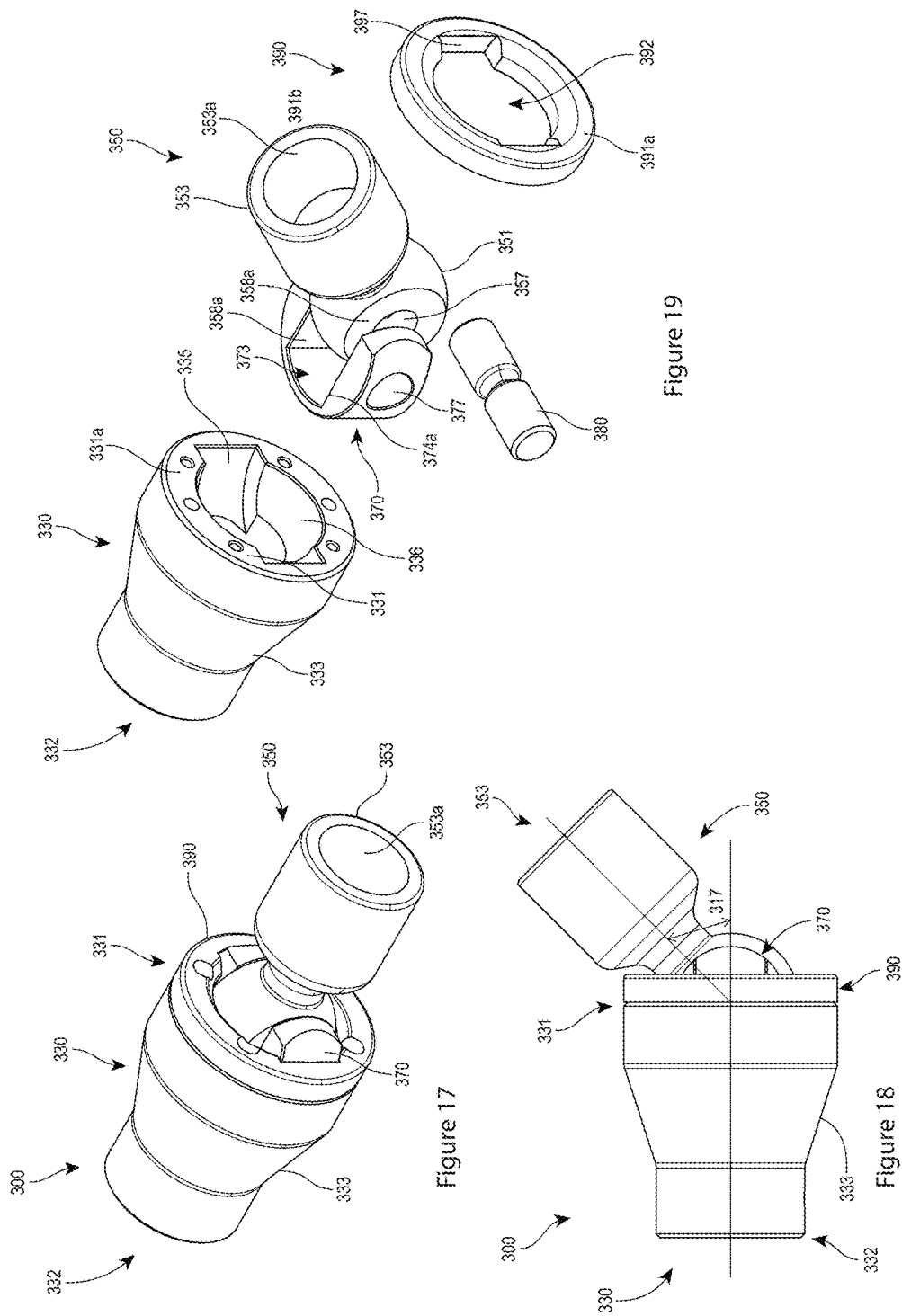

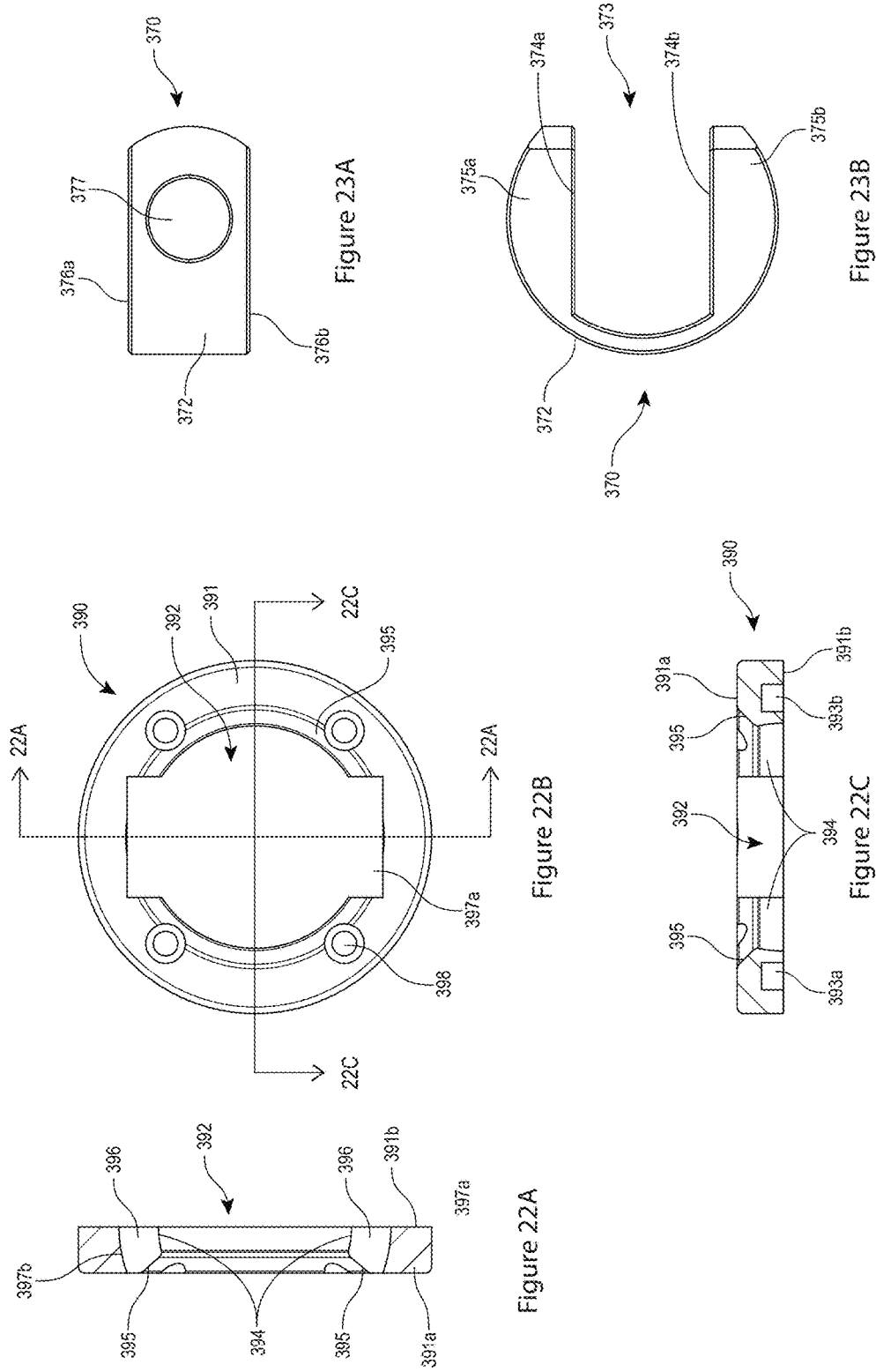

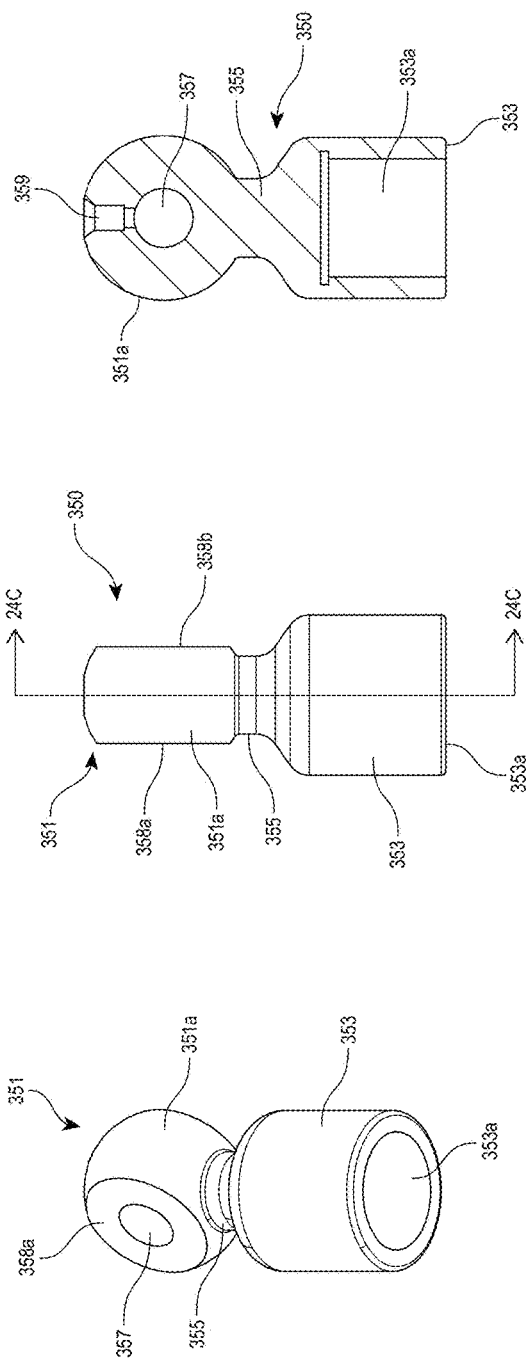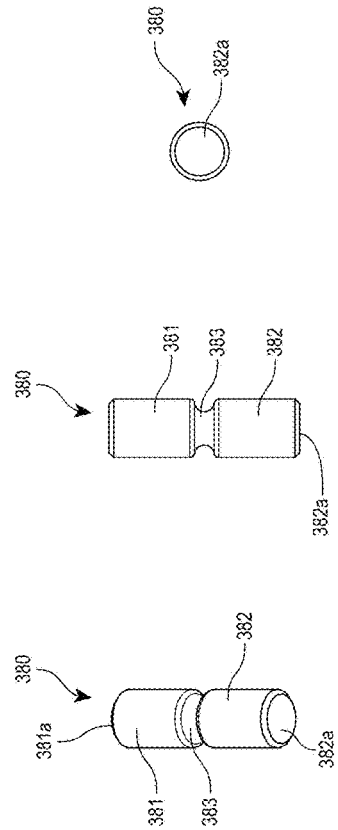

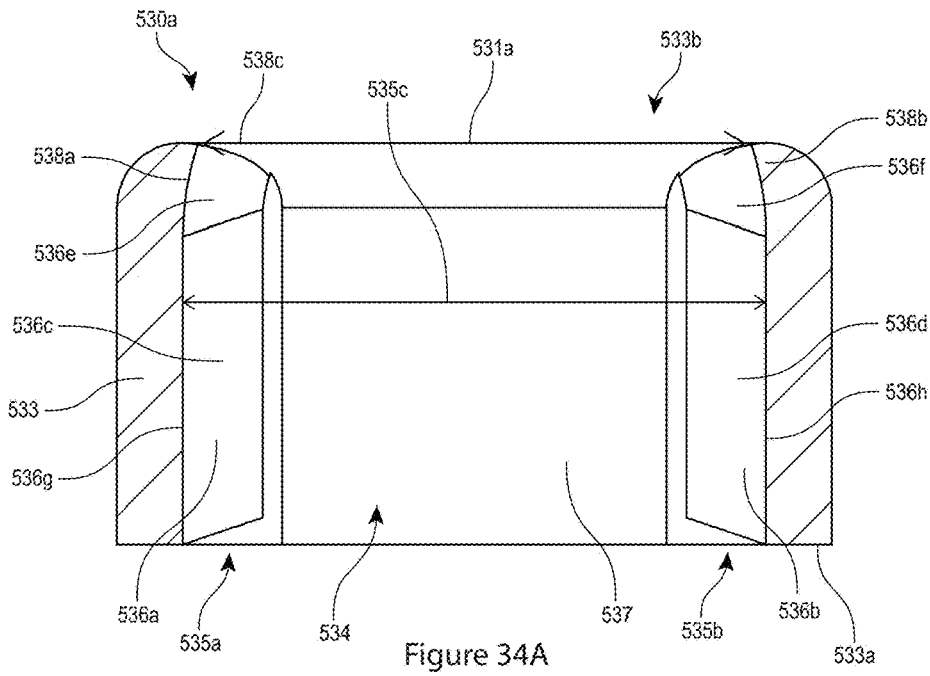
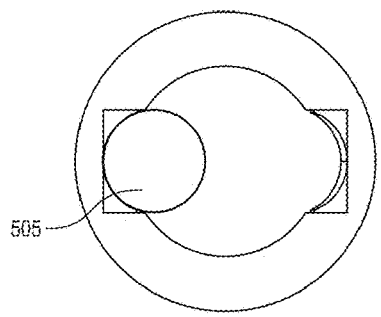
Figure 34B
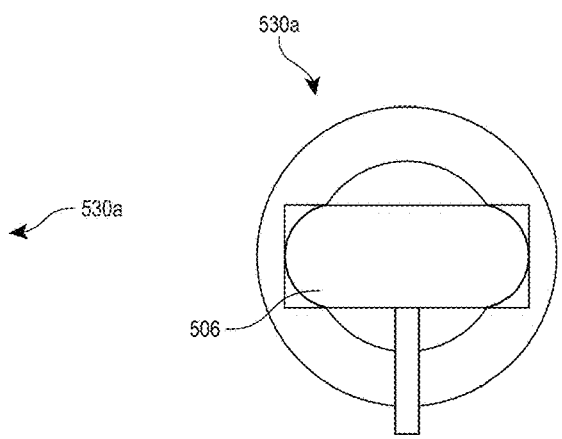
Figure 34D
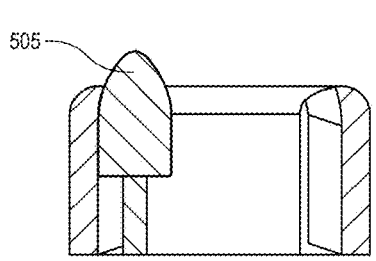
Figure 34C
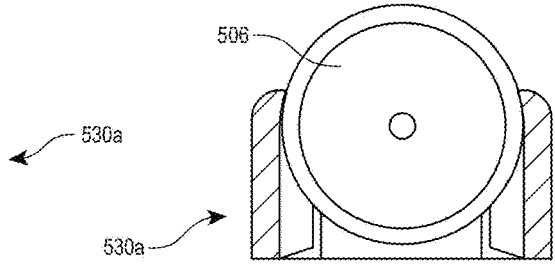
Figure 34E

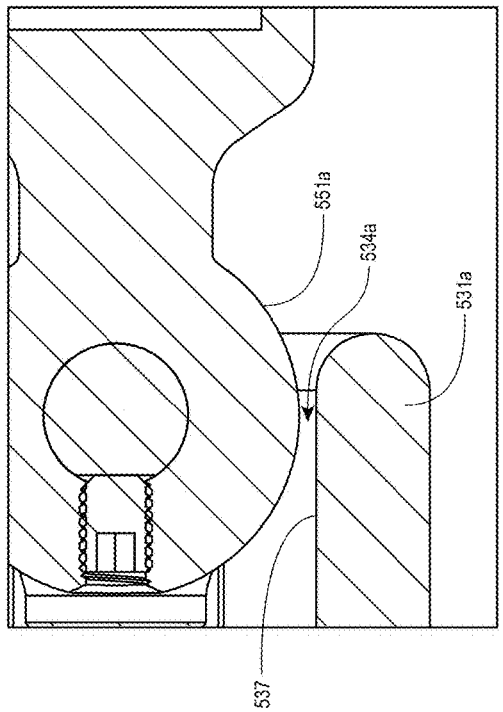
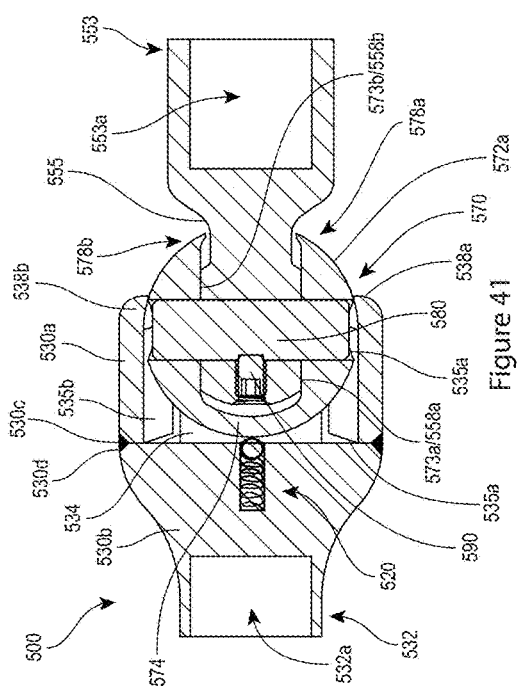
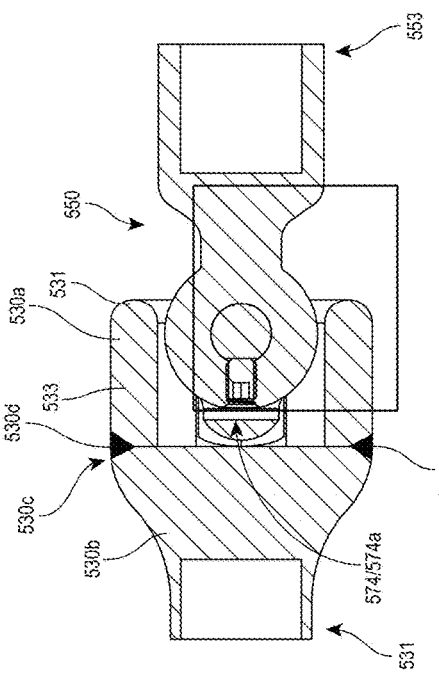
Figure 43
Figure 41
Figure 42

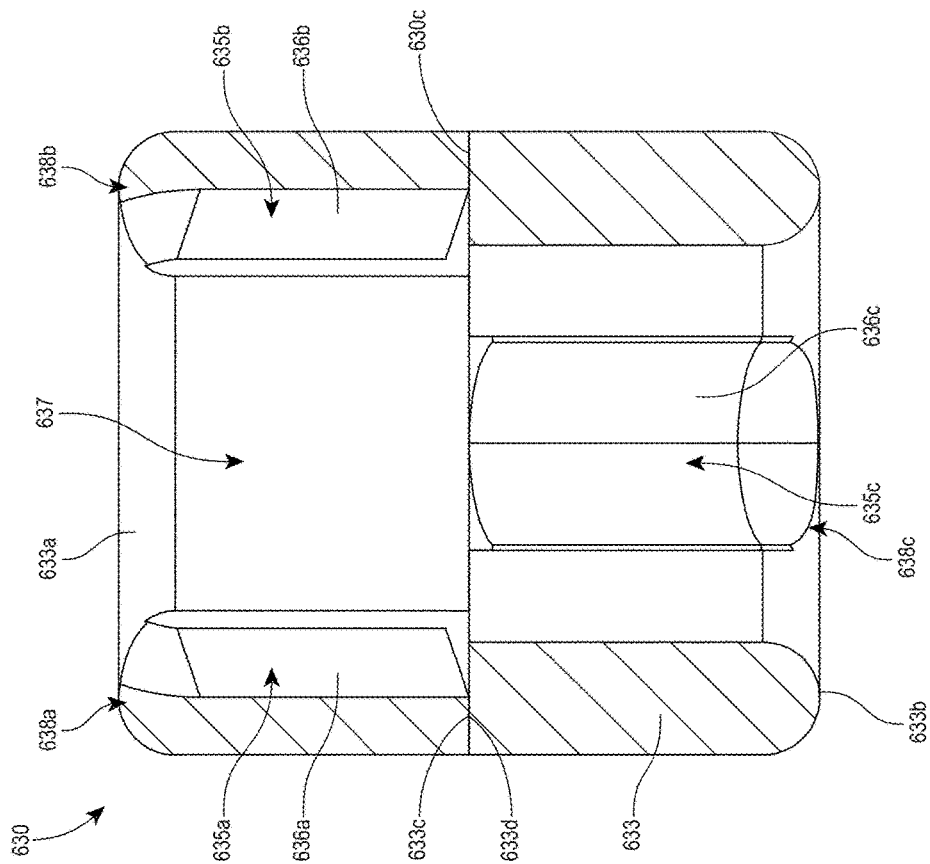
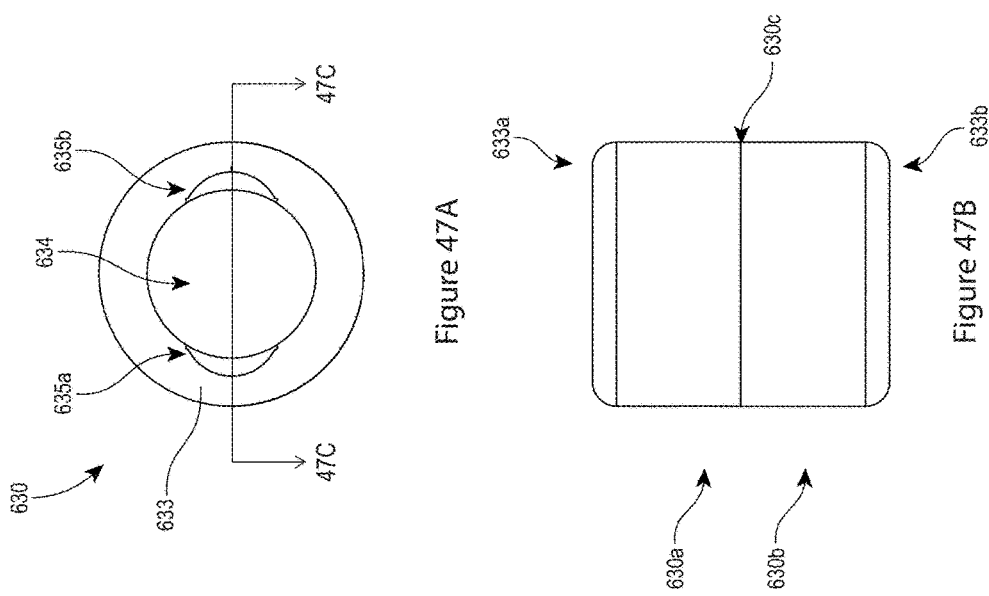

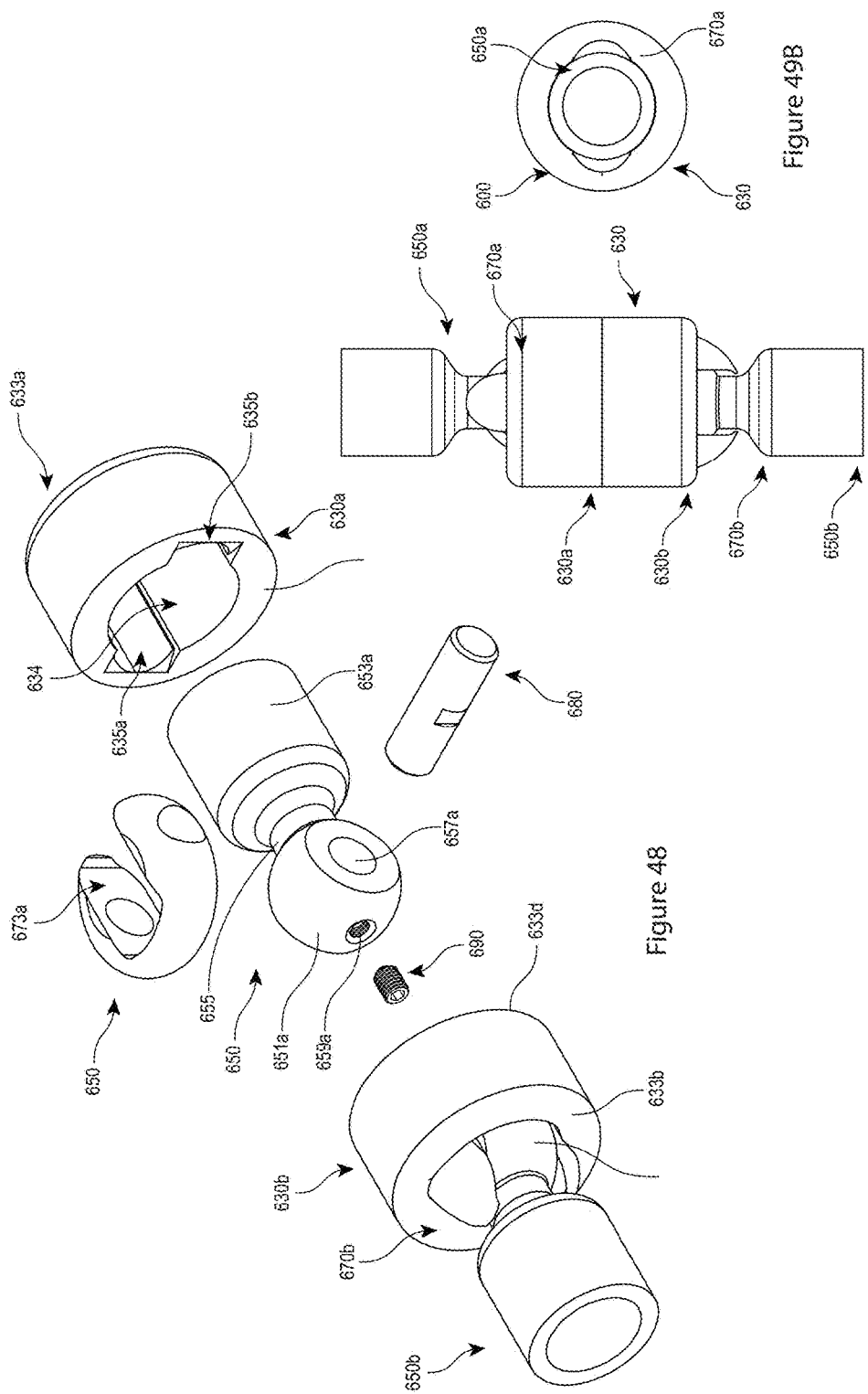

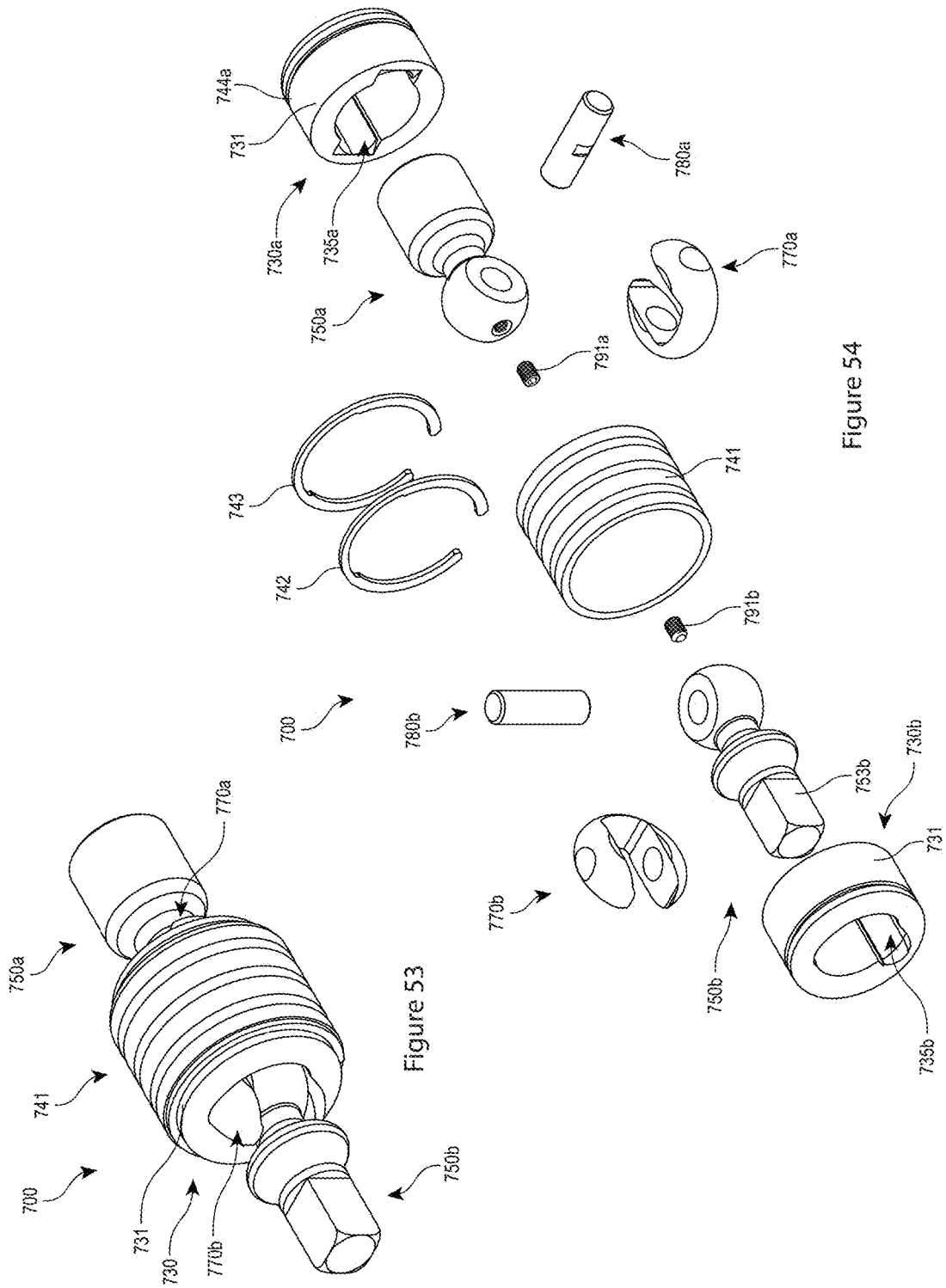

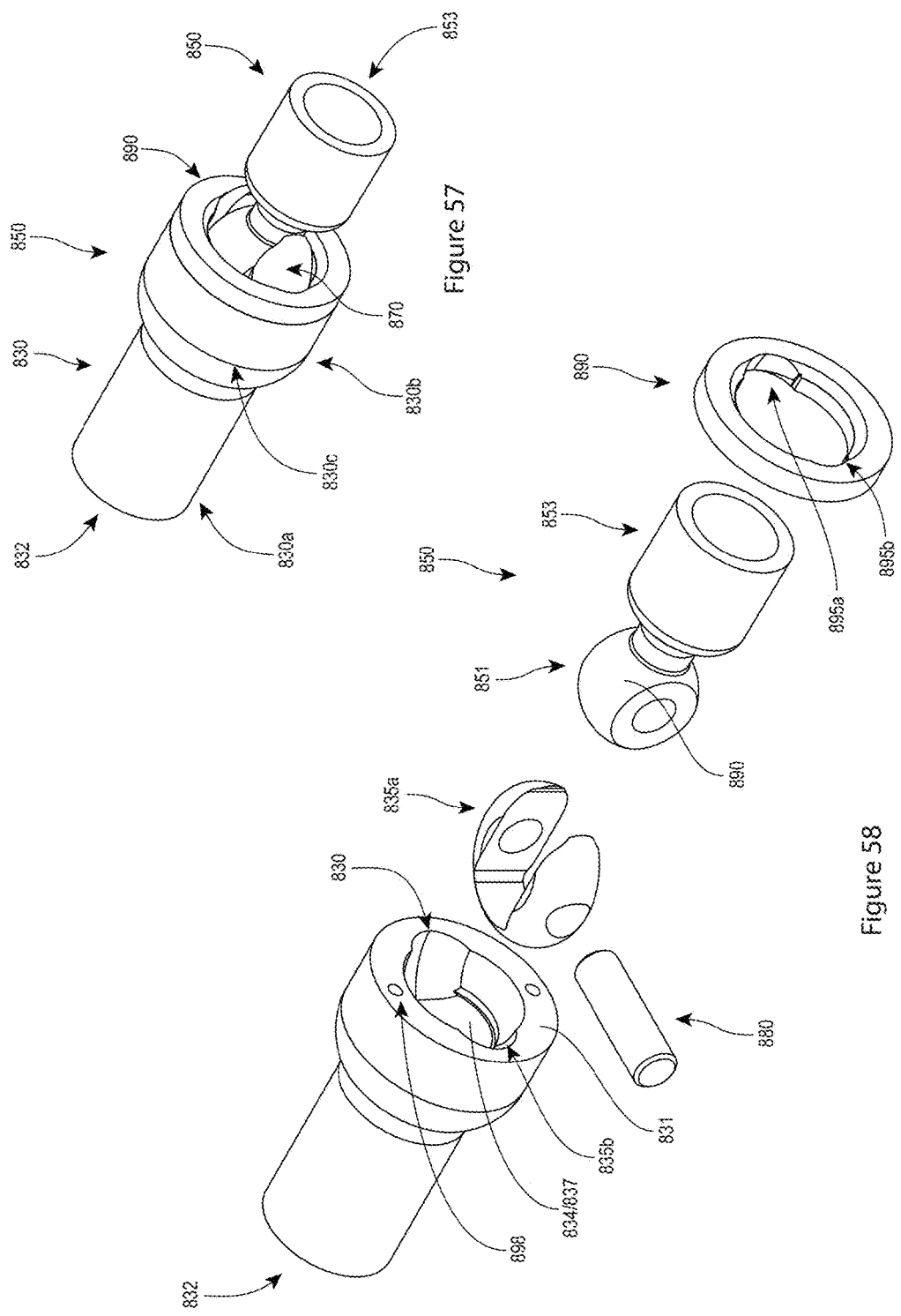

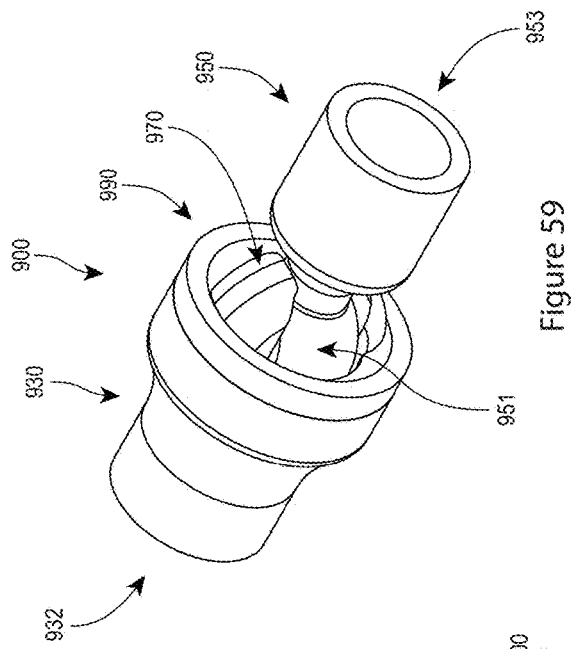
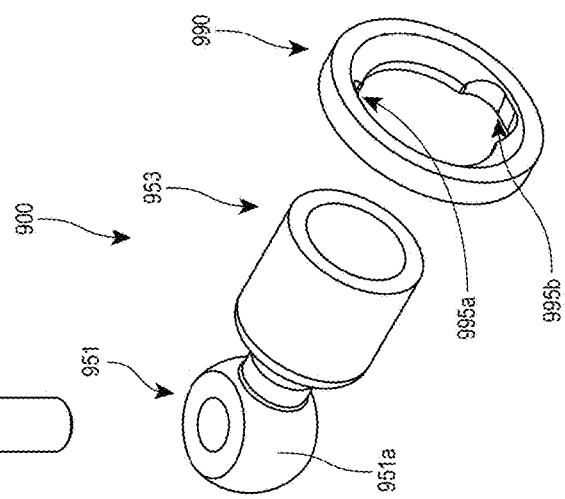
Figure 59
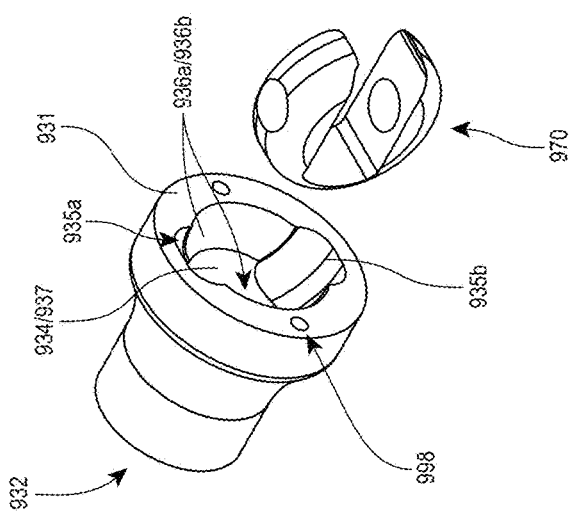
Figure 60

UNIVERSAL JOINTS AND METHODS OF MANUFACTURE

CROSS-REFERENCE TO RELATED APPLICATIONS

This application claims benefit of U.S. Provisional Patent Application No. 62/478,489, filed Mar. 29, 2017, and titled "UNIVERSAL JOINT AND METHOD OF MANUFACTURE," and further claims benefit of U.S. Provisional Patent Application No. 62/588,226, filed Nov. 17, 2017, and titled "X-JOINTS AND METHODS OF MANUFACTURE". The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 C.F.R. 1.57 for all purposes and for all that they contain.

BACKGROUND

Field

The present disclosure relates to x-joints and improved methods of manufacturing x-joints.

Description of the Related Art

Universal joints are often used for rotationally linking shafts that are oriented at a skewed angle relative to one another. One limitation of existing universal joints is failure under dynamic loading conditions. Dynamic loading of universal joints occurs both from changes in torque in the first shaft that are transmitted across the universal joint to the second shaft and from changes in forces applied to individual components of the universal joint as the joint rotates to maintain the skewed angle. Dynamic loading limits the use of structurally simple universal joints to certain industrial tasks that could benefit from a universal joint having a minimal moment of inertia. These include uses in drive trains, aircraft controls, automotive controls, manufacturing, machine tools, and other areas. Thus, it has become necessary to improve the dynamic loading capacity of existing universal joints through improved manufacturing techniques and improved structures.

Universal joint designs can utilize sliding components to accommodate large axial loads (both tension and compression) from the shafts. Generally, a lubricant is used to reduce friction between the sliding components of a universal joint and thereby reduce wear, minimize friction and frictional losses, and extend service life of the various components of the joint and the joint overall. However, in some universal joints having an open configuration and/or close tolerances, maintaining adequate amounts of lubricant within the universal joint and between the sliding components of the universal joint can be difficult and/or require frequent re-application of the lubricant. This difficulty can also exist where operating conditions for the universal joint include high loading conditions, high rotations per minute (RPMs), unreliable or intermittent maintenance of the joint, dirty or debris-filled operating conditions, extremely dry or wet operating conditions, or extremely high or low temperature operating conditions.

SUMMARY OF THE TECHNOLOGY

A mechanical joint can include an increased dynamic loading capacity. Such an improvement can be obtained through the application of any of the methods of manufacture, or any combination of the methods of manufacture, described herein including: heat treatments, application of vapor deposition coatings to specific surfaces of the joint, differential hardening of specific sliding components of the joint, and cryogenic hardening of specific sliding components of the joint.

A mechanical joint can include sliding components that can be designed to wear faster and more easily that certain sliding components. For example, certain sliding components can be manufactured more cheaply and easily than other sliding components of the joints. Thus, one method of manufacture of a joint includes controlling wear on the sliding components of the joint through differential hardening of the sliding components. For example, in some embodiments of a joint, a first housing is made of a first steel. The first housing has a first notch with a first inner cylindrical surface. A second housing is made of a second steel. The second housing has a second notch with a second inner cylindrical surface. A follower or drive puck is made of a third steel. The follower has an outer cylindrical surface configured to mate with and slidingly engage the first inner cylindrical surface and the second inner cylindrical surface. The joint is assembled by inserting the outer cylindrical surface of the follower within the first notch of the first housing, inserting the outer cylindrical surface of the follower within the second notch of the second housing, and securing together the first and second housing with the follower therebetween. A hardness of the first or second inner cylindrical surfaces of the first housing are at least 2, 3, or 5 HRC above a hardness of the outer cylindrical surface of the follower. Thus, the more easily and/or more cheaply manufactured sliding components can be designed to wear more quickly than other sliding components of the joint.

In another aspect, the first housing has a first inner spherical surface and the second housing has a second inner spherical surface. A pivot member of a fourth steel has an outer spherical surface that mates with and slidingly engages the first inner spherical surface and the second inner spherical surface. A hardness of the outer spherical surface is at least 2, 3, or 5 HRC above a hardness of the first inner spherical surface.

In another aspect, the first, second, third and/or fourth steels are made from SAE 4000 series steels or austenitic stainless steels.

In another aspect, a first vapor deposition coats the outer cylindrical surface of the follower and/or a second vapor deposition coats the first inner cylindrical surface of the first housing.

In another aspect, a first vapor deposition coats the outer spherical surface of the pivot member and/or a second vapor deposition coats the first inner spherical surface of the first housing.

Another method of manufacturing mechanical joint with a first housing, a second housing, a follower is heat the first housing above a first critical temperature of a first steel, the first housing including the first steel. Maintain the first housing at or above the first critical temperature for a first austenizing time. The first austenizing time is sufficient to convert a microstructure of the first steel to at least 95% austenite. Quench the first housing below a martensitic start temperature of the first steel at a first quench rate. The first quench rate is sufficient to convert at least 83% of the microstructure of the first steel to martensite. Temper the first housing at a first temper temperature below the first critical temperature of the first steel for a first temper time such that a hardness of a first inner cylindrical surface of the first housing is at least 2, 3, or 5 HRC above a hardness of an outer cylindrical surface of the follower. The outer cylindrical surface is configured to mate with and slidingly engage the first inner cylindrical surface.

In another aspect, heat the second housing above a second critical temperature of a second steel, the second housing comprising the second steel. Maintain the second housing at or above the second critical temperature for a second austenizing time. The second austenizing time is sufficient to convert a microstructure of the second steel to at least 95% austenite. Quench the second housing below a martensitic start temperature of the second steel at a second quench rate. The second quench rate is sufficient to convert at least 83% of the microstructure of the second steel to martensite. Temper the second housing at a second temper temperature below the second critical temperature of the second steel for a second temper time such that a hardness of a second inner cylindrical surface of the second housing is at least 2, 3 or 5 HRC above the hardness of the outer cylindrical surface of the follower.

In another aspect of the method, heat the follower above a third critical temperature of a third steel, the follower comprising the third steel. Maintain the follower at or above the third critical temperature for a third austenizing time. The third austenizing time is sufficient to convert a microstructure of the third steel to at least 95% austenite. Quench the follower below a martensitic start temperature of the third steel at a third quench rate. The third quench rate is sufficient to convert at least 83% of the microstructure of the third steel to martensite. Temper the follower at a third temper temperature below the third critical temperature of the third steel for a third temper time such that the hardness of the outer cylindrical surface of the follower is at least 2, 3 or 5 HRC below the hardness of the first inner cylindrical surface of the first housing.

In another aspect of the method, the mechanical joint includes a pivot member, heat the pivot member above a fourth critical temperature of a fourth steel, the pivot member comprising the fourth steel. Maintain the pivot member at or above the fourth critical temperature for a fourth austenizing time. The fourth austenizing time is sufficient to convert a microstructure of the fourth steel to at least 95% austenite. Quench the pivot member below a martensitic start temperature of the fourth steel at a fourth quench rate. The fourth quench rate is sufficient to convert at least 83% of the microstructure of the fourth steel to martensite. Temper the pivot member at a fourth temper temperature below the fourth critical temperature of the fourth steel for a fourth temper time such that a hardness of an outer spherical surface of the pivot member is at least 2, 3 or 5 HRC above a hardness of a first inner spherical surface of the first housing. The outer spherical surface is configured to mate with and slidingly engage the first inner spherical surface.

In another aspect of the method, any of the steels is a SAE 4000 series steel.

In another aspect of the method, cryogenically harden the first housing, second housing, follower or pivot member below −115° C. for at least 24 hours or below −184° C. for at least 12 hours.

In another aspect of the method, apply a first vapor deposition coating onto at least one of the outer cylindrical surface of the follower, the first inner cylindrical surface of the first housing, the first inner spherical surface of the first housing, or the outer spherical surface of the pivot member.

In another aspect of the method, case-harden at least one of the first inner cylindrical surface of the first housing, the outer cylindrical surface of the follower, the first inner spherical surface of the first housing, or the outer spherical surface of the pivot member.

In another aspect of the method, shot peen at least one of the first inner cylindrical surface of the first housing, the outer cylindrical surface of the follower, the first inner spherical surface of the first housing, or the outer spherical surface of the pivot member.

In another method of manufacturing a mechanical joint with a first housing, a second housing, and a follower, heat a first component to a first austenizing temperature, the first austenizing temperature is above a first critical temperature of a first steel and above 600° C., the first component comprising the first steel. Maintain the first component at or above the first austenizing temperature for a first austenizing time. The first austenizing time is sufficient to convert a microstructure of the first steel to at least 95% austenite. Quench the first component to between 16° C. and 27° C. at a first quench rate, the quench leaving more than 3% of the microstructure of the first steel as retained austenite. Cryogenically treat the first component below −115° C. The first component is any of the first housing, second housing, follow or ball pivot.

In another aspect of the method, quench the first component to between 16° C. and 27° C. leaves between 17% and 5% retained austenite and cryogenically treating the first component leaves less than 1% retained austenite.

In another aspect of the method, the first steel is an SAE 4000 series steel.

In another aspect of the method, apply a first vapor deposition coating onto at least one of the outer cylindrical surface of the follower, the first inner cylindrical surface of the first housing, the first inner spherical surface of the first housing, or the outer spherical surface of the pivot member, In another aspect of the method, case-harden the outer cylindrical surface of the follower, the first inner cylindrical surface of the first housing, the first inner spherical surface of the first housing, or the outer spherical surface of the pivot member.

In another method of manufacturing a mechanical joint with a first housing, a second housing, a pivot member, and a follower, apply a first vapor deposition coating to an outer cylindrical surface of the follower; apply a second vapor deposition coating to an outer spherical surface of the pivot member; apply a third vapor deposition coating to a first inner cylindrical surface and a first inner spherical surface of the first housing; apply a fourth vapor deposition coating to a second inner cylindrical surface and a second inner spherical surface of the first housing; mount the follower within a first notch of the first housing with the outer cylindrical surface of the follower slidingly engaged with the first inner cylindrical surface; mount the follower within a second notch of the second housing with the outer cylindrical surface of the follower slidingly engaged with the second inner cylindrical surface; mount the pivotal member within the first housing with the outer spherical surface slidingly engaged with the first inner spherical surface; mount the pivotal member within the second housing with the outer spherical surface slidingly engaged with the second inner spherical surface; assembling the first housing with the second housing such that the first housing and the second housing are fixedly engaged together and the follower is secured between the first housing and the second housing.

In another aspect of the method, the first vapor deposition coating is one of a physical vapor deposition coating comprising titanium nitride or a chemical vapor deposition coating comprising titanium nitride.

In another aspect of the method, the physical vapor deposition coating is applied in at least two layers to a depth between 2 and 5 microns.

In another aspect of the method, the physical vapor deposition coating is applied in at least two layers to a depth between 5 and 10 microns.

In another aspect of the method, cryogenically treat the pivot member below −115° C. for a bath time of at least 24 hours or below −184° C. for the bath time of at least 12 hours In another aspect of the method, the pivot member is made from a first austenitic steel.

In another method of manufacturing a mechanical joint with a first housing, a second housing, a pivot member, and a follower, apply a first physical vapor deposition coating to an outer cylindrical surface of the follower.

In another aspect of the method, apply a second physical vapor deposition coating to an outer spherical surface of the pivot member.

In another aspect of the method, apply a third physical vapor deposition coating to a first inner cylindrical surface and a first inner spherical surface of the first housing.

In another aspect of the method, apply a fourth physical vapor deposition coating to a second inner cylindrical surface and a second inner spherical surface of the first housing.

In another aspect of the method, the first, second, third, and fourth coatings are applied simultaneously.

In another aspect of the method, the first vapor deposition coating is a physical vapor deposition coating comprising titanium nitride.

In another aspect of the method, the physical vapor deposition coating is applied in at least two layers to a depth between 2 and 5 microns.

In another aspect of the method, a hardness of the first physical vapor deposition coating is between 60 and 68 HRC.

In another aspect of the method, cryogenically treat the pivot member below −115° C. for at least 24 hours below −184° C. for at least 12 hours.

In another aspect of the method, the pivot member is made from a first austenitic steel.

In another aspect of the method, cryogenically treat the pivot member below −115° C. for at least 24 hours and the pivot member is made from a first austenitic steel.

In another method of manufacturing a mechanical joint with a first housing, a second housing and a pivot member, cryogenically treat the first housing below −115° C. for at least 24 hours below −184° C. for at least 12 hours where the first housing is made from a first austenitic steel.

One aspect of a mechanical joint includes an improved groove structure of a first housing. A first groove can include a first cylindrical contact surface disposed in the inner surface of an outer casing on a first side of a central cavity of the first housing. A second groove can include a second cylindrical contact surface disposed in the inner surface of the outer casing on a second side of the central cavity of the first housing. The first side can be opposite the second side. A first lip can include a first toroidal contact surface. The first lip can extend inwardly toward the central cavity of the first housing at a first open end. The first lip can be aligned with the first groove. A second lip can include a second toroidal contact surface. The second lip can extend inwardly toward the central cavity at the first open end of the first housing. The second lip can be aligned with the second groove. A drive puck can include a first wing, a second wing, a circular outer perimeter, an outer toroidal contact surface and an inner slot disposed between the first wing and the second wing. The outer toroidal contact surface can extend along the first and second wings and slidingly engage within the first and second grooves.

Another aspect of the joint includes a through-path defining a lubricant space extending between a first end of a drive shaft and an inner wall of a central cavity at a first open end of a housing section. The through-path can allow a lubricant to flow into and out of the central cavity at the first open end of the first housing to provide lubrication to the components therein.

Another mechanical joint includes a 90°-100° joint. The joint can comprise a housing with first and second ends, first and second drive pucks or drive pucks and first and second drive balls. The first and second drive balls can be rotatably coupled with the first and second drive pucks or pucks at opposite ends of the housing, respectively. First and second shafts can be coupled with the first and second drive balls. In this manner, the joint can transfer rotation between the first and second shafts at an angle of up to about 90°-100°.

Another mechanical joint is a wrench attachment. The wrench attachment can comprise a housing with first and second ends and a rotational sleeve rotatably coupled with the housing. The wrench attachment can include first and second drive pucks or pucks, a driver and a receiving socket. The driver and receiving socket can be rotatably coupled with the first and second drive pucks or pucks at opposite ends of the housing, respectively. A wrench can be coupled with the receiving socket and a socket attachment can be coupled with the driver. A user can grasp the rotational sleeve and use the wrench to rotate the wrench attachment within the rotational sleeve and to use the socket attachment.

In another aspect of the wrench attachment, two retention rings and two retention slots, the retention slots are disposed on opposite ends of the housing, the retention rings configured to fit within the retention slots. The rotational sleeve is retained on the housing between the two retention rings. The rotational sleeve can include a contoured grip surface.

Another mechanical joint for transferring rotational motion from a first shaft to a second shaft includes a housing with an outer casing, a central cavity, a first end and a second end. A first groove includes a first contact surface and a second groove includes a second contact surface. The first and second grooves are disposed on opposite sides of the central cavity. A first lip includes a third contact surface at the first end of the housing and the first lip aligns with the first groove. A second lip includes a fourth contact surface at the first end of the housing. The second lip aligns with the second groove. A drive puck includes a circular outer perimeter, an outer contact surface, and an inner slot. A drive shaft includes a first end and a second end, the first end pivotably coupled with the drive puck by a pin, the second end configured to couple with the first shaft. The drive puck is disposed within the first and second grooves, the outer contact surface slidingly engaged with the first and second contact surfaces of the first and second grooves, respectively. The drive puck maintained within the first and second grooves at the first end of the housing by the third and fourth contact surfaces of the first and second lips. The drive puck rotates within the first and second grooves in a first plane and the drive shaft rotates about the pin in a second plane. The first plane is orthogonal to the second plane.

In another aspect of the mechanical joint, the housing includes a first housing component coupled with a second housing component. The first housing component includes an outer end and an inner end, the first and second grooves, and the first end of the housing. The second housing component includes an outer end and an inner end, the second end of the housing, and an aperture for coupling with the second shaft at the outer end. The inner ends of the first and second housing components are welded together to form the housing with the drive puck disposed within the first and second grooves.

In another aspect of the mechanical joint, the second end of the drive shaft is a standard socket drive and the second end of the housing includes a standard socket aperture.

In another aspect of the mechanical joint, the inner slot of the drive puck includes a first flat side on the first wing and a second flat side on the second wing. The first flat side is substantially parallel to the second flat side. The first aperture extends through the first and second flat sides. The first end of the drive shaft includes a first planar portion and a second planar portion. The first and second planar portions are disposed on opposite sides of the first end of the drive shaft. The second aperture extends through the first and second planar portions. The first and second planar portions slidingly engaged with the first and second flat sides of the inner slot, respectively.

In another aspect of the mechanical joint, the housing includes a first housing component coupled with a second housing component. The first housing component includes an outer end and an inner end, the first and second grooves, and the first end of the housing. The second housing component includes a third groove having a fifth contact surface, a fourth groove having a sixth contact surface. The third and fourth grooves disposed on opposite sides of the central cavity. A third lip includes a seventh contact surface at the second end of the housing. The third lip aligned with the third groove. A fourth lip includes an eighth contact surface at the second end of the housing. The fourth lip aligned with the fourth groove. A second drive puck includes a circular outer perimeter, an outer contact surface, and an inner slot. A second drive shaft includes a first end and a second end. The first end pivotably couples with the second drive puck by a second pin. The second end configured to couple with the second shaft. The second drive puck is disposed within the third and fourth grooves and maintained therein by the third and fourth lips. The inner end of the first housing component is welded to the inner end of the second housing component.

In another aspect of the mechanical joint, the drive puck rotates in a first plane and the second drive puck rotates in a second plane. The first and second planes are orthogonal.

In another aspect of the mechanical joint, the outer contact surface of the drive puck is toroidal and the first and second lips each include a toroidal contact surface.

In another aspect of the mechanical joint, the outer contact surface of the drive puck is cylindrical and the first and second lips each include a cylindrical contact surface.

In another aspect of the mechanical joint, the first and second contact surfaces of the first and second grooves, respectively, are cylindrical and convex.

Another mechanical joint for transferring rotational motion from a first shaft to a second shaft includes a housing. The housing has a first end and a second end. A first channel is in the first end. A first drive puck is in the first channel. The first drive puck includes a first wing, a second wing, an inner slot, and a circular outer perimeter having an outer contact surface. A first drive shaft couples with the first drive puck. The first drive shaft includes a first end and a second end. The first end pivotably coupled within the inner slot of the first drive puck by a first pin. The second end configured to couple with the first shaft. A first cap ring includes a central opening and first and second channel segments. The first cap ring welded with the first end of the housing with the first drive puck disposed within the first channel and the first and second channel segments. The outer contact surface of the first drive puck slidingly engages with a bottom surface of the first channel, and the second end of the first drive shaft extends through the central opening of the first cap ring. The first drive shaft rotates in a first plane with respect to the housing about the first pin and rotates in a second plane with respect to the housing on the first puck.

In another aspect of the mechanical joint, the first end of the housing includes a first concave spherical surface. The first cap ring includes first and second concave spherical segments, and the first end of the first drive shaft includes a first convex spherical surface. The first end of the first drive shaft slidingly engaged with the first concave spherical surface and the first and second concave spherical segments.

In another aspect of the mechanical joint, the first and second wings of the first drive puck each include an inner planar surface forming the inner slot, and the first end of the first drive ball includes first and second opposite planar surfaces slidingly engaged with the inner planar surfaces, respectively. The first pin extends through the first and second opposite planar surfaces and through the inner planar surfaces.

In another aspect of the mechanical joint, the first cap ring is electron beam welded with the first end of the housing.

In another aspect of the mechanical joint, the second shaft is coupled with the second end of the housing.

In another aspect of the mechanical joint, the second end of the housing includes a second concave spherical surface. The second cap ring includes first and second concave spherical segments, and the first end of the second drive shaft includes a second convex spherical surface. The first end of the second drive shaft slidingly engaged with the second concave spherical surface and the first and second concave spherical segments of the second cap ring.

In another aspect of the mechanical joint, the second drive shaft rotates about the second pin in the first plane and the second drive shaft rotates about the second drive puck in the second plane. The first and second planes are orthogonal.

In another aspect of the mechanical joint, a through-path defining a lubricant space extends through the housing to allow a lubricant to flow into and out of a central cavity.

Another mechanical joint for transferring rotational motion from a first shaft to a second shaft includes a housing. The housing has a first open end and a second end. A first drive puck is in the first open end. The first drive puck includes a first wing, a second wing, an inner slot, and a circular outer perimeter having an outer contact surface. A first drive shaft couples with the first drive puck. The first drive shaft includes a first end and a second end. The first end pivotably couples within the inner slot of the first drive puck by a first pin. The second end configured to couple with the first shaft. The first and second wings of the first drive puck each include an inner planar surface forming the inner slot, and the first end of the first drive ball includes first and second opposite planar surfaces slidingly engaged with the inner planar surfaces, respectively. The first drive shaft rotates in a first plane with respect to the housing about the first pin and rotates in a second plane with respect to the housing on the first puck.

In another aspect of the mechanical joint, a hardness of the bottom surface of the channel is at least 2, 3 or 5 HRC above a hardness of the outer contact surface of the drive puck.

In another aspect of the mechanical joint, the housing is cryogenically hardened below −115° C. for at least 24 hours below −184° C. for at least 12 hours.

In another aspect of the mechanical joint, a physical vapor deposition coating is applied to the outer contact surface of the drive puck.

In another aspect of the mechanical joint, the first cap ring is electron beam welded with the first end of the housing.

In another aspect of the mechanical joint, the housing includes a first housing component made of steel and a second housing component made of aluminum. The cap ring and the first housing component are mechanically coupled with the second housing component. The second housing component includes the channel.

In another aspect of the mechanical joint, first and second grooves are in the first open end of the housing on opposite sides of a central cavity. First and second lips are at the first open end. The first and second lips align with the first and second grooves, respectively. The drive puck is slidingly engaged within the first and second grooves and maintained within the first and second grooves at the first open end of the housing by the first and second lips.

In another aspect of the mechanical joint, third and fourth grooves are in the second end of the housing on opposite sides of the central cavity. Third and fourth lips are at the second end of the housing. The third and fourth lips align with the third and fourth grooves, respectively. The second drive puck is slidingly engages within the third and fourth grooves and maintained within the third and fourth grooves at the second end of the housing by the third and fourth lips.

BRIEF DESCRIPTION OF THE DRAWINGS

FIG. 17 is a perspective view of a third embodiment of a joint.

FIG. 18 is a front view of the joint shown in FIG. 17.

FIG. 19 is an exploded perspective view of the joint shown in FIG. 17.

FIG. 22A is a top view of a cap ring of the joint shown in FIG. 17.

FIG. 22B is a section view along the line B1-B1 in FIG. 22B.

FIG. 22C is a section view along the line B2-B2 in FIG. 22B.

FIG. 23A is an end view of a drive puck of the joint shown in FIG. 17.

FIG. 23B is a side view of the drive puck of FIG. 23A.

FIG. 24A is a perspective view of a drive ball of the joint in FIG. 17.

FIG. 24B is a side view of the drive ball of FIG. 24A.

FIG. 24C is a section view along the line C-C in FIG. 24B.

FIG. 25A is a perspective view of a pin of the joint shown in FIG. 19.

FIG. 25B is a side view of the pin of FIG. 25A.

FIG. 25C is an end view of the pin of FIG. 25A.

FIG. 34A is a section view along the line E-E in FIG. 33B.

FIG. 34B is a top view of the first housing shown in FIG. 33A.

FIG. 34C is a section view of the first housing shown in FIG. 34B.

FIG. 34D is a top view of the first housing shown in FIG. 33A.

FIG. 34E is a section view of the first housing shown in FIG. 34D.

FIG. 41 is a section view along the line J-J in FIG. 40B.

FIG. 42 is a section view along the line I-I in FIG. 40A.

FIG. 43 is a detail view at Detail K in FIG. 42.

FIG. 47A is an end view of a housing of the joint shown in FIG. 44.

FIG. 47B is a side view of the housing of FIG. 47A.

FIG. 47C is a section view along the line M-M in FIG. 47A.

FIG. 48 is a partial exploded assembly view of the joint in FIG. 44.

FIG. 49A is a top view of the assembly of the joint shown in FIG. 44.

FIG. 49B is an end view of the joint shown in FIG. 49A.

FIG. 53 is a seventh embodiment of a joint as a socket wrench.

FIG. 54 is an exploded assembly view of the joint of FIG. 53.

FIG. 57 is a perspective view of an additional embodiment of a joint.

FIG. 58 is an exploded view of the joint of FIG. 57.

FIG. 59 is a perspective view of an additional embodiment of a joint.

FIG. 60 is an exploded view of the joint of FIG. 59.

DETAILED DESCRIPTION

Figure 1:
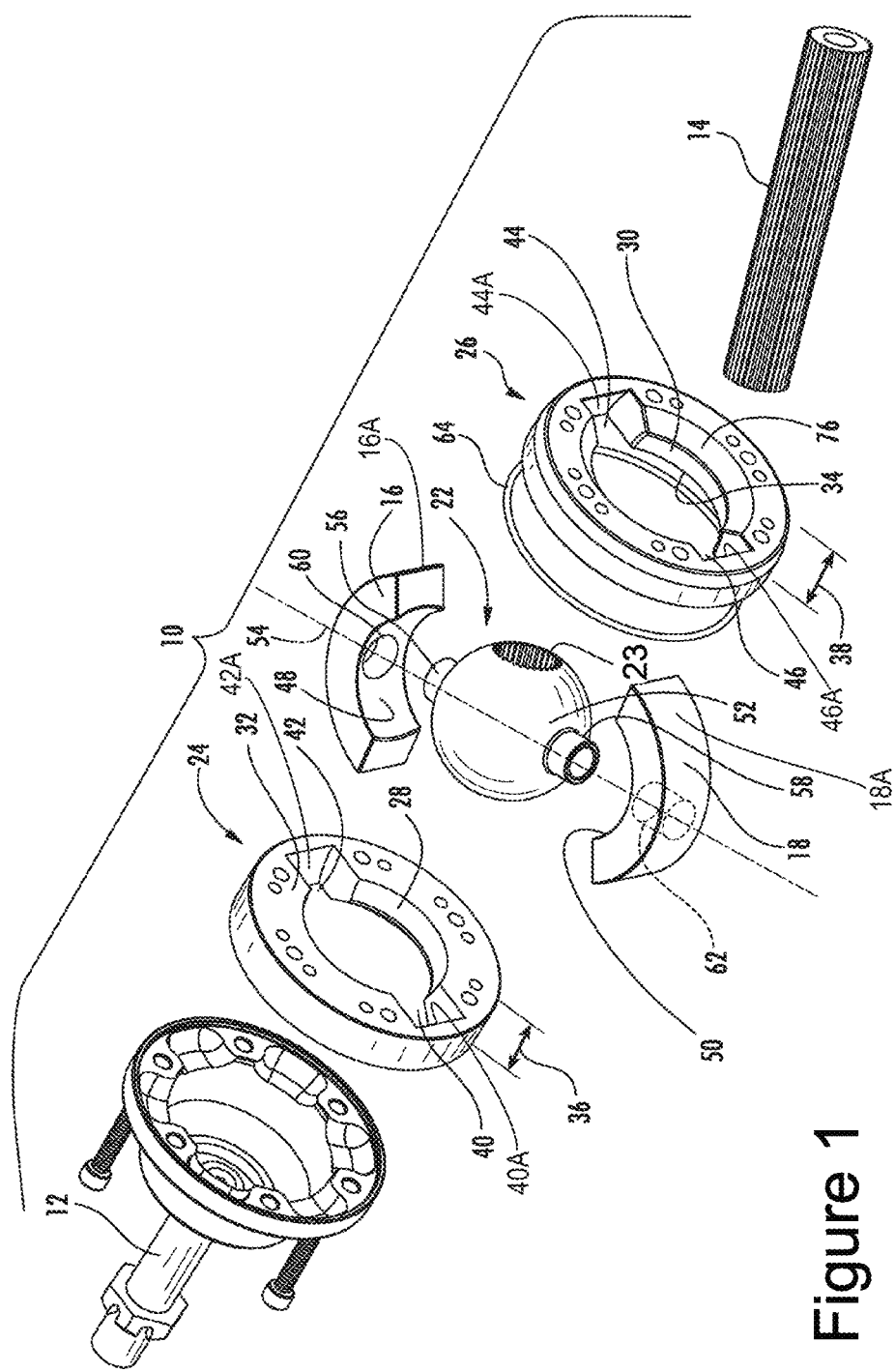
FIG. 1 is an exploded perspective view of an embodiment of a joint.

An aspect of the present disclosure is directed to devices and methods that effectively and efficiently allow for the transmission of rotational forces via axially unaligned axes. The technologies herein are described in the context of universal joints and have utility in that context. However, the technologies disclosed also can be used in other contexts as well. Some embodiments also allow for axial loads, such as applied by thrusting, pulling, suspension, and the like, to be readily accepted without interfering with operation of the device.

The detailed description set forth below is intended as a description of certain structural embodiments and methods of manufacturing of the joints of the present disclosure, and is not intended to represent the only form in which the technologies of the present disclosure can be constructed or utilized. The description sets forth the functions and sequences of steps for constructing and operating the joints. It is to be understood, however, that the same or equivalent functions and sequences can be accomplished by different embodiments and that they are also intended to be encompassed within the scope of the present disclosure.

First and Second Embodiments of a Universal Joint

FIGS. 1-5 illustrate the structure of a first embodiment of a joint 10. The joint 10 is configured to transfer rotational movement from a first shaft 12 to a second shaft 14 or vice versa. The joint 10 transfers rotational movement at a 1:1 ratio so that a unit amount of rotation from the first shaft 12 corresponds to a unit amount of rotation in the second shaft 14 even if the first and second shafts 12, 14 are at a skewed angle. By way of example and not limitation, a 1° rotational turn of the first shaft 12 corresponds to a 1° rotational turn of the second shaft 14. The first and second shafts 12, 14 rotate at the same speed throughout the rotation. Accordingly, there is no binding between the first and second shafts 12, 14 during the rotational movement. The second shaft 14 turns at the same speed as the first shaft 12.

With continued reference to FIGS. 1-5, the first and second shafts 12, 14 can be skewed at an angle 17. By way of example and not limitation, such angle 17 can be between approximately 0° and 45°. The joint 10 can transfer rotational movement from the first shaft 12 to the second shaft 14 with a pair of followers (or bearings) 16, 18 that slide within the housing 20 and are rotationally pinned to the pivot member 22. In some embodiments, the pivot member 22 has an outer spherical surface 52. The followers 16, 18 help increasing the possible angle between the first and second shafts 12, 14. Additionally, the joint 10 holds an axial load. By way of example and not limitation, opposing forces (e.g., weight or pulling forces) can be applied to the first and second shafts 12, 14.

According to one embodiment, the housing 20 has first and second halves 24, 26. The first and second halves 24, 26 have inner spherical surfaces 28, 30, respectively, that form a portion of a spherical cavity within the housing 20 (i.e., between the first and second halves 24, 26) in which the pivot member 22 is locked. The inner spherical surface 28 can terminate at an inner side 32 of the first half 24 of the housing 20. Similarly, the inner spherical surface 30 of the second half 26 of the housing 20 can terminate at an inner side 34 of the second half 26 of the housing 20. This junction between the inner spherical surfaces 28, 30 of the first and second halves 24, 26 define the equator of the spherical cavity that holds the pivot member 22. The thickness 36 of the first half 24 and the thickness 38 of the second half 26 can be sufficient to hold the pivot member 22 within the inner cavity of the housing 20. In other words, the pivot member 22 is sandwiched between the first and second halves 24, 26 so that an axial load can be applied to the first and second shafts 12, 14. The axial load can be in any orientation including tension and compression.

The first and second halves 24, 26 can also have interior notches 40, 42, 44 and 46. The inner surfaces of the notches 40-46 can have a cylindrical configuration about axis 47. The axis 47 is parallel to the inner sides 32, 34 of the first and second halves 24, 26 of the housing 20. Moreover, the axis 47 is transverse to a plane in which the notches 40, 42 and 44, 46 reside. The notches 40-46 retain the followers 16, 18 in place and allow the followers 16, 18 to rotate about the axis 47 during rotational movement of the first and second shafts 12, 14.

The followers 16, 18 can have outer surfaces 16A, 18A that mate with the inner surfaces 40A, 42A, 44A, and 46A of the notches 40, 42, 44, 46, respectively. The outer surfaces 16A, 18A of the followers 16, 18 can also define a circle or cylinder. Preferably, the outer surfaces 16A, 18A of the followers 16, 18 can be cylindrical to match the cylindrical configuration of the inner surfaces 40A-46A of the notches 40-46. The outer surfaces 16A, 18A of the followers 16, 18 slide on the inner surfaces 40A-46A of the notches 40-46 and do not rub excessively against the inner surfaces 40A-46A of the notches 40-46 which can cause the transfer of rotation of movement between the first and second shafts 12, 14 to be inefficient.

As described further below in other embodiments of the joint, the followers 16, 18 can be formed as an integral unit and operative to define a generally C-shaped configuration. In such embodiments, and as opposed to having two opposed followers 16, 18 as shown, followers 16, 18 can be interconnected to one another to form a continuous C-shape leaving an opening through which shaft 14 can engage with splined recess 23.

The inner surfaces 48, 50 of the followers 16, 18 can partially define a sphere when the joint 10 is assembled. The inner surfaces 48, 50 mate with the outer spherical surface 52 of the pivot member 22. During rotation of the shafts 12, 14, the followers 16, 18 can pivot about pivot axis 54. Alternatively, the inner surfaces 48, 50 of the followers 16, 18 can comprise flat surfaces and/or be slidingly engaged with flat areas on the outer surface of the pivot member located on opposite sides of the pivot member around the pins 56, 58.

The pivot axis 54 can be defined by pins 56, 58 that extend out laterally from the pivot member 22. The pins 56, 58 can be fabricated as a unitary structure to the pivot member 22. Alternatively, the pins 56, 58 can be separate from the pivot member 22 and reside within the recesses 60, 62 formed in the pivot member 22. In this embodiment, the pins 56, 58 can be a pin 56 extending through a single recess 60 within the pivot member 22. The pins 56, 58 can also be disposed within corresponding recesses 60, 62 of the first and second followers 16, 18. As a further alternative, the pins 56, 58 can be formed as a unitary structure to the followers 16, 18 and the pins 56, 58 can protrude inward and be received within matching recesses formed in the pivot member 22. Accordingly, it can be readily understood and appreciated by those skilled in the art that any of a variety of mechanisms can be utilized as to how first and second followers, 16, 18 can be maintained in axial registry relative to pivot axis 54 and that the same can be accomplished by any of the foregoing mechanisms, as well as any additional mechanism that enables a follower 16, 18 to releasably interconnect with the outer spherical surface 52 of the pivot member 22 about pivot axis 54, whether it be through mechanisms formed upon the followers, 16, 18, the pivot member 22, or both.

The joint 10 can also have an O-ring 64 that is positioned between the first and second halves 24, 26 of the housing 20. The O-ring 64 can reside within the grooves formed within the inner sides 32, 34 of the first and second halves 24, 26. The O-rings 64 can serve to retain grease or lubricants in the housing 20 during use. In some embodiments, a flexible sleeve can extend over the joint 10 and be secured around the first and second shafts 12, 14. This flexible sleeve can contain a grease or other lubricant.

Figure 2:
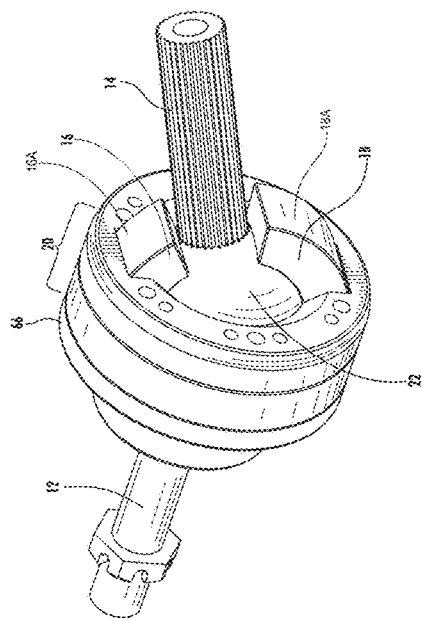
FIG. 2 is an assembled view of the joint shown in FIG. 1.
Figure 3:
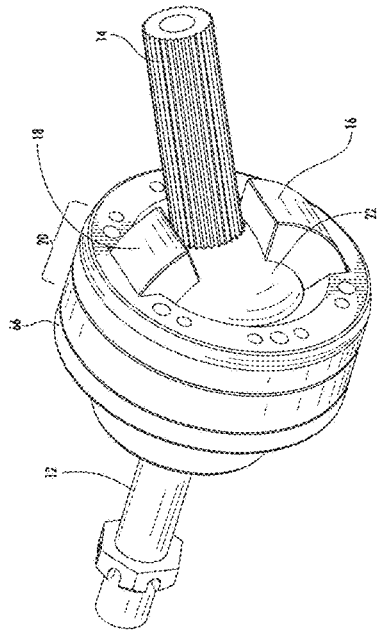
FIG. 3 illustrates the joint shown in FIG. 2 in a second position during rotation.
Figure 4:
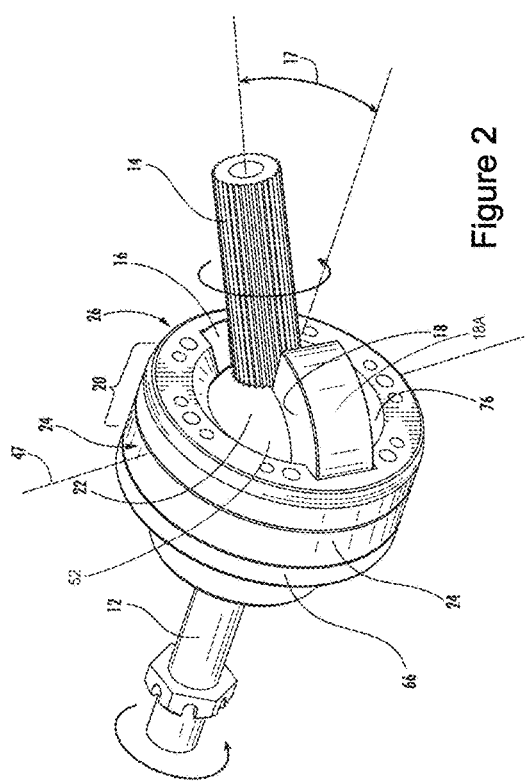
FIG. 4 illustrates the joint shown in FIG. 2 in a third position during rotation.
Figure 5:
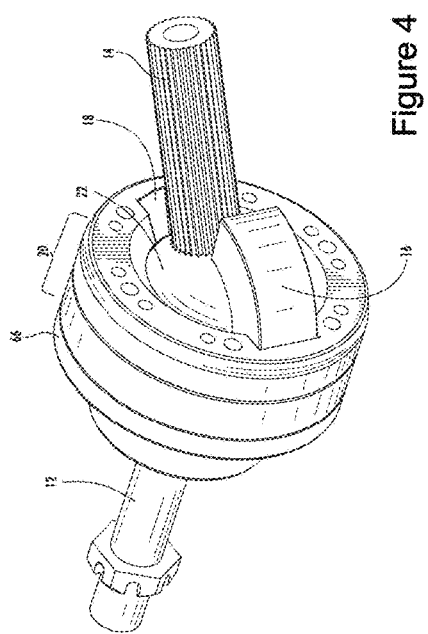
FIG. 5 illustrates the joint shown in FIG. 2 in a fourth position during rotation.
Figure 6:
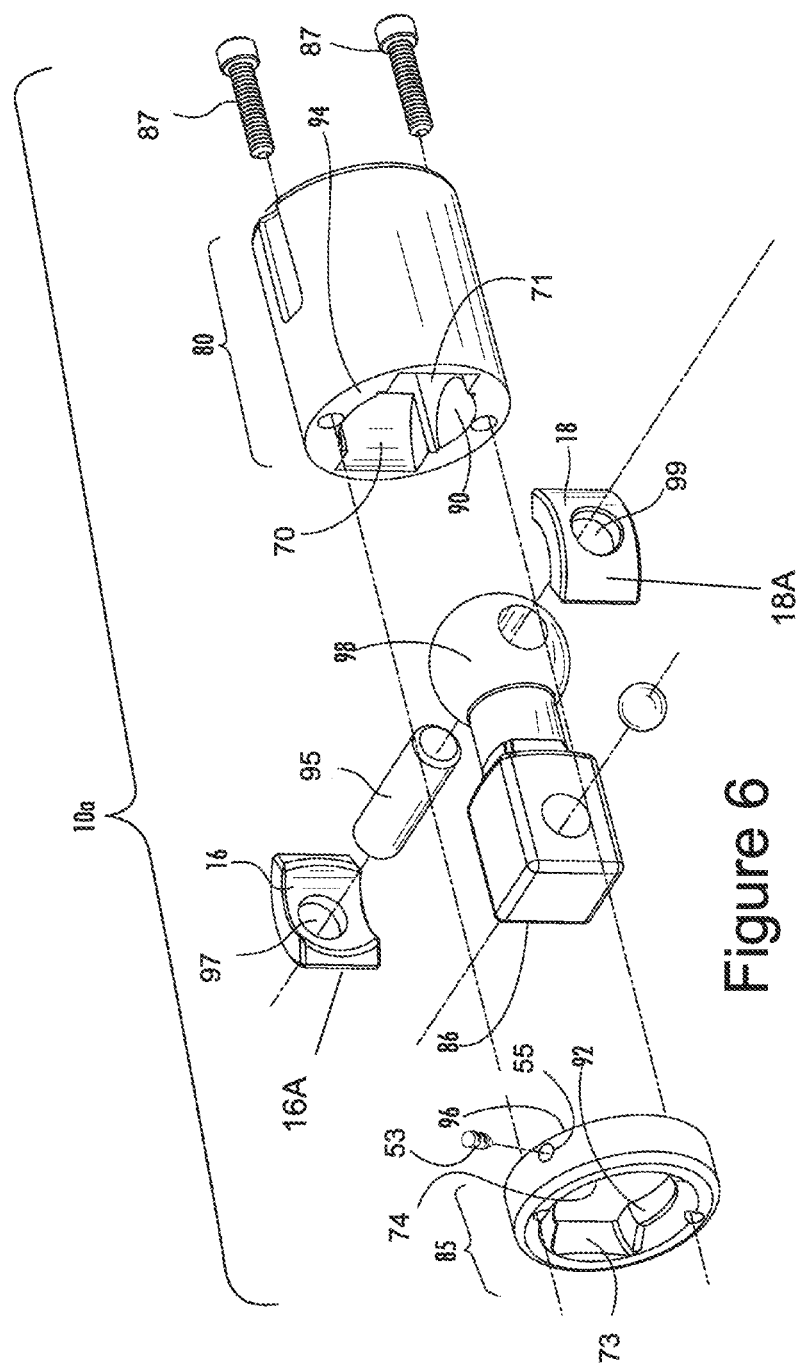
FIG. 6 is an exploded perspective view of a second embodiment of a joint.
Figure 7:
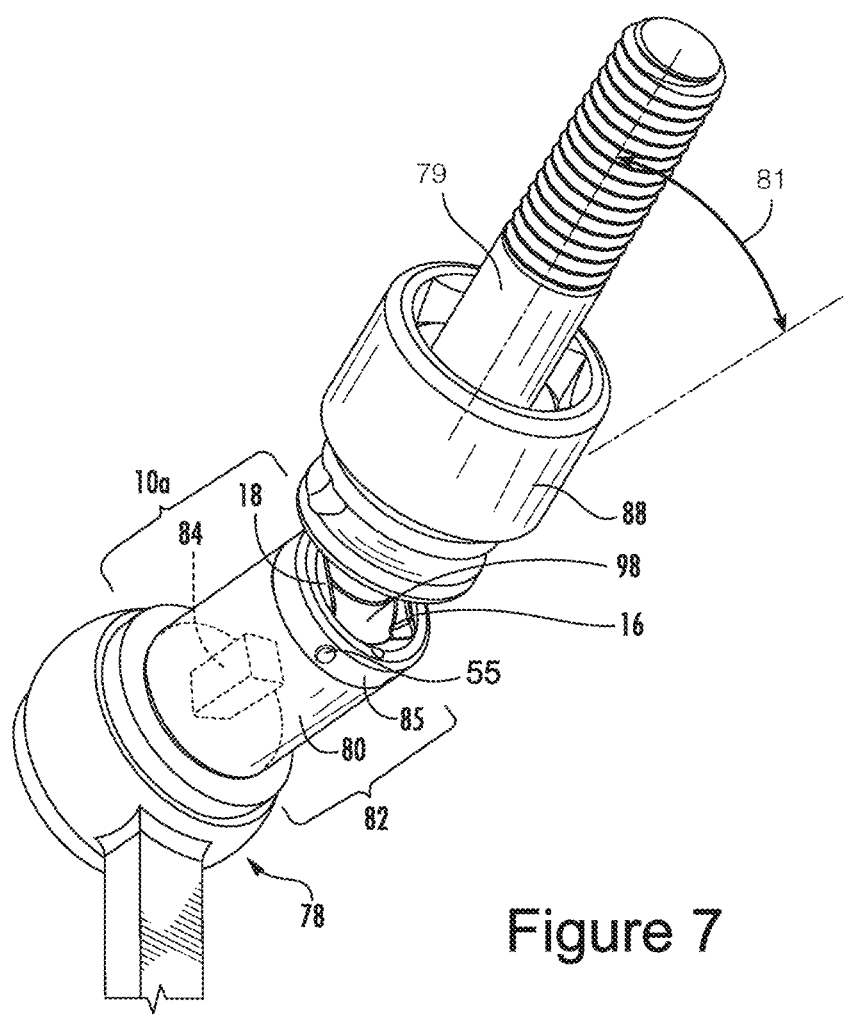
FIG. 7 is an assembled view of the joint in FIG. 6 in a first position during rotation.
Figures 8, 9:
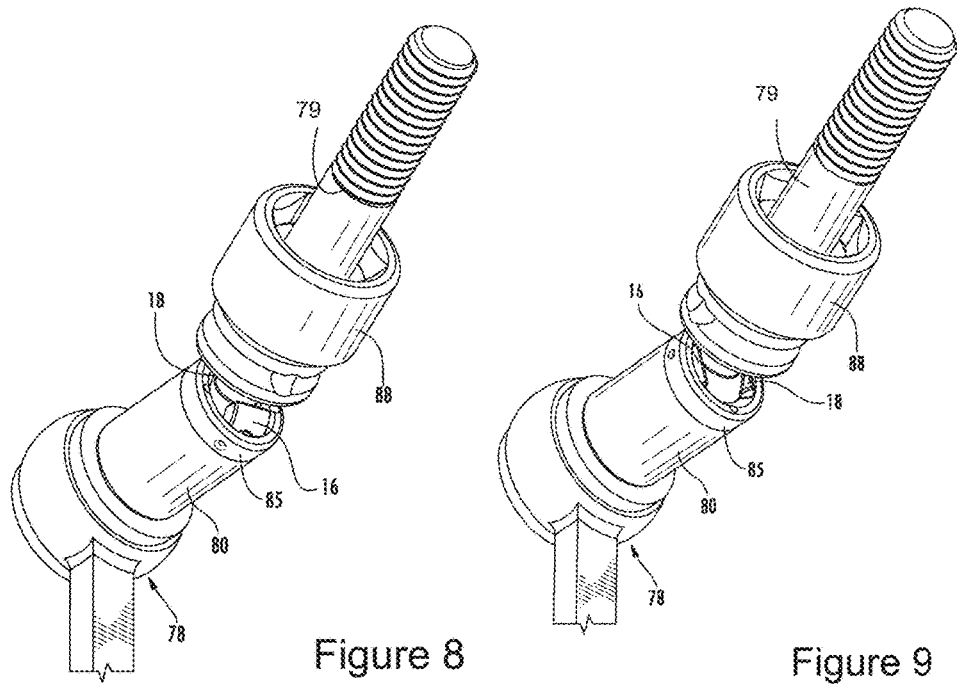
FIG. 8 illustrates the joint shown in FIG. 7 in a second position during rotation.
FIG. 9 illustrates the joint shown in FIG. 7 in a third position during rotation.
Figures 10, 11:
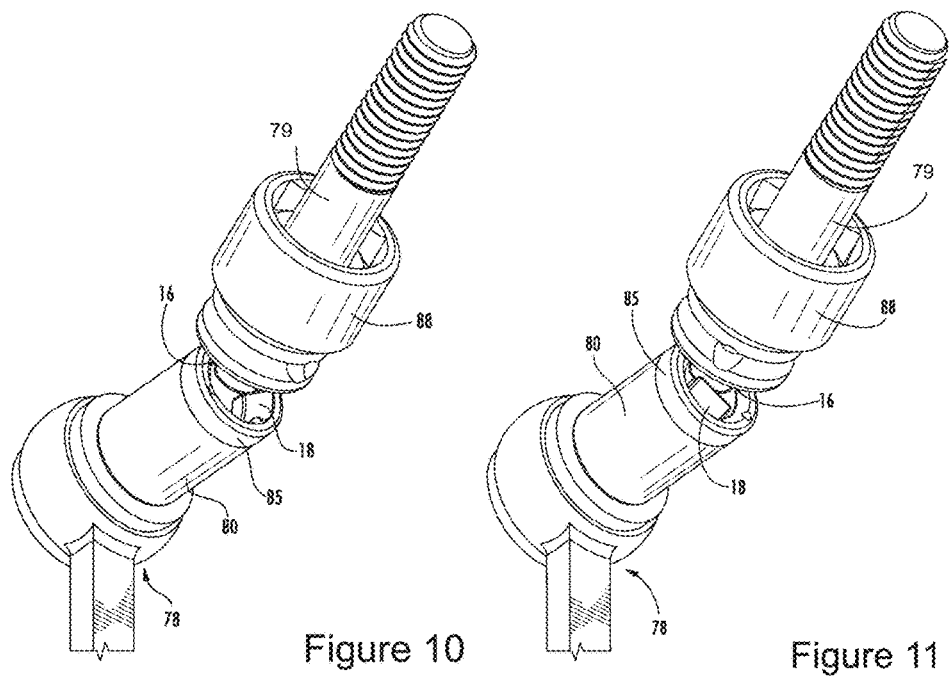
FIG. 10 illustrates the joint shown in FIG. 7 in a fourth position during rotation.
FIG. 11 illustrates the joint shown in FIG. 7 in a fifth position during rotation.

The shafts 12, 14 are respectively secured to the housing 20 and the pivot member 22. One of the shafts 12, 14 can be secured to the housing 20. The other one of the shafts 12, 14 can be secured to the pivot member 22. In FIG. 2, the shaft 12 is shown as being fixedly secured to the housing 20, whereas, the shaft 14 is shown as being fixedly secured to the pivot member 22. The shaft 12 can be secured to a housing mount 66. The housing mount 66 can be attached to the first half of the housing 20 by any means known in the art or developed in the future. By way of example and not limitation, the housing mount 66 can be bolted, glued or welded to the first half 24 of the housing 20. Moreover, the first shaft 12 can have a fixed relationship to the housing mount 66. The second shaft 14 can be secured to the pivot member 22 to have a fixed relationship thereto. The second shaft 14 can be splined and slidably or fixedly engage a splined recessed 23 of the pivot member 22.

The lateral side of the second half 26 of the housing 20 can define a conical surface 76. The conical surface 76 allows the angle 17 between the first and second shafts 12, 14 to be increased to a greater degree compared to forming the second half 26 without the conical surface 76. The second shaft 14 rides closely adjacent to the conical surface 76 during rotational movement of the joint 10 when the angle 17 between the first and second shafts 12, 14 is at its maximum angle.

Referring now to FIGS. 2-5, operation of the joint 10 is shown. The shafts 12, 14 are set to an angle 17. As the shaft 12 rotates as shown by the rotational arrow in FIG. 2, the shaft 12 rotates the housing mount 66. Since the housing mount 66 is secured to the housing 20, rotation of the shaft 12 also consequently rotates the housing 20. Rotational motion is transferred from the housing 20 to the followers 16, 18 which are disposed within the notches 40-46 of the housing. During rotation, the followers 16, 18 slide within the notches 40-46. The follower 16 moves outward from the housing 20 by a degree, whereas, the follower 18 recedes into the housing 20. Rotational motion is also transferred to the pivot member 22 by way of pins 56, 58. The pins 56, 58 are rotationally disposed within recesses 60, 62. The pins 56, 58 are connected to the pivot member 22. The pivot member 22 transfers rotational motion to the second shaft 14 since the pivot member 22 is fixedly attached to the second shaft 14.

Between the followers 16, 18 and the pivot member 22, the pivot member 22 pivots about pivot axis 54 in relation to the followers 16, 18. Between the housing 20 and the followers 16, 18, the followers 16, 18 rotationally slide within the notches 40-46 formed in the housing 20 about axis 47. Throughout rotational movement of the first shaft 12, (1) the followers 16, 18 can slide within the notches 40-46, and (2) the pivot member 22 pivots about the followers 16, 18. This is illustrated by the rotational sequence shown in FIGS. 2-5.

In the embodiment shown in FIGS. 1-5, the joint 10 has followers 16, 18 that slide within the notches 40-46 of the first and second halves 24, 26 of the housing 20. The followers 16, 18 distribute the load imposed by the pins 56, 58 to mitigate stress concentrations that the pins 56, 58 can impose upon the inner surfaces of the notches 40-46. Moreover, the followers 16, 18 allow the first and second shafts 12, 14 to be set at a greater angle 17. However, it is also contemplated that the joint 10 can also function without the followers 16, 18. During rotational movement of the shafts 12, 14, the pins 56, 58 can slide and rotate on the inner surfaces of the notches 40-46. The angle 17 is limited to the point at which the pins 56, 58 would come out of the notches 40-46. In this regard, the followers 16, 18 allow the first and second shafts 12, 14 to be set at a greater angle yet transmit rotational motion between the first and second shafts.

It is also contemplated that two or more joints 10 can be secured to each other in series. A second shaft of a first joint 10 can be coaxially aligned and attached to a first shaft of a second joint 10. A second shaft of the second joint 10 can be coaxially aligned and attached to a first shaft of a third joint 10. Rotation of the first shaft of the first joint 10 is operative to rotate a second shaft of the third joint 10. In this example, three joints 10 were connected to each other to transmit rotational motion. Each of the first and second shafts of the joints 10 can be at a skewed angle.

As described above, an aspect of some embodiments is the realization that the wear on the surfaces of some sliding components can be minimized and/or controlled and thereby the effective service life of a joint can be extended and/or the dynamic loading capacity of the joint can be increased. Such a configuration can be implemented in the joint 10, depending on the desired wear properties of the sliding components. For example, in some embodiments, the followers 16, 18 (either alone or as an integral C-shaped unit) may be manufactured more cheaply and/or are easier to service and replace than the housing halves 24, 26. Thus, minimizing wear on the inner surfaces 40A-46A of one or both housing halves 24, 26 can be an objective of the joint 10. To this end, in some embodiments of the joint 10, the inner surfaces 40A, 42A of the housing half 24 and/or the inner surfaces 44A, 46A of the housing half 24 can have a hardness greater than a hardness of the outer surfaces 16A, 18A of the followers 16, 18. In these embodiments, the inner surfaces 40A, 42A of the housing half 24 and/or the inner surfaces 44A, 46A of the housing half 24 are at least 2, 3, or 5 points harder than the outer surfaces 16A, 18A of the followers 16, 18 as measured on the Rockwell Hardness scale (HRC). For example, in some embodiments where the housing 20 and the followers 16, 18 are made from steel, the hardness of the inner surfaces 44A, 46A is 44 HRC and the outer surfaces 16A, 18A have a hardness of 43, 42, or 39 HRC.

In other embodiments of the joint 10, the housing halves 24, 26 can be manufactured more cheaply and/or are easier to service and replace than followers 16, 18. Thus, minimizing wear on the outer surfaces of one or both followers 16, 18 can be an objective of the joint 10. To this end, the inner surfaces 40A, 42A of the housing half 24 and/or the inner surfaces 44A, 46A of the housing half 24 can have a hardness less than a hardness of the outer surfaces 16A, 18A of the followers 16, 18. In these embodiments, the inner surfaces 40A, 42A of the housing half 24 and/or the inner surfaces 44A, 46A of the housing half 24 are at least 2, 3, or 5 points softer than the outer surfaces 16A, 18A of the followers 16, 18 as measured on the Rockwell Hardness scale. For example, in some embodiments where the housing 20 and the followers 16, 18 are made from steel, the hardness of the inner surfaces 44A, 46A is 40 HRC and the outer surfaces 16A, 18A have a hardness of at least 42, 43, or 45 HRC.

In other embodiments, minimizing wear on of the outer spherical surface 52 can be an objective of the joint 10. For example, in some embodiments the housing halves 24, 26 can be manufactured more cheaply and/or are easier to service and replace than pivot member 22. To this end, the outer spherical surface 52 can have a hardness greater than a hardness of the inner spherical surface 28 and/or inner spherical surface 30 of the first and second housing halves 24, 26, respectively. In these embodiments, the outer spherical surface 52 can have a hardness at least 2, 3, or 5 points greater than the hardness of the inner spherical surface 28 and/or inner spherical surface 30 of the first and second housing halves 24, 26, respect as measured on the Rockwell Hardness scale. For example, in some embodiments where the housing 20 and the followers 16, 18 are made from steel, the hardness of the outer spherical surface 52 can be 48 HRC and the inner spherical surface 28 and/or inner spherical surface 30 can have a hardness of less than 46, 45, or 40 HRC.

In other embodiments, minimizing wear on the inner spherical surface 28 and/or inner spherical surface 30 can be an objective of the joint 10. For example, in some embodiments the housing halves 24, 26 can be manufactured less cheaply and/or are more difficult to service and replace than pivot member 22. To this end, the outer spherical surface 52 can have a hardness less than a hardness of the inner spherical surface 28 and/or inner spherical surfaces 28, 30 of the first and second housing halves 24, 26, respectively. In these embodiments, the outer spherical surface 52 can have a hardness at least 2, 3, or 5 points lower than the hardness of the inner spherical surface 28 and/or inner spherical surface 30 of the first and second housing halves 24, 26, respect as measured on the Rockwell Hardness scale. For example, in some embodiments where the housing 20 and the followers 16, 18 are made from steel, the hardness of the outer spherical surface 52 can be 40 HRC and the inner spherical surface 28 and or 30 can have a hardness of more than 42, 43, or 45 HRC.

FIGS. 6-11, depict another aspect of the present disclosure wherein a joint 10a is applied to a socket wrench 78. On one end of the joint 10a, a first-half 80 of the housing 82 can be sized and configured to mount to a socket drive mechanism 84. The socket drive mechanism 84 can have a spring detent that holds the first-half 80 of the joint 10a onto the socket wrench 78.

The socket wrench 78 drives the housing 82 and a socket connector 86, which can be removably secured to the socket 88. The joint 10a allows a mechanic or user to rotate a screw, nut or bolt in a hard-to-reach area even if it is not accessible and does not have a line of sight to the socket wrench 78.

The joint 10a operates in a similar manner as that described in relation to the joint 10 as shown in FIGS. 1-5. Along these lines, the joint 10a can have a two-part housing 82 that includes the first-half 80 and a second-half 85. The two halves 80, 85 collectively form at least a portion of a spherical cavity by way of inner surfaces 90, 92. The inner surfaces 90, 92 are joined at the inside surfaces 94, 96 of the first and second halves 80, 85. This junction defines the equator of the spherical cavity defined by the inner surfaces 90, 92. Moreover, the joint 10a has an inner spherical member 98 which is trapped between the first and second halves 80, 85 within the spherical cavity defined by the inner surfaces 90, 92.

The joint 10a additionally has followers 16, 18 that are pinned to the inner member 98 by way of pin 95. The pin 95 extends through the inner spherical member 98 and protrudes out of the outer surfaces from the inner member 98. The followers 16, 18 each include a through hole or recess 97, 99 which receive pin 95 and allows the followers 16, 18 to pivot with respect to the inner member 98. The first and second halves 80, 85 of the housing 82 can be held together by way of screws 87.

The first and second halves 80, 85 also have notches 70, 71, 72 and 73 which receive the followers 16, 18. The outer surfaces 16A, 16B of the followers 16, 18 defines a configuration which is generally complimentary in shape to the interior surfaces of the notches 70, 71, 72, 73. The outer surfaces 16A, 16B of the followers 16, 18 slide within the notches 70, 71, 72, and 73. The interior surfaces of the followers 16, 18 can at least partially define a spherical configuration which mates with the spherical outer surface of the inner member 98.

The joint 10*a* can have a set screw 53 to temporarily hold the angle 81 between the first shaft (i.e., socket drive mechanism 84) and the second shaft (i.e., socket connector 86). The distal tip of the set screw 53 can be Teflon coated. The set screw 53 can be threaded into tapped hole 55. The tapped hole 55 can be aligned so that the set screw bears down on the exterior surface of the inner member 98. However, it is also contemplated that the tapped hole 55 can be formed in the housing so that the set screw bears down on the outer surfaces 16A, 16B of either one of the followers 16, 18. The user can set the angle between the first and second shafts by holding the socket connector 86 in a relative position to the socket drive mechanism 84 and tightening set screw 53 that bears down on the exterior surface of the inner member 98. The set screw 53 can have a Teflon tip to prevent any marring on the exterior surface of the inner member 98.

The joint 10*a* can be rotated to turn a bolt 79. The socket wrench 78 is connected to the first half 80 of the housing 82 of the joint 10(*a*). The socket 88 is attached to the socket connector 86 (see FIG. 7). The angle between the bolt 79 and the socket drive mechanism 84 can be positioned and set in place by tightening set screw 53 which bears down on the inner member 98. In this manner, the socket wrench 78, joint 10*a*, socket 88 and the bolt 79 can be set at an angle 81. The user can maneuver the bolt 79 into position by sole use of the handle of the socket wrench 78.

Manufacturing Methods of Universal Joint

An aspect of some embodiments described herein includes the realization that the effective service life of a joint can be extended and/or the dynamic loading capacity of the joint can be increased by the application of heat treatments to the sliding components of any of the joints described herein (including joints 10 and 10*a* and other joints described below). Although described herein in terms of the sliding components of the joint 10 (including the housing 20, the followers 16, 18, and the pivot member 22), corresponding components in other joint embodiments described herein can be treated following the same methods. Through application of manufacturing steps described in relation to FIGS. 12-16, the inner surfaces 40A-46A of the notches 40-46, the inner spherical surfaces 28, 30, the outer surfaces 16A, 18A of the followers 16, 18 and/or the outer spherical surface 52 of the pivot member 22 can be made more wear resistant and/or the useful life and torque capacities of the joint 10 can be enhanced.

Figure 12:
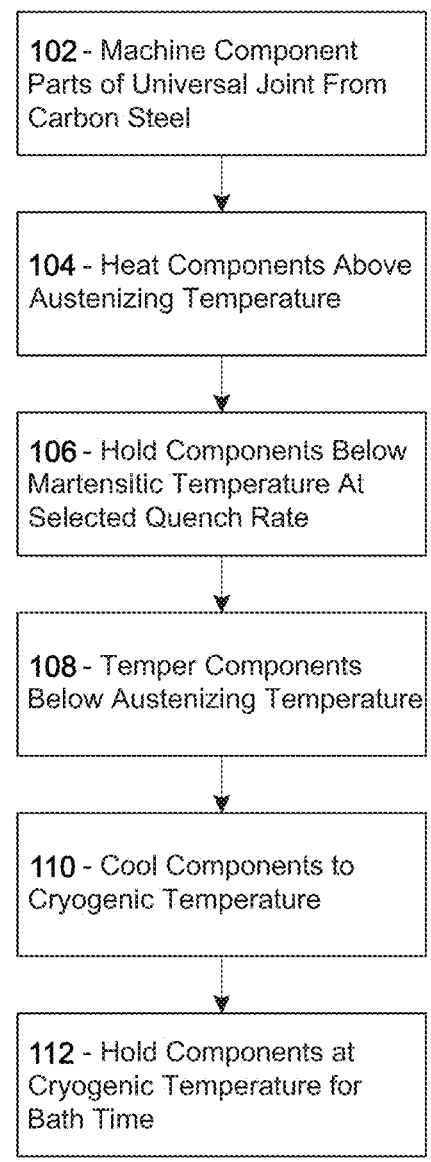
FIG. 12 illustrates a process of heat treating and cryogenically treating the sliding components of a joint when made from carbon steel.

FIG. 12 illustrates manufacturing steps according to process 100 for heat treating the sliding components of the joint 10 when made from carbon steel. Step 102 comprises manufacturing the components of the joint 10 as described above using conventional manufacturing and machining methods. In some embodiments of the present disclosure, the sliding components of the above described joint are manufactured from carbon steel using conventional and well-known machining and fabrication methods. These methods can include, but are not limited to any combination of machining from steel using milling and lathe techniques, broaching, casting, forging, powder metallurgy, electrical discharge machining (EDM), and other conventional techniques. Each of the sliding components can be manufactured from a carbon steel; the carbon steel for each sliding component can be the same or a different carbon steel from any of the other sliding components. Characteristics of appropriate carbon steels for the heat-treating process are discussed below, but are in no way limited to the steel types listed herein. Appropriate carbon steels include SAE 4000 steels such as 4140, 4340, and 300M.

Steps 104 and 106 comprise a heat treatment and a subsequent quench of the sliding component to form martensite. In some embodiments of the method, Step 102 can be performed after steps 104 and 106. Heat treating the sliding components can cause slight deformations of the sliding component's geometry, including the sliding or engaged surfaces. In embodiments of the joint having tight tolerances, these slight deformations can interfere with the assembly and operation of the joint. Thus, performing Steps 104 and 106 before the machining of Step 102 can be advantageous by eliminating these deformations. In such embodiments, the steps 108 and 110 (described below involving cryogenic hardening methods) can be performed after Step 102. In some embodiments, the tempering of Step 112 can be performed either before or after Step 102, depending on the desired hardness of the sliding components during the machining of Step 102.

Step 104 comprises raising the temperature of the components to a critical temperature of the steel, the critical temperature being above a eutectoid temperature of the steel and at which point the solid solution iron-carbon system converts into austenite (also known as gamma ($\gamma$) phase iron) under equilibrium conditions.

Figure 14:
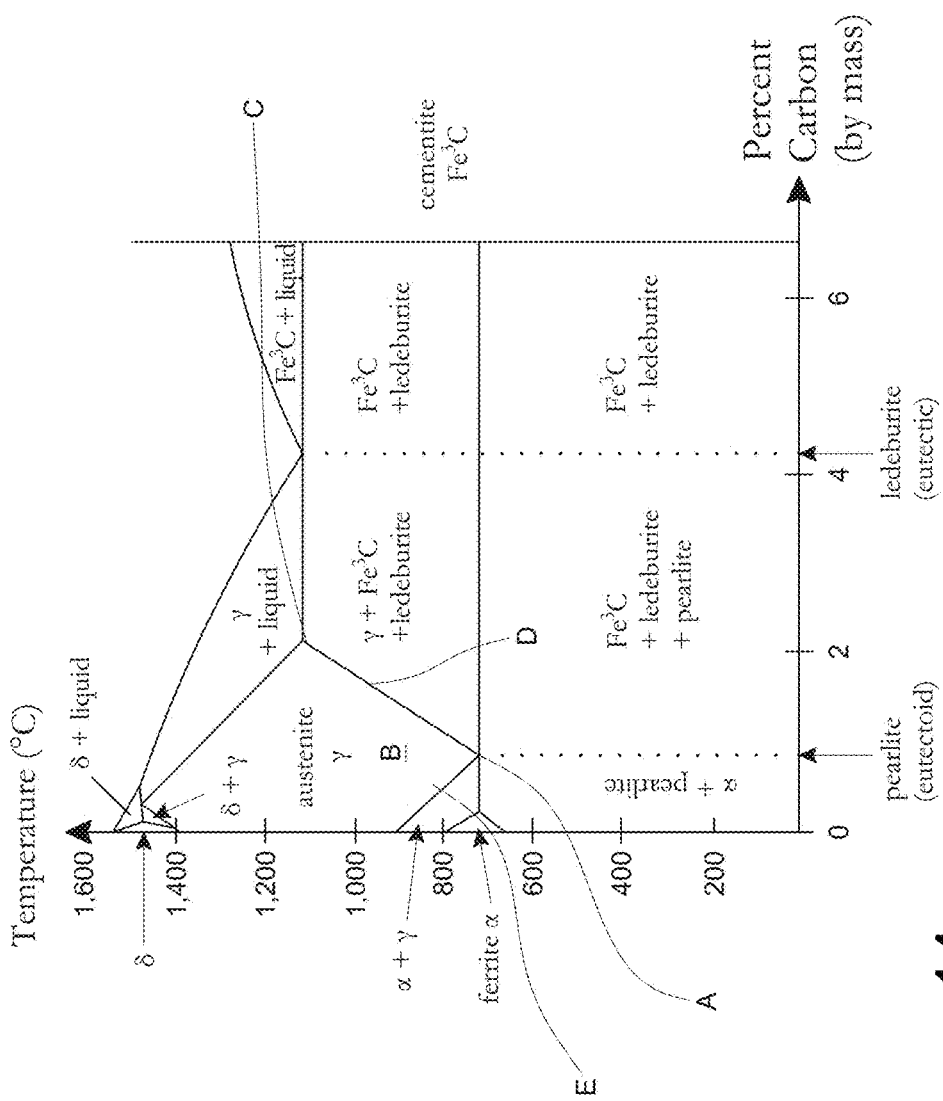
FIG. 14 illustrates a binary phase diagram of an unalloyed iron-cementite system.

FIG. 14 illustrates a binary phase diagram showing equilibrium allotropes of an unalloyed iron-cementite system. The unalloyed iron-cementite phase system illustrated in FIG. 14 is used herein to illustrate and explain essential concepts of the present method. Point A in FIG. 14 illustrates the eutectoid point at 727 degrees Celsius of the iron-cementite. Below the austenitic lines D and E, but above the critical temperature a fraction of the microstructure of the steel will be converted into austenite (with the other materials being ferrite and cementite). The austenitic lines D and E define the bottom extreme of the fully austenitic zone B.

Suitable steels for the heat-treating steps described in Steps 104 and 106 have similar phase diagrams to FIG. 14. Depending on the presence of additional alloying elements in the steel (such as Cr, V, Bo, and Ni), the critical temperature (and other physical properties of the steel) can be higher or lower than that of unalloyed iron-carbon as shown in FIG. 14 and can occur at a different carbon content. Suitable steels for the method described in FIG. 14 include other hardenable carbon steels (capable of the austenite to martensite conversion described as a part of the process 100).

In some embodiments of the present method of manufacture, the entire volume of the steel is converted into austenite, such as would occur when the steel is held above the critical temperature long enough for near-equilibrium conditions to be met. FIG. 14 illustrates the fully austenitic phase at Zone B. Point C represents the maximum solubility of carbon and iron within the austenite phase (2.03 wt. %). Thus, for a complete or substantially complete conversion of the steel into austenite, the steel cannot include more than the maximum carbon content (this maximum solubility level can be varied based on the presence of other alloying metals in the carbon steel).

Step 104 can include elevating the temperature of the steel of the sliding component and holding it at a temperature above the critical temperature for an austenitizing time to substantially complete a transformation of the steel into austenite from cementite (Fe3C) and/or ferrite alpha-phase iron (a). In some embodiments of the method, the component is held above the critical temperature for 95% of the steel to be converted into austenite. Depending on the mass and geometry of the component, an austenite conversion time may be higher or lower. Typically, the austenitizing time is 1 hour. The following chart for the sliding component parts of joint 10 illustrates exemplary critical temperatures at which 95% of the steel is converted into austenite within 1 hour.

| Sliding Component | Temperature (Celsius) | Material |
| --- | --- | --- |
| Housing Half 24 | 815 | SAE 4340 |
| Housing Half 26 | 815 | SAE 4340 |
| Followers 16, 18 (together) | 871 | 300M |
| Pivot Member 22 | 871 | 300M |

Austenite has a face centered cubic (FCC) crystalline structure and includes carbon atoms within interstitial vacancies created in the FCC structure. Cooling austenite below the critical temperature allows the austenite to convert into ferrite and/or cementite, a body centered cubic (BCC) crystalline structure, but if the cooling is slow enough for the carbon in austenite to diffuse out of the austenite and combine with iron atoms and other carbon atoms to form ferrite or cementite. In such cases, the ferrite and cementite form in alternating lamellar layers known as bainite or pearlite.

Step 106, on the other hand, comprises cooling the formed austenite faster than the carbon atoms can diffuse out of the austenite into either ferrite or cementite. As a result of fast quenching, the austenite converts into martensite, a non-equilibrium phase iron alloy that traps the excess carbon atoms within microvoids in the martensitic crystal structure before they can diffuse out of the austenite and form either cementite or ferrite.

Figure 15:
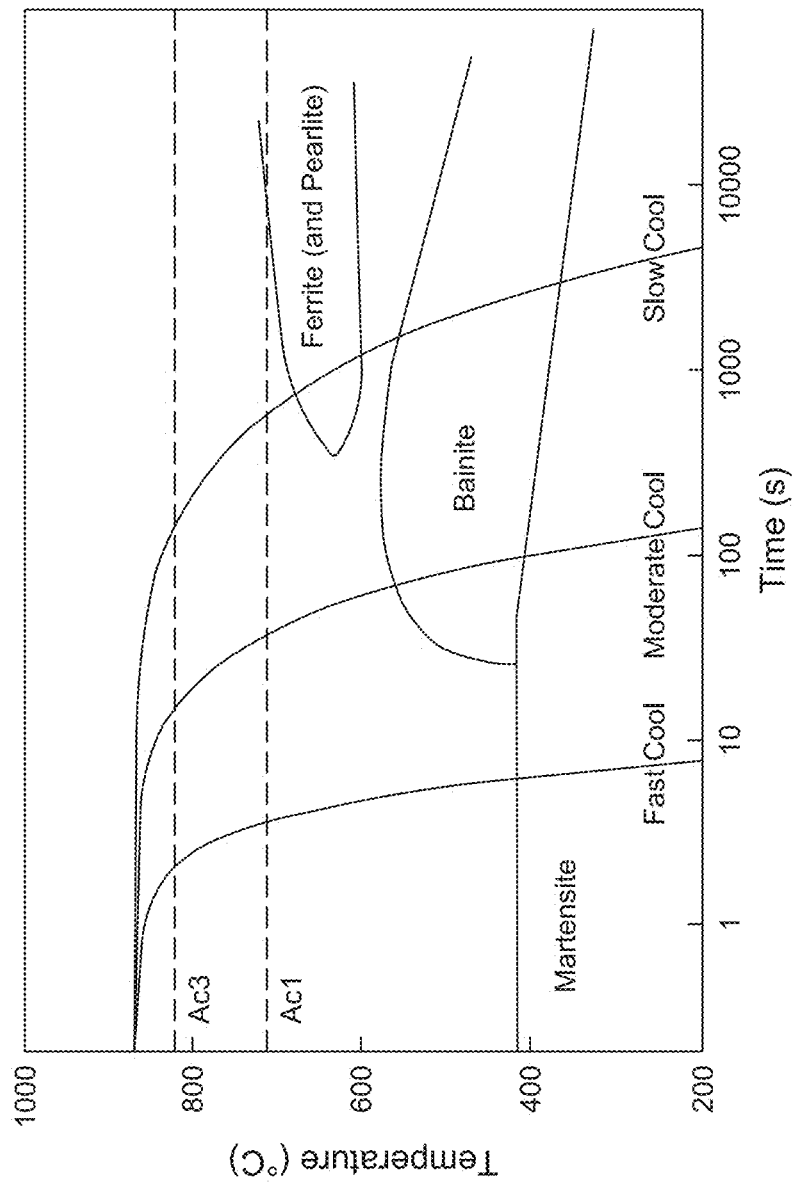
FIG. 15 illustrates a continuous cooling transformation (CCT) diagram of a carbon steel.

FIG. 15 illustrates an exemplary CCT (Continuous Cooling Transformation) diagram for a carbon steel. Such CCT diagrams are used to select quench rates for specific steels held at austenizing temperatures based on the desired microstructure of the steel. As illustrated in FIG. 15, cooling steel in an austenitic phase at a rate slower than approximately 50° (C)/sec results in a significant formation of a bainite microstructure. Such results can be typically obtained through oil quenching, air quenching, or furnace cooling. Cooling the steel in an austenite phase at a rate faster than approximately 50° (C)/sec substantially avoids the formation of a bainite microstructure in favor of a martensitic microstructure. Such results can be typically obtained through water quenching or similar fast quench materials. Each carbon steel used in the manufacture of the joint 10 has its own unique CCT diagram from which appropriate cooling rates for quenching the steel in an austenitic phase to form martensite can be derived.

Figure 16:
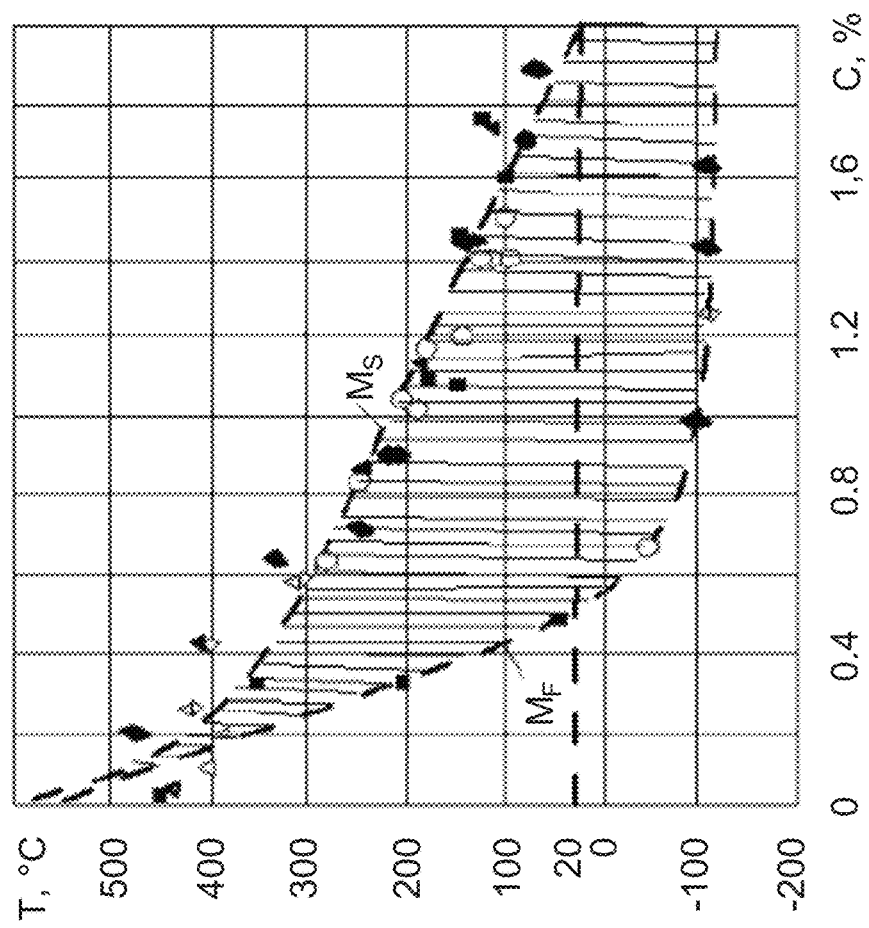
FIG. 16 illustrates a martensite start (MS) temperature martensite final (MF) temperature chart for a carbon steel, up to 2.0 wt. % carbon.

With continued reference to FIG. 15, as a part of step 106, the sliding component is cooled quickly below a martensitic start temperature (MS) at which point austenite begins to convert into martensite and below which additional austenite is converted into martensite until a martensitic finish temperature (MF) is reached. FIG. 16 illustrates a martensite start (MS) temperature and martensite final (MF) temperature chart for an unalloyed iron-cementite system, up to 2.0 wt. % carbon.

Ideally, the MS temperature (and subsequently the MF temperature) is reached as quickly as possible to limit the amount of pearlite or bainite formed along the grain boundaries of the austenite as illustrated in FIG. 16. The conversion of austenite to martensite is seldom perfect and can be substantially lower than a complete transformation. In some embodiments of Step 106, at least 95% of the microstructure of the steel is converted into martensite (as used herein, the % symbol alone refers to % volume).

The MS and MF temperatures also vary greatly, depending on the alloy properties (including carbon content) of the steel type. For example, for some carbon contents of steel, as illustrated in FIG. 16, the MF temperature is below room temperatures (approximately 20° (C)). Thus, the complete transformation of austenite into martensite cannot be complete by cooling to room temperature. Moreover, even when the MF temperature is reached by the time the steel is quenched to room temperature, the steel can still include retained austenite because of mechanical stresses within the martensitic microstructure. The resulting martensitic structure of the steel can include as much as 17% retained austenite to as little as 3% or lower. Completion of the martensitic conversion is addressed further below in relation to Step 110 directed to cryogenic temperature treatment.

Step 108 comprises tempering the selected component below the critical temperature. By tempering below the critical temperature, the martensitic microstructure created within the steel by the above steps cannot be converted back into austenite. However, internal stresses from the creation of martensite can be relieved through tempering. In addition, precipitated eta-carbides can be grown within defects in the martensitic structure, and any remaining austenite can be decomposed into cementite through tempering. This tempering decreases the brittleness of the selected component and increases its ductility and toughness while maintaining the same martensitic structure. Depending on the desired hardness of the sliding components, the temper temperature and temper time can be selected to achieve maintain that desired hardness. For example, after quenching in water, 4340 steel can have a hardness of a maximum of approximately 60 HRC. After tempering at 550° C.) for one hour, the hardness can be reduced to approximately 40 HRC.

Generally selecting greater temper temperatures and greater temper times creates components having greater toughness and less hardness and therefore less wear resistance. In some embodiments of the present disclosure where the follower or followers 16, 18 are tempered at higher temperatures and/or longer than the housing halves 24, 26. Thus, the wear resistance of the more complex housing half components can be controlled relative to the wear resistance of the follower or followers 16, 18 that are more easily manufactured. In some embodiments, the hardness of either of the tempered housing halves 24, 26 is greater than the hardness of the outer surfaces 16A, 18A of the followers, 16, 18. In some embodiments, the hardness of either of the tempered housing halves 24, 26 is at least 2, 3, or 5 points greater on the Rockwell Hardness scale than the hardness of the outer surfaces 16A, 18A of the followers, 16, 18.

In some embodiments of the present disclosure the housing halves 24, 26 are tempered at higher temperatures and/or longer than the outer spherical surface 52 of the pivot member 22. Thus, the wear resistance of the pivot member 22 can be controlled relative to the wear resistance of the housing halves 24, 26 that wear less quickly. In some embodiments, the hardness of either of the tempered outer spherical surface 52 is greater than the hardness of the inner spherical surfaces 28, 30 of the housing halves 24, 26. In some embodiments, the hardness of outer spherical surface 52 is at least 2, 3 or 5 points greater on the Rockwell Hardness scale than the hardness of the inner spherical surfaces 28, 30.

In some embodiments, the heat-treating method can end after Step 108. For example, steels having a MF temperature above room temperature will have ostensibly completed the martensitic transformation by cooling to room temperature. As such, further treatment can be unnecessary once the desired hardness of the sliding components is reached. However, in some embodiments, further treatment using cryogenic methods can impart additional advantages to the resulting sliding components as described below (including to those steels with a MF temperature above room temperature). As such, in some embodiments Step 108 can be performed before or after Steps 110 and 112.

The heat treatment steps of the process 100 can be used to create the differential hardnesses of the sliding surfaces as described above in the context of the joint 10. Equally the steps of the process 100 can be used to create the differential hardnesses of the sliding surfaces for the joints 10a and other joints described herein.

Another aspect of the present disclosure is the realization that the effective service life of a joint can be extended and/or the dynamic loading capacity of the joint can be increased by the application of cryogenic treatments to the sliding components of the joint 10 (housing halves 24, 26, follower or followers 16, 18, and pivot member 22). Through the application of the manufacturing steps described below and in relation to FIG. 12, the inner surfaces 40A-46A, the inner spherical surfaces 28, 30, and/or the outer spherical surface 52 of the pivot member 22 can be made more wear resistant by reducing the amount of retained austenite and by achieving a more uniform martensitic grain structure. FIG. 12 further illustrates manufacturing steps to apply a cryogenic treatment to the sliding components of the joint 10. These steps can be applied variously to any or all the sliding-wear components of the rotational connecter 10, namely the first and second housing halves 24, 26 and the pivot member 22. Thus, in some embodiments, the sliding components as discussed below can include the first and/or second housing halves 24, 26 and the pivot member 22. The sliding components for the cryogenic treatment are referenced herein as the components of the joint.

Step 110 comprises further cooling the components to below room temperature to a cryogenic temperature. Effective cryogenic temperatures can be as low as −115° C. or −184° C. Cooling the components within the cryogenic temperature range continues the conversion of retained austenite to martensite to form a more complete martensitic matrix. Retained austenite acts as a weak spot within the matrix of the martensite and reduces the overall resistance of the material to compressive loading and renders it more susceptible to cracking. Minimizing or removing the retained austenite improves wear properties on surfaces by creating a more uniform martensitic structure and dispersing other alloy elements that can be present within the matrix by reducing the solubility of these elements within the matrix. The net effect of these changes is to create a more stable, and therefore more durable, material.

Sub-room temperatures are not necessary for completing the quench of the steel to below the MF temperature for some steels, as indicated in FIG. 16. Above approximately 0.5 wt. % Carbon, room temperature is below the MF temperature of the steel, indicating completion of the martensitic transformation. Thus, cryogenic treatment is required to reach the MF temperature for these steels. However, cryogenic treatment has benefits even for these steels that do not require cryogenic temperatures to complete the martensitic transformation. A steel can contain retained austenite that is not converted into martensite, despite having reached the MF temperature. Cryogenic treatment can be used to fully convert or minimize this retained austenite, the benefits of which have just been discussed above. Furthermore, cryogenic treatment precipitates microfine eta-carbides within microvoids of the martensitic structure, closing the grain structure and adding compressive strength and density to the steel and improving its wear resistance.

Step 112 comprises maintaining the selected component below the cryogenic temperature for an effective bath time. Because of the slow transformation rate of the retained austenite to martensite at cryogenic temperatures, bath times can be for between 12 and 24 hours or more, with a minimum of approximately 8 hours. Moreover, cooling components to cryogenic temperature requires controlled temperature drops to avoid rapid changes in the component's temperature that risk creating cracks in the component. An exemplary temperature profile for cryogenic hardening gradually drops the temperature of the component from room temperature to below −184° C. for the first 6 hours of the process; holds the temperature for approximately 12 hours and then gradually raised the temperature back to room temperature over the next six hours. In another example, the temperature of the component is dropped gradually below −115 hours and held between 8 and 24 hours before gradually being returned to room temperature.

Figure 13:
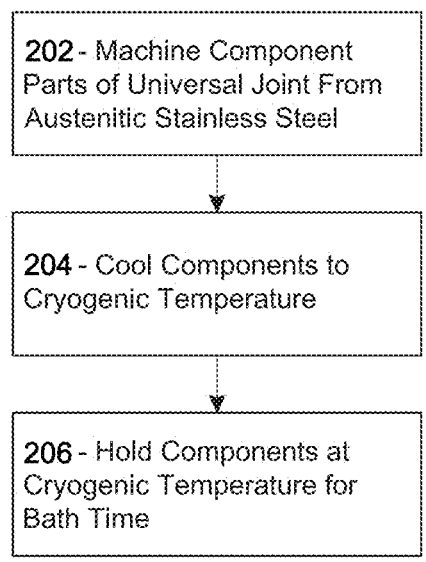
FIG. 13 illustrates a process of cryogenically treating the sliding components of a joint when made from austenitic stainless steel.

In some embodiments of the cryogenic treating process, austenitic stainless steel is used as outlined in FIG. 13 showing an austenitic stainless steel process 200 for hardening austenitic stainless steels. Austenitic stainless steels contain high amounts of nickel and chromium. For example, SAE 304 contains 17.5% chromium and 8-11% nickel, among other alloying elements. Austenitic stainless steels exhibit austenite as their primary phase at room temperature and thus are not hardenable by heat treatments. Nonetheless, cryogenic treatment of components made from austenitic steel exhibit improved wear and load capacities compared to untreated austenitic steels. The cryogenic treating process, for example precipitate carbides within the austenitic microstructure and thereby improves toughness without losing hardness.

Step 202 comprises manufacturing the components of the joint as described herein using conventional manufacturing and machining methods (e.g., as described in relation to Step 102) and using an austenitic stainless steel for at least one of the sliding components. Appropriate austenitic steels include, but are not limited to, Nitronic 50, SAE 304 SS, and SAE 316 SS.

Step 204 comprises further cooling the components to below room temperature to a cryogenic temperature. Effective cryogenic temperatures can be as low as −115° C. or −184° C., as described above.

Step 206 comprises maintaining the selected component below the cryogenic temperature for an effective bath time. Bath times can be for between approximately 12 and 24 hours or more. Moreover, cooling components to cryogenic temperature requires controlled temperature drops to avoid rapid changes in the component's temperature that risk creating cracks in the component. An exemplary temperature profile for cryogenic hardening gradually drops the temperature of the component from room temperature to below −184° C. for the first 6 hours of the process; holds the temperature for approximately 12 hours and then gradually raised the temperature back to room temperature over the next six hours. In another example, the temperature of the component is dropped gradually below −115 hours and held between 8 and 24 hours before gradually being returned to room temperature.

The above methods and steps comprising cryogenic hardening impart distinct and beneficial properties on the sliding components of the joint 10. For example, cryogenic hardening has the effect of increasing wear resistance, increases hardness and toughness, and/or reducing the coefficient of friction of the surfaces of the sliding components. For example, the cryogenic hardening steps of the processes 100 and 200 can be used to create the differential hardnesses of the sliding surfaces as described above in the context of the joint 10. Equally the austenitic stainless steel process 200 can be used to create the differential hardnesses of the sliding surfaces for the joints 10a and other joints described herein.

Vapor deposition coatings can include physical vapor deposition (PVD), chemical vapor deposition (CVD) and similar processes such as low-pressure chemical vapor deposition and plasma-assisted chemical vapor deposition. Furthermore, PVD describes many different coating processes that take place within a vacuum or near-vacuum and generally involve the bombardment of a substrate with positively charged ions. Various reactive gases can also be introduced into the vacuum chamber to create chemical compound coatings. As such, the coating depth, composition, and bonding can be highly tailored for specific applications. PVD industrial coatings include titanium nitride, zirconium nitride, chromium nitride, aluminum nitride, all of which are appropriate for steels.

CVD is also conducted within a CVD reactor with specific atmosphere types and at elevated temperatures (approximately 1000° C.). In CVD, the surface of a substrate is heated and a thin-film coating is formed on the surface as the result of reactions between the surface and various gaseous phases within the CVD reactor. CVD industrial coatings for wear resistance include titanium carbide, titanium nitride, aluminum oxide, aluminum titanium nitride, chromium carbide, chromium nitride, molybdenum disulfide, niobium carbide, titanium aluminum nitride, titanium carbon nitride, and zirconium nitride coating.

According to some aspects of the method of manufacture of a joint described herein, vapor deposition coatings, including PVD and CVD, can be applied to the any of the outer surfaces 16A, 16B of the followers 16, 18 and/or any combination of the inner surfaces 40A-46A of the notches 40-46 of the housing halves 24, 26. The wear between the sliding components of the joint can thus be reduced, improving service life and reliability of the joint. In addition, the outer surface 52 of the pivot member 22 can be coated and/or the inner spherical surfaces 28, 30 of the housing halves 24, 26. Thus, the wear resistance of the more complex or more expensive to produce sliding components can be controlled relative to the wear resistance of the less expensive or cheaper to produce sliding components.

In some embodiments of the method of manufacture of a joint described herein, the coating hardness of the sliding components can be 64 HRC. In other embodiments, the coating hardness of the sliding components can be found within the ranges in the table below.

| Joint Component | Coating Hardness Range (HRC) |
|---|---|
| inner (cylindrical surfaces) 40A-46A | 60-68 |
| inner (spherical surfaces) 28, 30 | 60-68 |
| outer (cylindrical surfaces) 16A, 18A | 60-68 |
| outer (spherical) surface 52 | 60-68 |

In addition to the heat treating, cryogenic, and vapor deposition methods described above (and combinations of these methods), some embodiments of the method of manufacture can further comprise the methods of case hardening and/or shot-peening of the sliding components. Each of these methods enhances the wear resistance and hardness of the sliding surfaces of the sliding components.

Case-hardening comprises hardening the outer surface of the sliding components and allowing the metal underneath to remain softer and more ductile. Case hardening can also infuse additional carbon into the outer surface layer, enabling it to reach higher hardness than other possible for low-carbon content steels. Case hardening can be performed through various methods such as but not limited to using flame or induction hardening, carburizing (for low-carbon content steels), and nitriding. Because of the minimal distortions caused by case-hardening, the sliding components of the joint can be case-hardened after being machined. Referring to FIG. 12 and the process of heat treating carbon steel outlined above, case-hardening can be performed after the machining Step 102 and the part has been shaped into its final form. For example, any or all of the components of the joint 10 or 10a can be nitrided to improve the wear properties thereof (e.g., surfaces of the sliding components). In one exemplary process of nitriding, the components are heated to between 482-621° C. (900-1,150° F.) (for steel parts) and exposed to a nitrogen rich gas in the form of ammonia (NH3). When ammonia contacts the heated component it dissociates into nitrogen and hydrogen and diffuses into the surface in the form of a nitride layer. The case hardening can occur after the components are quenched, tempered and/or machined because it causes little to no distortion.

Shot peening produces a compressive residual stress layer in a surface of a component and increases the hardness of the surface. The method includes impacting the surface with shot (metallic, glass, or ceramic particles) with sufficient force to create minor plastic deformation and is considered a cold working process. Methods of shot peening include, but are not limited to propelling shot using centrifugal blast wheels and air jets. Because of the minimal distortions caused by shot peening, the sliding components of the joint can be shot peened after being machined. Referring to FIG. 12 and the process of heat treating carbon steel outlined above, shot-peening can be performed after the machining Step 102 and the part has been shaped into its final form.

Third Embodiments of a Universal Joint

FIGS. 17-25 illustrate another embodiment of a joint 300. Joint 300 can include a housing 330, a drive puck 370, a drive ball 350, a pin 380 and a cap ring 390, in addition to various fasteners, as described below. Like the joints 10 and 10a, the joint 300 can couple together a first shaft and a second shaft (not shown) such that rotation of the first shaft about its longitudinal axis matches rotation of the second shaft about its longitudinal axis. For example, rotation of the first shaft can match rotation of the second shaft in a 1:1 ratio.

The first shaft can be coupled with the housing 330. The second shaft can be coupled with the drive ball 350. The drive ball 350 can be coupled with the housing 330 by the drive puck 370 and the pin 380. The drive puck 370 can couple with the housing 330 and rotate with respect to the housing 330 in a first plane. The drive ball 350 can be coupled with the drive puck 370 and thereby rotate with respect to the housing 330 in the first plane. The drive ball 350 can be coupled with the drive puck 370 by the pin 380 and rotatable about the pin 380 with respect to the drive puck 370 in a second plane. In this manner, the drive ball 350 can be rotatable with respect to the housing 330 in both the first and second planes. In some embodiments, the first and second planes are substantially orthogonal to each other.

A longitudinal axis of the drive ball 350 can be set at an angle 317 with respect to a longitudinal axis of the housing 330, as illustrated in FIG. 18. Angle 317 can be created by rotation of the joint 300 about either the drive puck 370 and/or the pin 380. In this manner, the first shaft can be angled with respect to the second shaft as the first and second shaft rotate together. In some embodiments, angle 317 can be adjusted between approximately 0° and a maximum of approximately 45° to 50°. In some embodiments of the joint 300 (e.g., where the first and second shaft are braced), that angle 317 is maintained as rotation from the first shaft is transferred across the joint 300 into the second shaft. Angle 317 can be maintained as the joint 300 rotates by corresponding rotations of the drive ball 350 about the pin 380 and by rotation of the drive puck 370 with respect to the housing 330.

Figure 20:
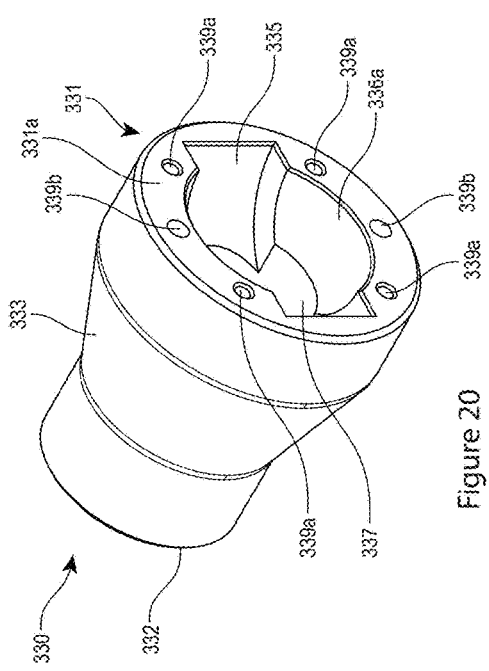
FIG. 20 is a perspective view of a housing of the joint shown in FIG. 17.
Figure 21A:
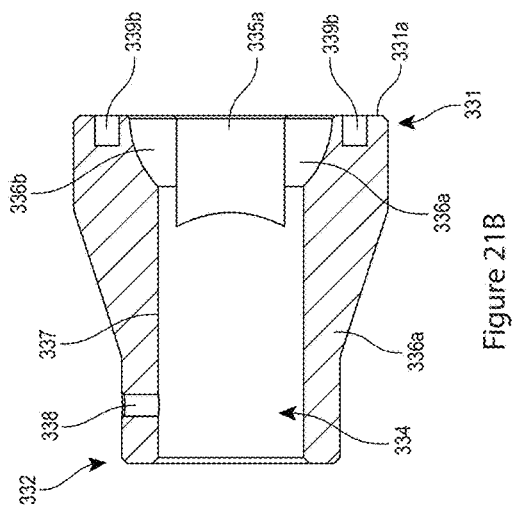
FIG. 21A is a top view of the housing shown in FIG. 19.
Figure 21B:
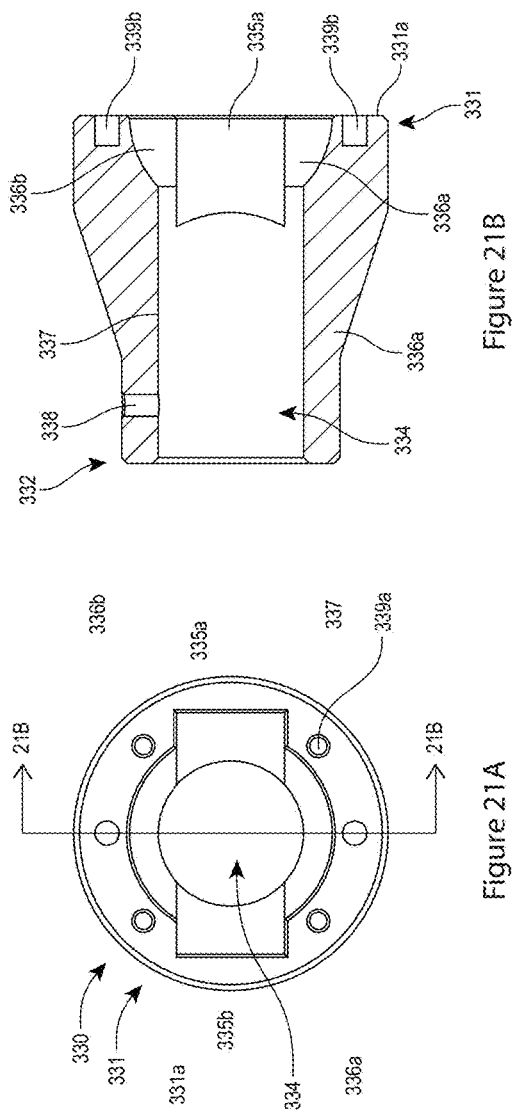
FIG. 21B is a section view along the line A-A in FIG. 21A.
Figure 26:
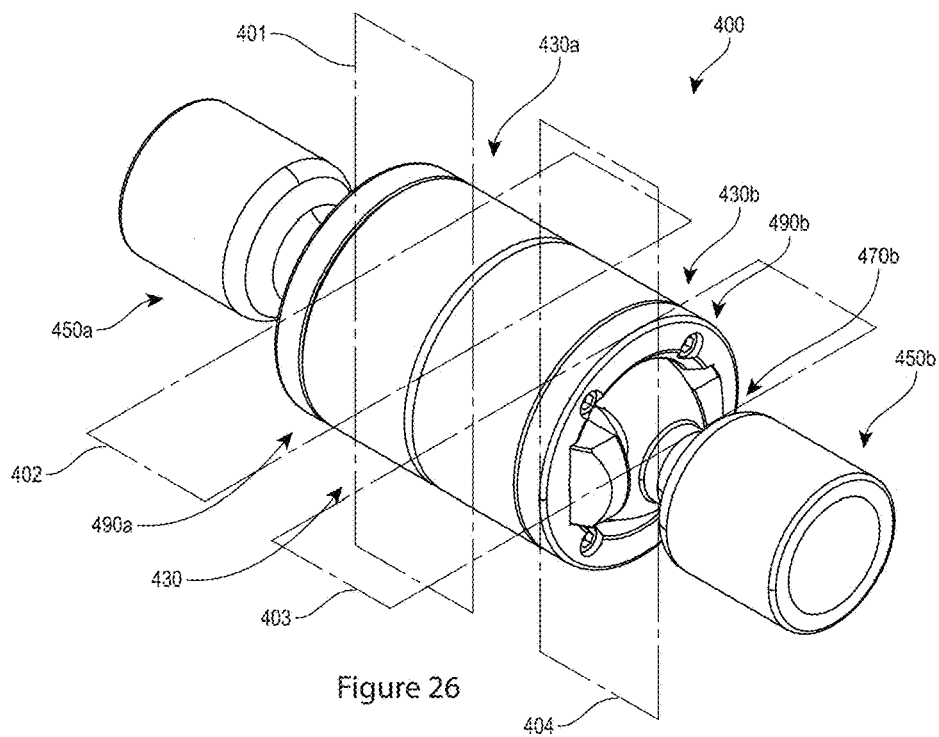
FIG. 26 is a perspective view of a fourth embodiment a joint.

As shown in detail in FIGS. 20-21, the housing 330 can include a housing body 333 with a first end 331 and a second end 332. The housing body 333 can be tubular in nature and an inner wall 337 of the housing body 333 can define an inner space 334. In some embodiments, the inner space 334 extends between the first end 331 and the second end 332 (e.g., through the housing body 333). The second end 332 can include an opening to the inner space 334. The opening can be circular, square, rectangular, hexagonal, or any other suitable shape. The second end 332 can be configured to be coupled with the first shaft of the joint 300. For example, the inner wall 337 of the housing at the second end 332 can include splines that can securely couple with an end of the first shaft. In some embodiments, second end 332 can include tapered hole 338 through which a set screw can be inserted to secure the end of the input shaft within the second end 332.

The first end 331 of the housing 330 can include a channel 335. The channel 335 can be formed on the inner surface 337 of the housing body 333. The channel 335 can comprise a cylindrical bottom surface. The cylindrical bottom surface can be oriented around a single axis of rotation. The single axis of rotation can be located at the first end 331 of the housing 330. The cylindrical bottom surface can be divided into a first channel surface 335a and a second channel surface 335b. The first and second channel surfaces 335a, 335b can be separated by the inner space 334. First and second sidewall surfaces 335c, 335d can extend from the cylindrical bottom surface to further define the channel 335. The sidewall surfaces 335c, 335d can be set at approximately a right angle with the cylindrical bottom surface. The first and second channel surfaces 335a, 335b can each interface with the first end 331 of the housing 330 at an equatorial line of the cylindrical bottom surface (dividing the cylindrical bottom surface in half).

The first end 331 of the housing 330 can further include a concave spherical surface 336. The spherical surface can be disposed within the housing wall 333 adjacent to the opening of the first end 331. The spherical surface 336 can include a partial surface segment or segments of a sphere. The sphere can be centered at the same point as the single axis of rotation defining the channel 335. The spherical surface 336 can include first and second spherical surfaces 336a, 336b. The first and second spherical surfaces 336a, 336b can be divided by the inner space 334. The first and second spherical surfaces 336a, 336b can each interface with the first end 331 of the housing 330 at an equatorial line of the spherical surface 336.

The first end 331 of the housing 330 can include an interface surface 331a. The cap ring 390 can couple with the housing 330 at the interface surface 331a. The first end 331 can include one or more tapped holes 339a. The cap ring 390 can include one or more corresponding through holes 398 (shown in detail in FIGS. 22A-C) through which one or more screws can be inserted to couple the cap ring 390 with the first end 331 of the housing 330. In some embodiments the first end 331 of the housing 330 can include four tapped holes 339a that are set in a square configuration. The square configuration allows for a stable connection with four sides of the cap ring 390.

For alignment purposes, the interface surface 331a and the cap ring 390 can include one or more posts or recesses 339b. The one or more posts or recesses 339b on the interface surface 331a can correspond to one or more corresponding posts or recesses 393a, 393b on the cap ring 390. The posts or recesses 393a, 393b can function to align the first end 331 of the housing 330 with the cap ring 390 for assembly of the cap ring 390 with the first end 331 of the housing 330.

The cap ring 390 can include first and second faces 391a, 391b. The second face 391b can be planar in nature. The cap ring 390 can include the one or more through holes 398 for receiving screws to attach the cap ring 390 with the housing 330. In some embodiments the screw holes 398 include counter sunk portions such that screws can be flush with the first face 391a of the cap ring 390.

The cap ring 390 can further include first and second channel segments 397a, 397b. The channel segments 397a, 397b can be cylindrical in shape. In some embodiments the channel segments 397a, 397b are disposed on opposite sides of the cap ring 390 from each other. The channel segments 397a, 397b can interface with the second face 391b at an equatorial line.

The cap ring 390 can further include a concave spherical surface 394. The concave spherical surface 394 can interface with the second face 391b at an equatorial line of the concave spherical surface 394. There can be one or more concave spherical portions 394 on the cap ring 390. For example the cap ring 390 can include first and second concave spherical surfaces 394a, 394b. In some embodiments these surfaces are disposed on opposite sides of the cap ring 390 divided by the channel segments 397a, 397b.

The cap ring 390 can include a central opening 392. Central opening 392 can be generally circular in nature. The channel segments 397a, 397b can be disposed around the central opening 392 (e.g., on opposite sides of the central opening 392), some embodiments of the cap ring 390 can include a chamfer 395 between the first surface 391a and the central opening 392.

The drive puck 370, shown in detail in FIGS. 23A-B, can include an outer surface 372. The outer surface 372 can have a circular profile when viewed from the top, as in FIG. 23B. The outer surface 372 can be a cylindrical surface that is disposed about a central axis. The drive puck 370 can further include first and second wings 375a, 375b. The drive puck 370 can further include an inner slot 373. The first and second wings 375a, 375b can be disposed on opposite sides of the inner slot 373. The inner slot 373 can include first and second sidewalls 374a, 374b. The first and second sidewalls 374a, 374b can be disposed opposite each other within the inner slot 373.

In some embodiments one or both of the sidewalls 374a, 374b comprise planar portions. The planar portions of the first and second sidewalls 374a, 374b can be substantially parallel to each other. A shaft 377 can extend through either one or both of the first and second wings 375a, 375b. The shaft 377 can extend through the first and second wings 375a, 375b or the planar portions of the first and second wings 375a, 375b, in some embodiments. An upper face 376a of the drive puck 370 can be substantially planar. A lower face 376b of the drive puck can also be substantially planar and substantially parallel to the upper face 376a. In some embodiments one or both of the first and second sidewalls 374a, 374b are set at right angles with either one or both of the upper and lower faces 376a, 376b.

The drive puck 370 can be slidingly engaged within channel 335 of the housing 330. The outer surface 372 of the drive puck 370 can correspond to the first and second channel surfaces 335a, 335b. For example the drive puck 370 can be disposed within the channel 335 and configured to rotate by sliding against the first and second channel surfaces 335a, 335b. Thereby the drive puck 370 can rotate substantially in a single plane of motion within the channel 335.

The drive ball 350, shown in detail in FIGS. 24A-24C can include a ball end 351 and a socket end 353. The ball end 351 and the socket end 353 can be coupled together by a neck portion 355. The ball end 351 can include a convex spherical surface 352. The ball end 351 can further include a shaft 357 disposed through the ball end 351. The ball end 351 can include one or more planar regions 358a, 358b. For example the ball end 351 can include first and second planar regions 358a, 358b. The planar regions 358a, 358b can be disposed on opposite sides of the ball end 351 and can be substantially parallel to each other. In some embodiments, the shaft 357 extends through the planar regions 358a, 358b.

The socket end 353 can include a socket 353a. In some embodiments, the socket 353a can be configured to be coupled with the second shaft of the joint 300. For example the socket 353a can include splines and a tap screw for holding the output shaft within the socket 353a. The socket 353a can be circular, square, rectangular, hexagonal, or any other suitable shape. In other embodiments the socket end 353 is a male connector or any other type of connector coupling the drive ball 350 with the second shaft. The outer surface of the socket end 353 can be cylindrical or any other suitable shape.

The pin 380 can be generally cylindrical in shape, as shown in detail in FIGS. 25A-C. The pin 380 can include first and second sides 381, 382 with first and second ends 381a, 382a, respectively. The first and second sides 381, 382 can be separated, in some embodiments, by a depression 383.

The joint 300 can be assembled by inserting the ball end 351 within the inner slot 373 of the drive puck 370. The drive puck 370 can be pivotally coupled with the ball end 351 of the drive ball 350 with the pin 380. The pin 380 can be inserted through the shaft 377 and through the shaft 357. In some embodiments the ball end 351 can further include a set screw for securing the pin 380 within the shaft 357. The set screw is inserted through tapered hole 359 on the ball end 351 of the drive ball 350. A tip of the set screw can be inserted into the depression 383 of the pin 380 and thereby maintain it within the shaft 357. Alternatively, the set screw can contact an outer surface of the pin 380.

The pin 380 can also be inserted into the shaft 377 of the drive puck 370 to couple the drive puck 370 with the drive ball 350. The first and second sides 358a and 358b of the ball end 351 of the drive ball 350 can align with and slidingly engaged with the inner sidewalls 374a and 374b of the inner slot 373 of the drive puck 370. The sliding interface of the sidewalls and the first and second surfaces 358a and 358b can provide stability to the rotation of the drive ball 350 with respect to the drive puck 370. Further the inner slot 373 allows for a simple insertion of the ball end 351 within the inner slot 373 and disposing the drive puck 370 around the ball end 351.

The inner sidewalls 374a and 374b of the inner slot 373 are thus an improvement from a manufacturing standpoint over the inner spherical surfaces 48, 50 of the followers 16, 18 of the joint 10 described above that mate with the outer spherical surface 52 of the pivot member 22. Machining the inner sidewalls 374a and 374b of the inner slot 373 (or the first and second surfaces 358a and 358b of the drive ball 350) takes much less machining time than the inner surfaces 48, 50. The drive puck 370 can be manufactured with less specialized equipment and processes than the followers 16, 18. For example, the inner sidewalls 374a and 374b of the inner slot 373 can be manufactured using an end mill and removing material to form flat planes.

The concave spherical surface 336 can be slidingly engaged with the convex spherical surface 352 of the drive ball 350. When assembled together the components of the joint 300 of the ball end 351 with the convex spherical surface 352 can be slidingly engaged with the concave spherical surface 336 of the housing 330. Thereby compressional loads from between the housing 330 and the drive ball 350 can be distributed at least partially through the concave spherical surface 336 and the convex spherical surface 352.

The drive puck 370 can be inserted within the first end 331 of the housing 330 and inserted within the channel 335. The outer surface 372 can be slidingly engaged with the channel 335. The first and second faces 376a, 376b of the drive puck 370 can correspond and slidingly engage with the sidewalls of the channel 335. This configuration can provide stability for the drive puck 370 as it rotates in a single plane within the channel 335. The rotation of the drive puck 370 within the channel 335 can be substantially in the first plane. The rotation of the drive ball 350 about the pin 380 within the drive puck 370 can be substantially in the second plane. The first and second planes can be set orthogonal to each other.

The cap ring 390 fits over the drive ball 350 and against the first end 331 of the housing 330. The first and second concave spherical surfaces 394a, 394b of the cap ring 390 can slidingly engage with the convex spherical surface 352 of the ball end 351 of the drive ball 350. The channel segments 397a, 397b of the cap ring 390 can align with and slidingly engage with the outer surface 372 of the drive puck 370. The second face 391b can be disposed on the interface 331a. This can include alignment of the post or receiving slot 373 of the housing 330 with corresponding slots or receiving posts of the cap ring 390. The cap ring 390 can be coupled with the first end 331 of the housing 330 by inserting one or more screws through the screw holes 398 of the cap ring 390 and into the corresponding tapped holes 339a of the housing 330.

Once assembled the socket end 353 of the drive ball 350 can be pivoted in the first and second planes with respect to the housing 330. In some embodiments, rotation of the socket end 353 with respect to the housing 330 is only limited by its interference with the chamfer 395 of the cap ring 390.

The manufacturing processes described above can also be applied in conjunction with the sliding components and surfaces of the joint 300. For example, the sliding components of the joint 300 (optionally including the housing 330, the cap ring 390, the drive puck 370 and/or the drive ball 350) can be heat treated (including processes 100 and 200), vapor deposition coated, shot-peened, and/or case hardened. Through application of the manufacturing steps described above, the convex spherical surface 352 and the concave spherical surface 394/concave spherical surface 336 can be made more wear resistant and/or the useful life and torque capacities of the joint 10 can be enhanced. Similarly, the channel 335 (optionally including the cylindrical bottom surface and/or the first and second sidewall surfaces 335c, 335d) and the channel segments 397a, 397b and the outer surface 372 can be made more wear resistant and/or the useful life and torque capacities of the joint 10 can be enhanced.

Fourth Embodiments of a Universal Joint

FIGS. 26-30 illustrate another embodiment of joint assembly 400. Joint 400 can include a housing 430 with first and second ends 430a, 430b. Each of the first and second ends 430a, 430b can include a structure similar to the housing 330, drive puck 370, and drive ball 350 described above. The manufacturing processes described above (including processes 100 and 200) can also be applied in conjunction with the sliding components and surfaces of the joint 400.

The joint 400 can include first and second drive pucks, 470a, 470b, first and second drive balls 450a, 450b and first and second cap rings 490a, 490b, in addition to various fasteners. Like the joints 10, 10a, and 300, joint 400 can couple together a first shaft and a second shaft (not shown) such that rotation of the first shaft about its longitudinal axis transfers to rotation of the second shaft about its longitudinal axis. For example, rotation of the first shaft can match rotation of the second shaft.

The first shaft can be coupled with the first drive ball 450a. The second shaft can be coupled with the second drive ball 450b. The first and second drive balls 450a, 450b can be coupled with first and second ends 430a, 430b of the housing 430 by the first and second drive pucks 470a, 470b, respectively. The first drive puck 470a can be coupled with the first end 430a and rotate with respect to the housing 430 in a first plane 401. The first drive ball 450a can be coupled with the first drive puck 470a and thereby rotate with respect to the housing 430 in the first plane 401. The first drive ball 450a can be coupled with the first drive puck 470a by a first pin 480a. The first drive ball 450a can be rotatable about the first pin 480a with respect to the first drive puck 470a in a second plane 402. In this manner, the first drive ball 450a can be rotatable with respect to the housing 430 in both the first and second planes 401, 402. In some embodiments, the first and second planes 401, 402 are substantially orthogonal to each other.

Similar to the first end 430a of the housing 430, the second end 430b can couple with the second drive puck 470b. The second drive puck 470b can be rotatable with respect to the housing 430 in a third plane 403. The second drive ball 450b can be coupled with the second drive puck 470b and thereby rotate with respect to the housing 430 in the third plane 403. The second drive ball 450b can be coupled with the second drive puck 470b by a second pin 480b. The second drive ball 450b can be rotatable about the second pin 480b with respect to the second drive puck 470b in a fourth plane 404. In this manner, the second drive ball 450b can be rotatable with respect to the housing 430 in both the third 403 and fourth planes 404. In some embodiments, the third 403 and fourth 404 planes are substantially orthogonal to each other.

The first drive ball 450a can be rotated to an angle 417 with respect to a longitudinal axis of the housing 430. Angle 417 can be maintained during rotation of the first shaft and joint 400 by rotation of the first drive ball 450a and/or the first drive puck 470a within the first and/or second planes 403, 404, respectively. The second drive ball 450b can be rotated to an angle 418 with respect to a longitudinal axis of the housing 430. Angle 418 can be maintained during rotation of the second shaft and joint 400 by rotation of the second drive ball 450b and/or the second drive puck 470b within the third and/or fourth planes 403, 404, respectively.

An angle 419 between the first and the second shaft can be adjusted between approximately 0° and a maximum of approximately 90° to 100°. In some embodiments of the joint 400, it can be advantageous to create maximum angle of approximately 90°. The angle 419 can be maintained as the joint 400 rotates by corresponding rotations of the first and second drive pucks 470a, 470b within the first and third planes 401, 403 and by rotation of the first and second drive balls 450a, 450b within the second and fourth planes, 402, 404.

In a joint with a single rotational angle (e.g., joints 10, 10a, 300), the rotational speed of the first shaft coupled with the joint does not always match the rotational speed of the second shaft coupled with the joint. Where the angle (e.g., angles 17, 117 described above) between the first and second shaft is substantially zero, the rotational speeds of the first and second shafts match. However at non-zero angles, a fluctuation (e.g., a sinusoidal variation in the rotational velocity) occurs across the joint. For example, first shaft can be angled at 450 with the second shaft and the first shaft can have a constant rotational speed. Here, the rotational speed of the second shaft will fluctuate with respect to the constant speed of the first shaft in a sinusoidal pattern. The greater the angle, the greater the peak of the fluctuating rotational speed. This fluctuating rotational speed can typically be felt as a vibration of the joint during rotation.

To obtain a constant velocity between the first and second shafts, a second angle can be added to the joint to phase out the fluctuations entered at the first angle. In some embodiments of the joint 400, the first and third planes 401, 403 and the second and fourth planes 402, 404 can be substantially orthogonal to each other. This phases the fluctuations entered by each of the angles 417, 418 to be substantially opposite each other. Furthermore, the angles 417 and 418 can be maintained substantially equal to each other such that the magnitude of the fluctuations entered at both angles 417 and 418 will be approximately equal and therefore cancel each out. In such a configuration, the joint 400 can be used as a constant velocity joint with rotation of the first joint matching rotation of the second joint. In other embodiments, the first and third planes 401, 403 (and/or the second and fourth planes 402, 404) can be substantially parallel to each other, but this will not typically result in a constant-velocity joint. In some embodiments, the alignment of the first and third planes can be opposite that conventionally known in a double Cardan joint. In a double Cardan joint, the two universal joints are 90° out of phase at either end of an intermediate shaft and this configuration is a known constant velocity joint. In contrast, some embodiments of the joint described herein are not 90° out of phase at either end of the housing 430 and are substantially in-phase, as described above.

The first and second drive pucks 470a, 470b can have the same structure as described above in relation to the drive puck 370. The first and second drive balls 450a, 450b can have the same structure as described above in relation to the drive ball 350. The first and second drive balls 450a, 450b can include convex spherical surfaces 452a, 452b, first ends 451a, 451b, and second ends 453a, 453b, respectively. The joint 400 can include first and second pins 480a, 480b. The first and second pins 480a, 480b can have the same structure as described above in relation to pin 380.

Figures 27A, 27B:
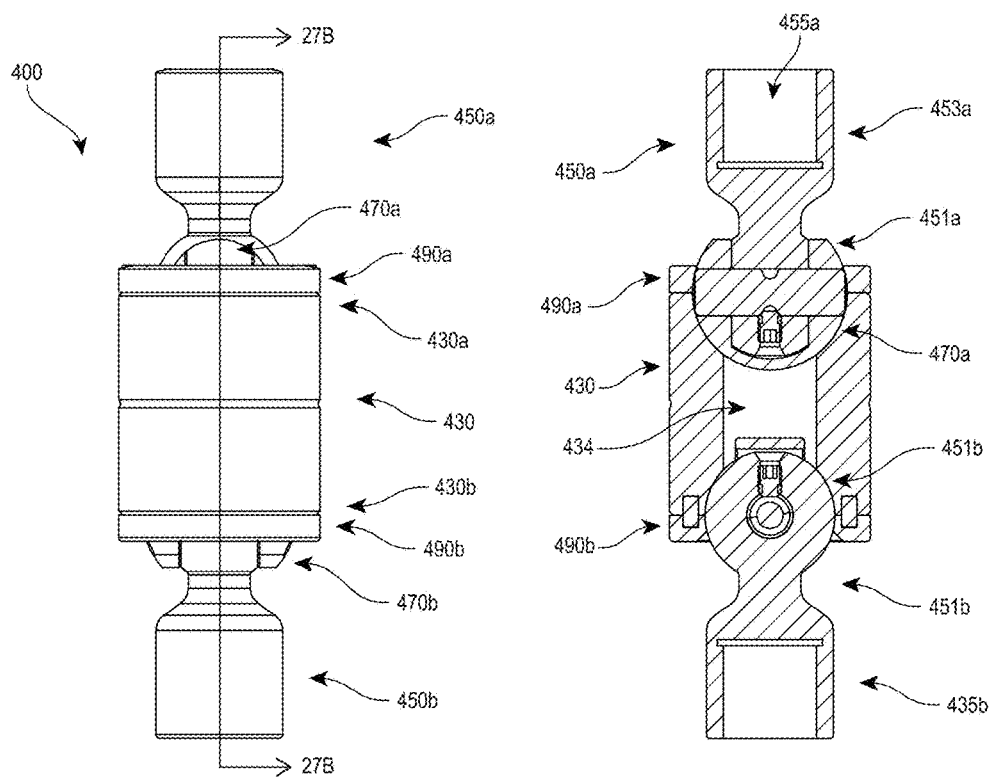
FIG. 27A is a side view of the joint in FIG. 26.
FIG. 27B is a section view along the line D1-D1 in FIG. 27A.
Figure 28A:
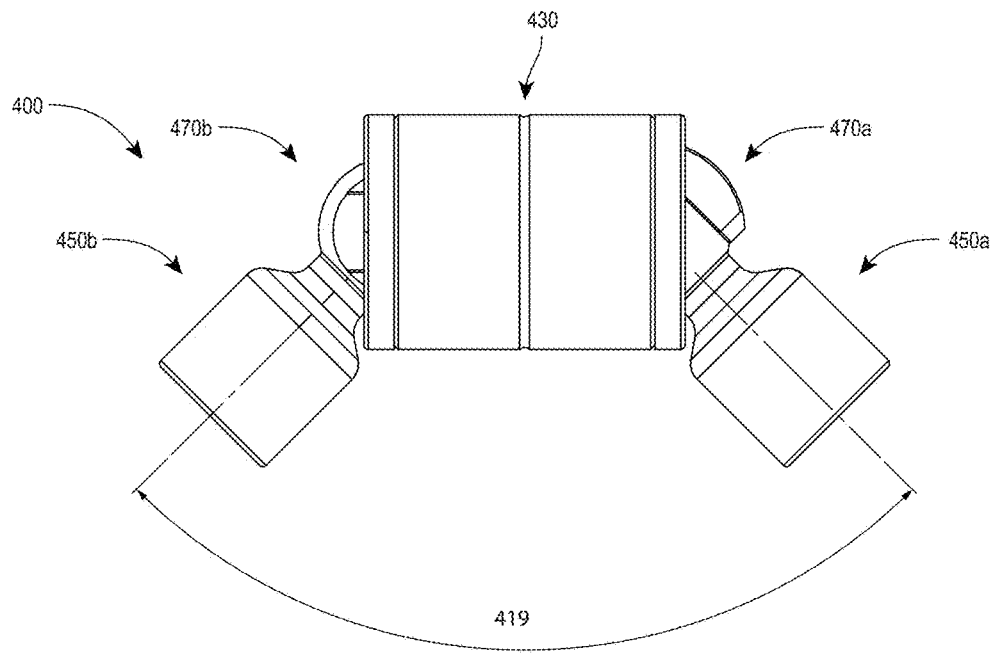
FIG. 28A is a side view of the joint in FIG. 26.
Figure 28B:
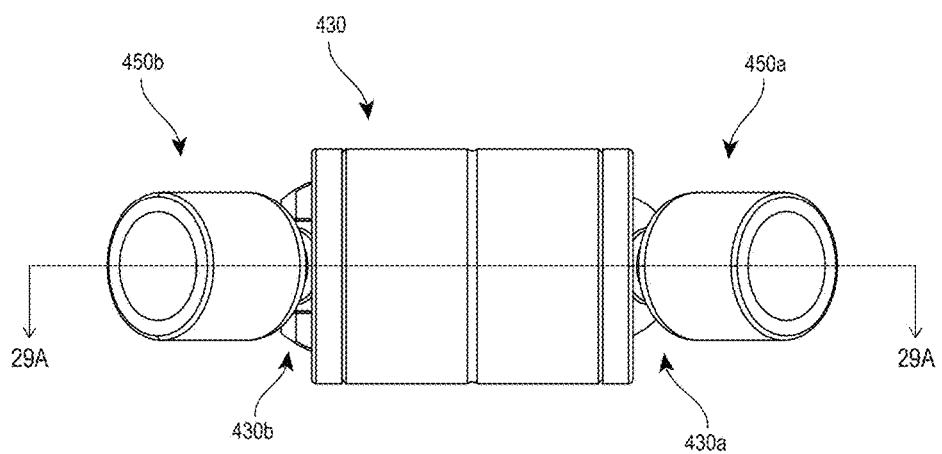
FIG. 28B is a front view of the joint in FIG. 26.
Figure 29A:
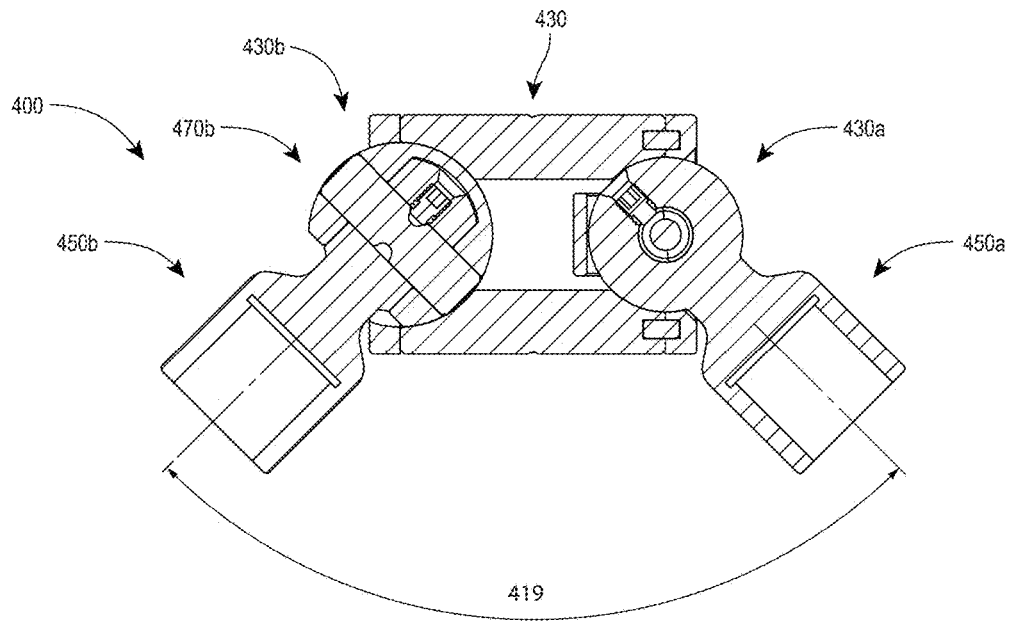
FIG. 29A is a section view along the line D2-D2 in FIG. 28B.
Figure 29B:
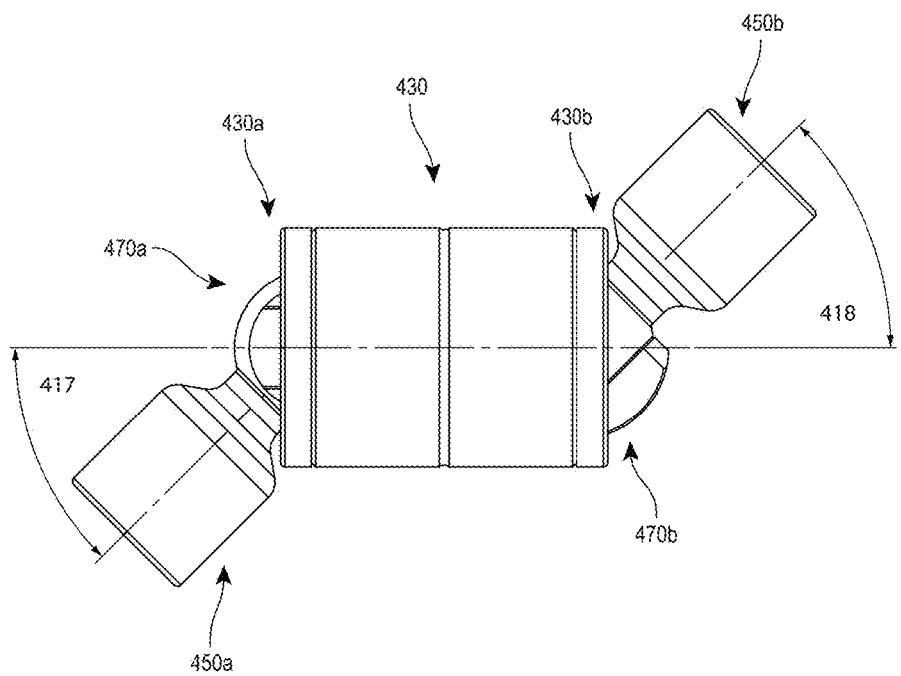
FIG. 29B is a side view of the joint in FIG. 26.
Figure 30:
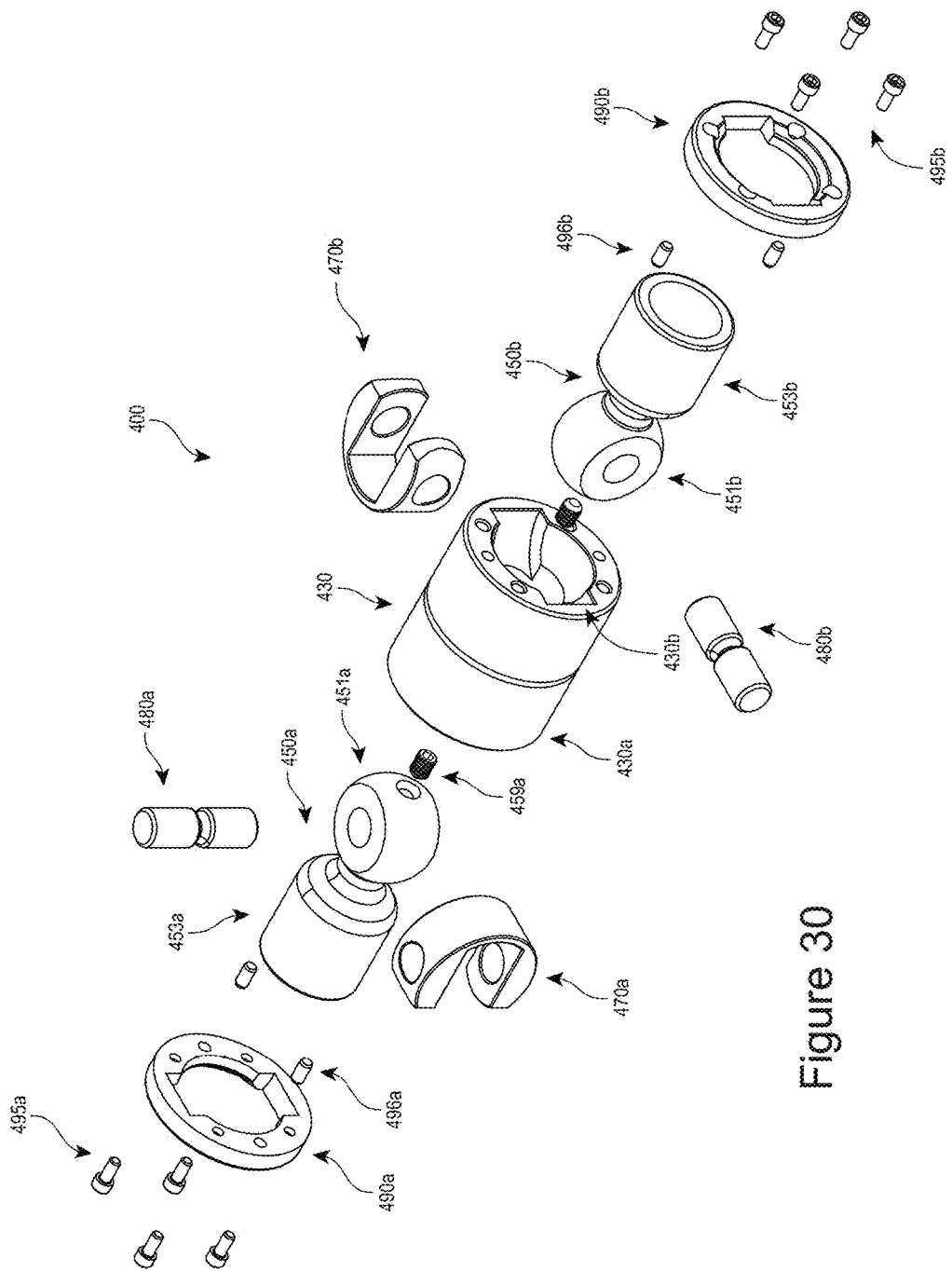
FIG. 30 is an exploded view of the joint in FIG. 26.
Figure 31:
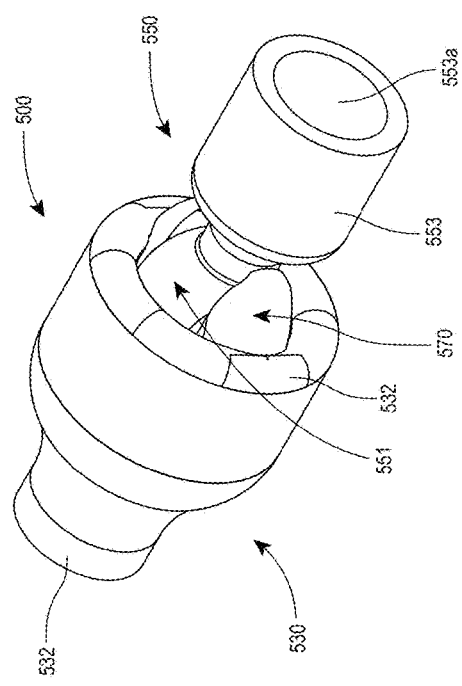
FIG. 31 is a perspective view of a fifth embodiment of a joint.

As shown in FIGS. 27A-27B, housing 430 can include a housing body 433 with the first and second ends 430a, 430b. The housing body 433 can be tubular in nature and an inner wall 437 of the housing body 433 can define an inner space 434. In some embodiments, the inner space 434 extends through the housing body 433. In some embodiments, the second end 430b can be configured to be machined separately and coupled with the first end 430a (e.g., by welding or mechanical fasteners). In some embodiments, the housing body 433 is machined from an integral material.

Each of the first and second ends 430a, 430b can have substantially the same structural components as the first end 331 of the housing 330. The second end 430b can include an opening to the inner space 434. Like the opening of the housing 330, the opening of the second end 430b can be circular, square, rectangular, hexagonal, or any other suitable shape.

The first and second ends 430a, 430b of the housing 430 can include channels 435a, 435b, respectively. The channels 435a, 435b can be formed in the inner surface 437 of the housing body 433. The channels 435a, 435b can have the same structure as the channel 335 in joint 300. The channels 435a, 435b can interface with the first and second ends 430a, 430b at an equatorial line of the channels 435a, 435b (dividing cylindrical bottom surfaces of the channels 435a, 435b in half), respectively. The first and second ends 430a, 430b can further include concave spherical surfaces 436a, 436b. The concave spherical surfaces 436a, 436b can have the same structure as the concave spherical surface 336 and with the first and second ends 430a, 430b at an equatorial line.

The first and second ends 430a, 430b of the housing 430 can interface with the first and second cap rings 490a, 490b. The cap rings 490a, 490b can have the same structure as the cap ring 390 discussed above. The cap rings 490a, 490b can include one or more posts 496a, 496b and corresponding recesses on the housing 430. The cap rings 490a, 490b can include screw holes and screws 495a, 495b. The cap rings 490a, 490b can each include channel segments, spherical surfaces, and central openings, similar to the cap ring 390 discussed above.

The joint 400 can be assembled by inserting the first end 451a of the first drive ball 450a within an inner slot of the first drive puck 470a. The first drive puck 470a can be pivotally coupled with the first end 451a with the first pin 480a. In some embodiments a set screw assembly 459a can secure first pin 480a in place. The first drive puck 470a can be inserted within the channel 435a. An outer surface of the first drive puck 470a can be slidingly engaged with the cylindrical bottom surfaces of the channel 435a. The concave spherical surface 436a can be slidingly engaged with the convex spherical surface 452a of the first drive ball 450a. The first cap ring 490a can be aligned with the first end 430a by one or more pins 496a and coupled thereto by fasteners 495a.

The first drive puck 470a can rotate about a first central axis within the channel 435a and within the first plane 401. The first drive ball 450a can rotate about the first pin 480a and within the second plane 402. The first central axis can intersect a longitudinal axis of the first pin 480a.

The second drive ball 450b can be assembled with an inner slot of the second drive puck and assembled therewith by the second pin 480b. The second drive puck 470b can be assembled within the second channel 435b. The second drive puck 470b can rotate about a second central axis within the second channel 435b and within the third plane 403. The second drive ball 450b can rotate about the second pin 480b and within the fourth plane 404. The second central axis can intersect a longitudinal axis of the second pin 480b.

The second cap ring 490b fits over the second drive ball 450b and couples with the second end 430b of the housing 430 to secure the second drive ball 450b within the housing 430. The second drive puck 470b can slidingly engage within the channel segments of the cap ring 490b and the channel 435b. The convex spherical surface 452b can slidingly engage the concave spherical surface 436b and the concave spherical surface of the cap ring 490b. The second cap ring 490b can be aligned with the second end 430b by one or more pins 496b and coupled thereto by fasteners 495b.

Once assembled the first and second drive balls 450a, 450b can be pivoted to the angles, 417, 418, respectively, with respect to the housing 430. In some embodiments, rotation of the first and second drive balls 450a, 450b is only limited by its interference with the first and second cap rings 490a, 490b, respectively.

Fifth Embodiments of a Universal Joint

FIGS. 31-43 illustrate another embodiment of a joint assembly 500. Similar in certain aspect to the function of the joints 10, 10a and 300 described above, the joint 500 offers certain improvements to manufacturability, structure, and function, as described further below.

The joint 500 can include a housing 530, drive puck 570 and a drive ball 550, as well as various fasteners. A first end 551 of the drive ball 550 can be rotatably coupled with the drive puck 570. A second end 553 of the drive ball 550 can be configured to be coupled with a first shaft. For example, the second end 553 can comprise an aperture 553a for receiving an end of the first shaft. The drive puck 570 can be rotatably coupled with the housing 530. Specifically the drive puck 570 can be coupled at a first end 531 of the housing 530. A second end 532 of the housing 530 can configured to be coupled with a second shaft. For example, in some embodiments the second end 532 of the housing 530 includes a recess 532a for receiving an end of the second shaft (e.g., an output shaft).

Figure 32B:
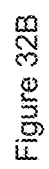
FIG. 32B is a top view of the joint of FIG. 31.
Figure 32A:
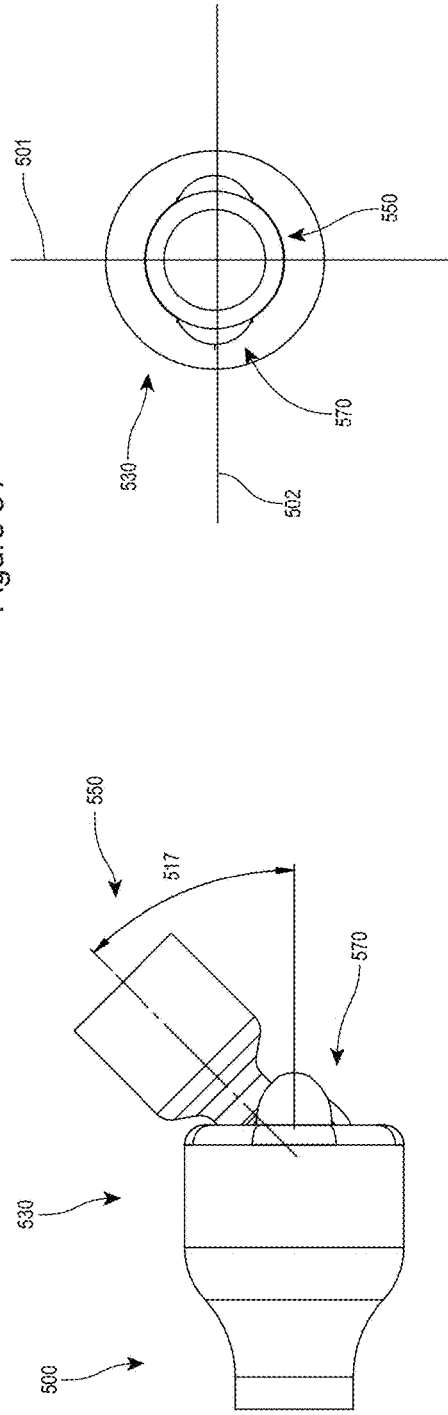
FIG. 32A is a side view of the joint of FIG. 31.
Figure 33B:
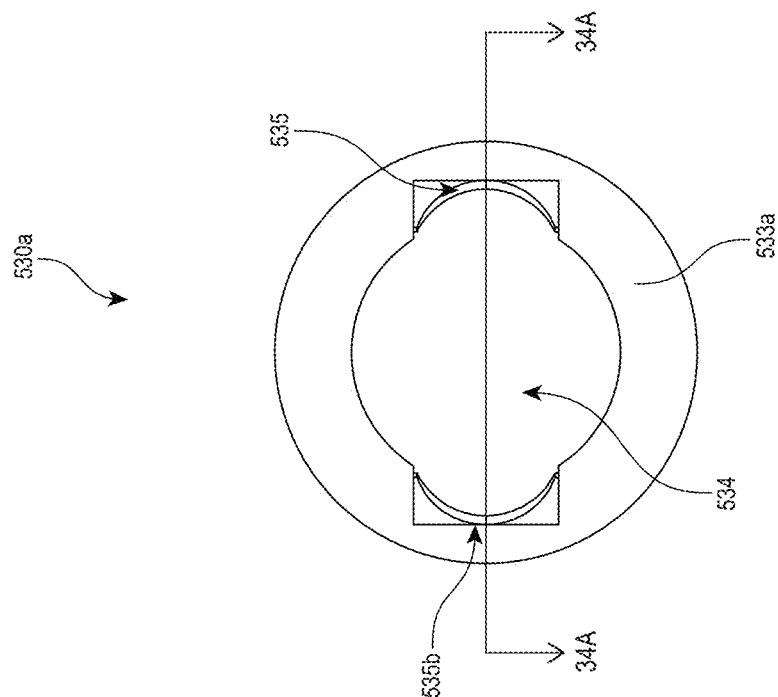
FIG. 33B is a top view of the first housing shown in FIG. 33A.
Figure 33A:
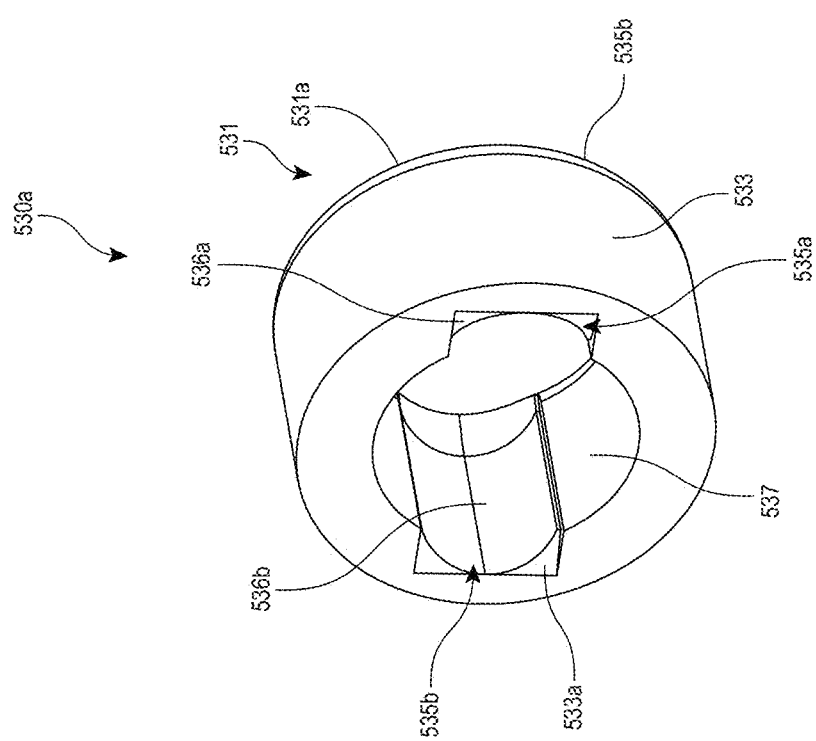
FIG. 33A is a perspective view of a first housing of the joint of FIG. 31.
Figure 35B:
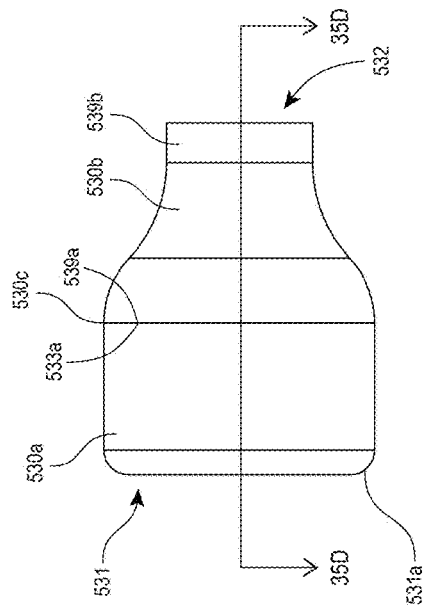
FIG. 35B is a side view of the first and second housings of FIG. 35A.
Figure 35D:
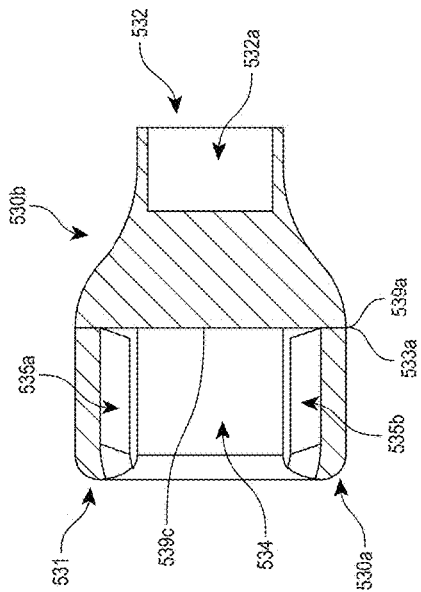
FIG. 35D is a section view along the line F-F in FIG. 35B.
Figure 35A:
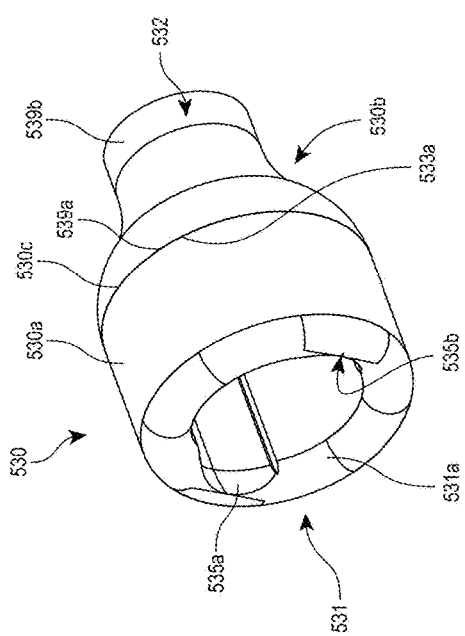
FIG. 35A is a perspective view of a housing of the joint of FIG. 31.
Figure 35C:
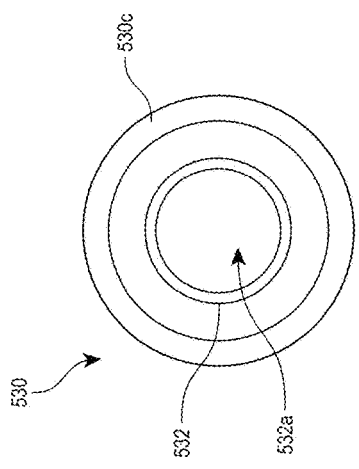
FIG. 35C is a top view of the first and second housings of FIG. 35A.

In this manner, the first and second shafts can be coupled together such that rotation from the first shaft can be transferred to rotation of the second shaft through the joint 500. In addition, an angle 517 can be had between the first and second shafts and maintained during rotation of the first and second shafts and joint 500. FIG. 32A illustrates the drive ball 550 rotated to angle 517 with respect to the housing 530. The angle 517 can be adjusted between 0° and approximately 45° to 50°. The drive ball 550 can be rotatable within a first plane 501 with respect to the housing 530. The drive puck 570 can be rotatable within a second plane 502 with respect to the housing 530. The first and second plane 501, 502 can be substantially orthogonal. This configuration can allow for rotation of the joint 500 while maintaining the angle 517.

The housing 530, as illustrated in FIGS. 33A-35D can include first and second housing sections 530a, 530b. The first housing section 530a can include an outer casing 533. The outer casing 533 can include an inner surface 537. The inner surface 537 can be disposed around and/or defining a central cavity 534 of the outer casing 533. In some embodiments, the outer casing 533 can be substantially cylindrical on its exterior surface. In other embodiments, the outer casing 533 can have any desirable shape or outer contour. In some embodiments, the central cavity 534 is substantially cylindrical in nature. The inner surface 537 can also comprise a cylindrical surface. In other embodiments, the shape of the inner surface 537 and/or the central cavity 534 does not contact any of the movable components of the joint 500 as described further below.

The first housing section 530a can include first and second grooves 535a, 535b. The first and second grooves 535a, 535b can be disposed on opposite sides of the central cavity 534. The first and second grooves 535a, 535b can be cylindrical in shape. The first and second grooves 535a, 535b can be disposed within the inner surface 537 of the outer casing 533. The first groove 535a can include a first concave sliding surface 536a. Similarly, the second groove 535b can include a second concave sliding surface 536b. The first and second concave sliding surfaces 536a, 536b can extend from a first end 533a to a second end 533b of the first housing section 530a. The first end 533a of the housing section 530a can include a flat surface that can be interfaced and joined with the second housing section 530b of the housing 530 as described below. The second end of 533b of the first housing section 530a can be at an upper face 531a of the first housing section 530a. In some embodiments, the upper face 531a can be rounded.

The first housing section 530a can include first and second lips 538a, 538b. In some embodiments, the first and second lips 538a, 538b are at the second end 533b of the housing section 530a. In some embodiments, the first and second grooves 535a, 535b are disposed on opposite sides of the central cavity 534. In some embodiments, the first and second grooves 535a, 535b are facing each other and are mirror images of each other. The first and second lips 538a, 538b can extend inwardly towards a center such as a central longitudinal axis of the first housing section 530a. The first lip 538a can be aligned with the first groove 535a. The second lip 538b can be aligned with the second groove 535b.

The first and second concave sliding surfaces 536a, 536b can extend at least partially across the lips 538a, 538b, respectfully. In some embodiments, the first and second concave sliding surfaces 536a, 536b extend to the upper face 531a of the first housing section 530a from the first end 533a of the first housing section 530a. The first and second concave sliding surfaces 536a, 536b can include straight portions 536c, 536d, respectively. The straight portions 536c, 536d can begin at the first end 533a. The straight portions 536c, 536d can be cylindrical in shape. The first and second concave sliding surfaces 536a, 536b can include toroidal surface portions 536e, 536f, respectively. The toroidal surface portions 536e, 536f can couple with the straight portions 536c, 536d and extend across the lips 538a, 538b, respectively. The toroidal surface portions 536e, 536f can be disposed radially inward of the straight portions 536c, 536d.

A centerline 536g of the straight portion 536c of the first concave sliding surface 536a can be linear and parallel to a centerline 536h of the straight portion 536d of the second concave sliding surface 536b. A groove distance 535c between the center lines 536g and 536h can be constant throughout the straight portions 536c, 536d. A narrower lip distance 538c between the lips 538a, 538b can represent the shortest distance between the opposing surfaces of the toroidal surface portions 536e, 536f.

The toroidal surface portions 536e, 536f can correspond a convex sliding surface or toroidal outer surface 572 of the drive puck 570 described below. At least one of the radii of curvature of the toroidal surface portions 536e, 536f can be equal to approximately half the groove distance 535c between the straight portions of the second concave sliding surfaces 536a, 536b and/or equal to an outer radius of the drive puck 570.

The first housing section 530a can be manufactured, for example, using a lathe or screw machine from a piece of bar stock. The bar stock can be made of any suitable material including steels and aluminum, including those listed above. The lathe or screw machine can rotate and feed the bar stock into contact with a die or cutting head and shape the outer casing 533 and/or cut out the central cavity 534. The upper face 531a can also be shaped (e.g., rounded or cut in a conical manner to allow for rotation of the drive ball 550). As illustrated in FIGS. 34B-34C, to cut the first groove 535a a first cutting tool (e.g., a rounded end mill 505, drill bit, or other) can cut into the first end 533a of the casing 533 (either before or after machining out the central cavity 534) and cut towards the second end 533b. Movement of the first cutting tool in a straight line can form the straight portion 536c. The toroidal surface 536e can be formed by a rounded end of the first cutting tool. The cutting tool can be controlled by a computerized or manual milling machine. This process can be repeated to cut the second groove 535b.

In another option, as illustrated in FIGS. 34D-34E, the first cutting instrument can have an outer toroidal-shaped cutting or grinding surface 506. This first cutting instrument can cut both the first and second grooves 535a, 535b. This first cutting instrument can be moved linearly to straight cut portions 536c, 536d. Outer curvature of the cutting or grinding surface can form the first and second toroidal surfaces 536e, 536f.

In the joint 500, the first and second lips 538a, 538b can be machined into the casing 533. In some embodiments, the first and second lips 538a, 538b can be machined using the same cutting tool for cutting the first and second grooves 535a, 535b. This configuration can facilitate machining of the housing section 530a in an efficient manner. For example, in some embodiments, the first and second grooves 535a, 535b can be cut out of a billet by the cutting tool at or near the first end 533a. Material can be removed by the first cutting tool in a substantially straight path to form the straight portions of the first and second grooves 535a, 535b. The cutting tool can continue until it is adjacent to the second end 533b. In some embodiments, curvature at the end of the first cutting tool can form the radius of curvature of the first and second lips 538a, 538b. Alternatively, the first and second grooves 535a, 535b can be cut with a first cutting tool and the first and second lips 538a, 538b can be cut using a second cutting tool or finishing tool. In other embodiments, the first and second lips 538a, 538b can be formed by cold rolling the second end 533b towards the centerline of the housing section 530a.

This configuration of the first and second grooves 535a, 535b is highly manufacturable in comparison to the other joints. In joint 300, for example, it can be time consuming and difficult to cut the cylindrical channel 335 and form equatorial lines with the first end 331 of the housing 330. The process of cutting the channel 335 can be even more difficult where close tolerances are required for smooth sliding of adjacent surfaces. In some embodiments of the first and second grooves 535a, 535b, the tolerances do not have to be as tightly maintained because there is less surface contact between the concave sliding surfaces 536a, 536b and the drive puck 570 than between the first and second channel surfaces 335a, 335b and the drive puck 370 of joint 300.

The second housing section 530b of the housing 530 can include a first end 539a and a second end 539b. The first end 539a can be configured to interface with the first end 533a of the first housing section 530a. An interface 530c between the first and second housing sections 530a, 530b can couple together the first and second components. The interface 530c can include a face 539c. The face 539c can be planer or any other shape such that it can interface with the first housing section 530a of the first end 533a.

In some embodiments, the interface 530c can be a weld (e.g., conventional welding techniques, laser beam welding, magnetic pulse welding, or friction stir welding). In other embodiments, the interface can be mechanical couplings (e.g., screws, tongue and groove, or interference fittings). In some embodiments, the interface 530c is an electron beam weld. An electron weld can be advantageous because it generates low heat in coupling together the first and second housing sections 530a, 530b. This can be particularly advantageous where heat expansion or distortion of the housing 530a can affect the tolerances of the concave sliding surfaces 536a, 536b. For example, the tolerances of the concave sliding surfaces 536a, 536b can be on the order of a few thousands of an inch. Significant deviation from within the tolerances (i.e., heat distortion from conventional welding) can prevent the drive puck 570 from rotating freely within the first and second grooves 535a, 535b.

The second housing section 530b can include the second aperture 532a. The second aperture 532a can be disposed in the second end 538b, 539b of the second housing section 530b. The second aperture 532a can be configured for receiving the second shaft. For example, receiving 533a can further include splines or a set screw disposed in the second housing section 530b to secure the second shaft within the second aperture 532a.

In some embodiments, the central cavity 534 can extend all the way through both the first and second housing sections 530a, 530b. This configuration can allow for a lubricant to be inserted within the central cavity 534 from either end of the housing 530 and coat the sliding surfaces of the joint 500. In some embodiments, the central cavity 534 can allow for the lubricant to flow through the housing 530 in a continuous or intermittent manner. In some embodiments, the central cavity 534 can thus provide advantages of facilitating the lubrication and/or cleaning of the joint 500 without the need to disassemble the components of the joint 500.

The drive puck 570, shown in detail in FIGS. 36A-D, can include a first wing 571a and a second wing 571b and an inner slot 573. An outer periphery 572a of the drive puck 570 can be circular about a central axis 572b or when viewed from the top (as in FIG. 27B). A connecting region 574 can connect the first and second wings 571a, 571b.

The drive puck 570 can include a convex sliding surface 572. Convex sliding surface 572 can be disposed around the outer periphery 572a of the drive puck 570. The convex sliding surface 572 can be disposed across the first and second wings 571a, 571b. In some embodiments, an outermost portion of the outer periphery 572 has a radius of curvature that is circular. The convex sliding surface 572 can correspond to the shape of the concave sliding surfaces 536a and 536b of the first and second grooves 535a, 535b. For example, the convex sliding surface 572 can be toroidal in shape. This allows for the drive puck to be slidingly engaged within the first and second groove 535a, 535b. The radius of the outer periphery 572a can be less than that of the groove distance 535c and greater than that of the lip distance 538c. This ensures that the lips 538a, 538b retain the drive puck 570 within the grooves 535a, 535b and within the housing 530. It also enables the drive puck 570 to be rotatable and insertable within the grooves 535a and 535b.

The inner slot 573 can comprise a first inner side 573a and a second inner side 573b. The first and second inner slides 573a, 573b can include substantially planer portions. The substantially planer portions can be disposed on opposite sides of the inner slot 573. The substantially planer portions can substantially parallel to each other.

An overhang 578a can extend towards the center of the inner slot 573 at an outer end of the slot 573. Similarly, a second overhang portion 578b can extend towards a center line of the inner slot 573 from the second inner side 573b. The convex sliding surface 572 can extend across one or both of the first and second overhang portions 578a, 578b. These first and second overhang portions 578a, 578b enable additional rotation of the drive puck 570 within the housing 530 without coming out past the lips 538a, 538b of the grooves 535a, 535b. The first and second overhang portions 578a, 578b can extend out from the substantially planer portions of the first and second inner slides 573a, 573b of the slot 573. The first and second overhang portions 578a, 578b can form an opening at the outer end of the slot 573 that is narrower than the distance between the planar portions.

Figure 36B:
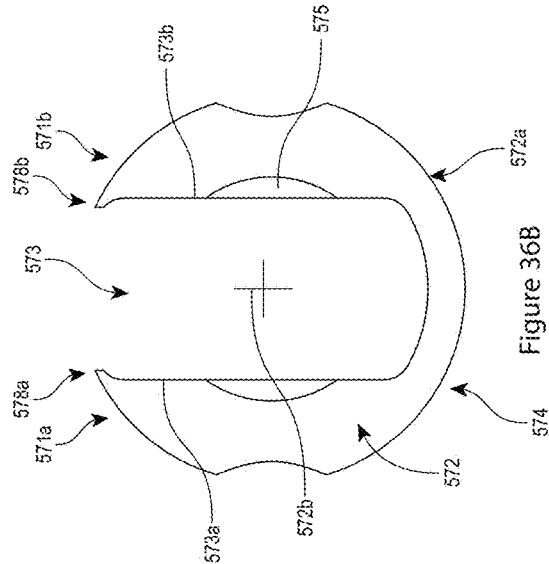
FIG. 36B is a top view of the drive puck of FIG. 36A.
Figure 36D:
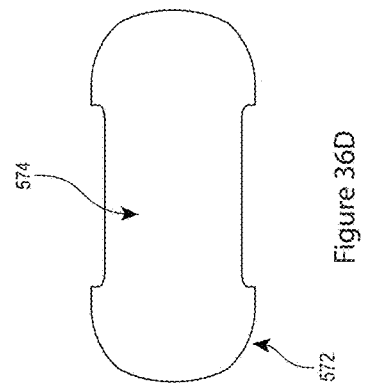
FIG. 36D is a back view of the drive puck of FIG. 36A.
Figure 36A:
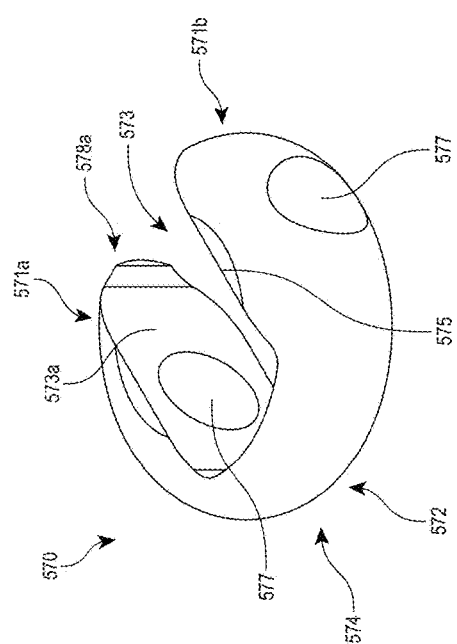
FIG. 36A is a perspective view of a drive puck of the joint of FIG. 31.
Figure 36C:
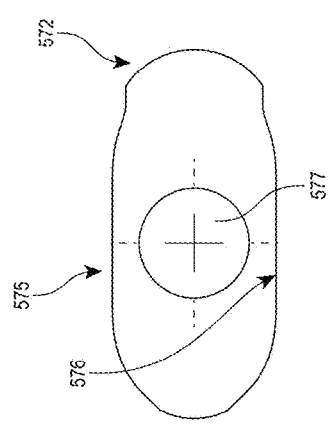
FIG. 36C is a side view of the drive puck of FIG. 36A.

An aperture 577 is disposed through one or both of the first and second wings 571a, 571b. The aperture 577 can extend through the central axis 572b of the drive puck 570, as illustrated in FIG. 36C. The aperture 577 can extend through the planar portions of the inner sides 573a, 573b.

Figure 37A:
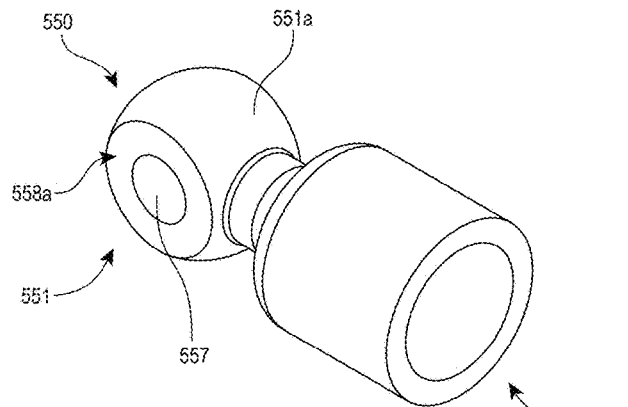
FIG. 37A is a perspective view of a drive ball of the joint of FIG. 31.
Figure 37B:
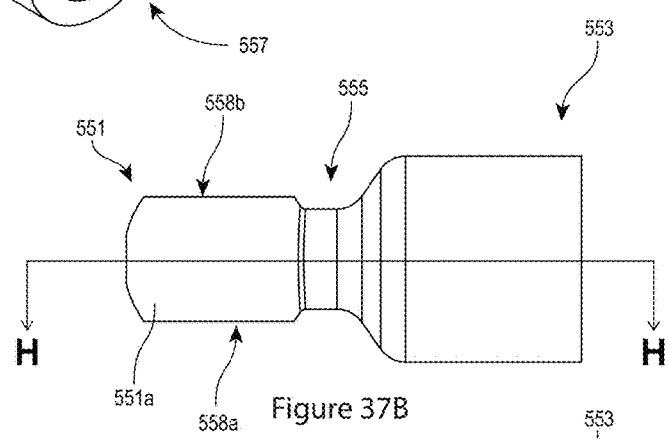
FIG. 37B is a side view of the drive ball of FIG. 37A.
Figure 37C:
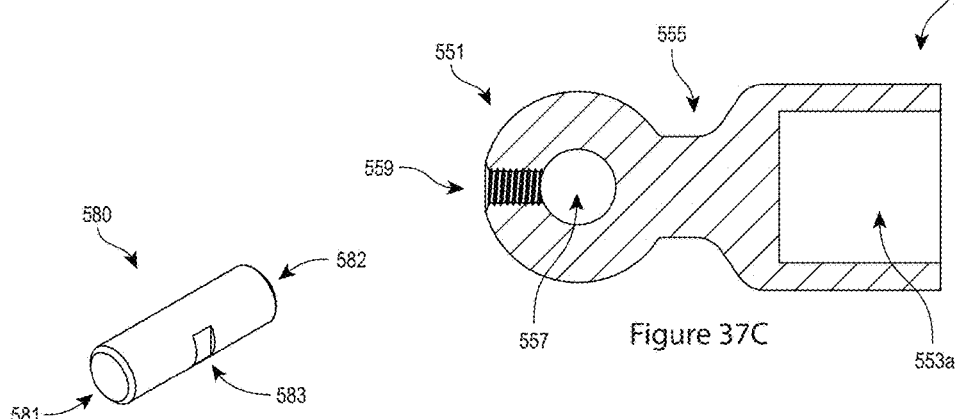
FIG. 37C is a section view along the line H-H in FIG. 37B.

The drive ball 550, shown in detail in FIGS. 37A-C can include a ball end 551 and a socket end 553. The ball end 551 and the socket end 553 can be coupled together by a neck portion 555. The ball end 551 can include an outer surface 551a. As explained further below, the ball end 551 need not be spherical, but can be any desirable shape. The ball end 551 can further include a shaft 557 disposed through the ball end 551. The ball end 551 can include one or more planar regions 558a, 558b. For example the ball end 511 can include first and second planar regions 558a, 558b. The planar regions 558a, 558b can be disposed on opposite sides of the ball end 551 and can be substantially parallel to each other. In some embodiments, the aperture 557 extends through the planar regions 558a, 558b. The ball end 551 can further include a tapped hole 559 for a set screw.

The socket end 553 can include a socket 553a. In some embodiments, the socket 553a can be configured to be coupled with the first shaft of the joint 500. For example the socket 553a can include splines and a tap screw for holding the output shaft within the socket 553a. The socket 553a can be circular, square, rectangular, hexagonal, or any other suitable shape. In other embodiments the socket end 553 is a male connector or any other type of connector coupling the drive ball 550 with the second shaft. The outer surface of the socket end 553 can be cylindrical or any other suitable shape.

Figure 38A:
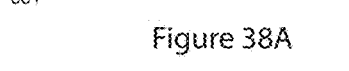
FIG. 38A is a perspective view of a pin of the joint shown in FIG. 31.
Figures 38B, 38C:
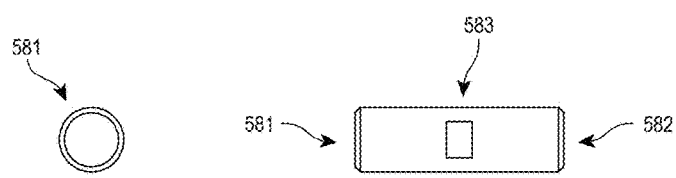
FIG. 38B is an end view of the pin of FIG. 38A.
FIG. 38C is a side view of the pin of FIG. 38A.
Figure 39:
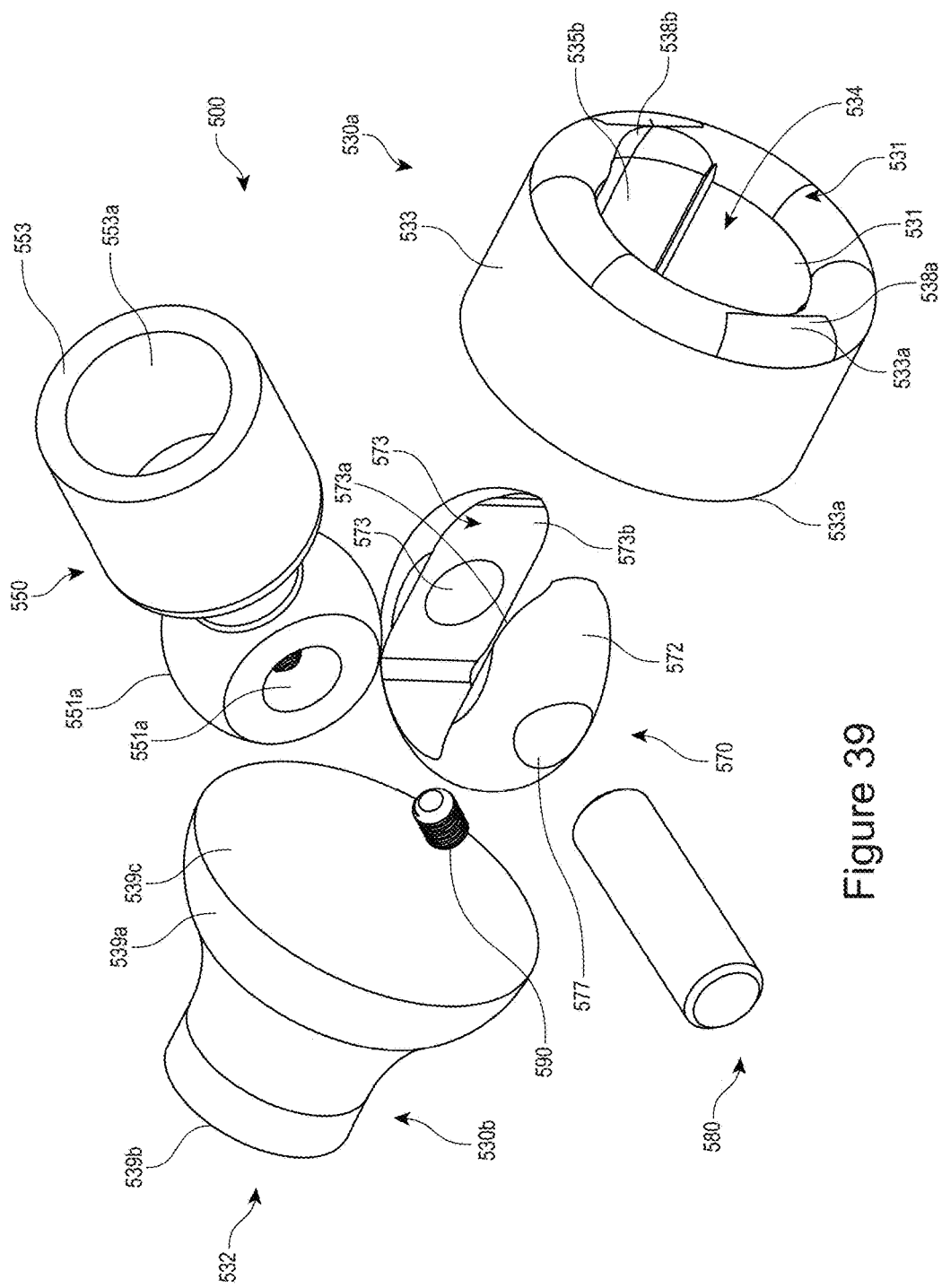
FIG. 39 is an exploded assembly view of the joint shown in FIG. 31.
Figure 40A:
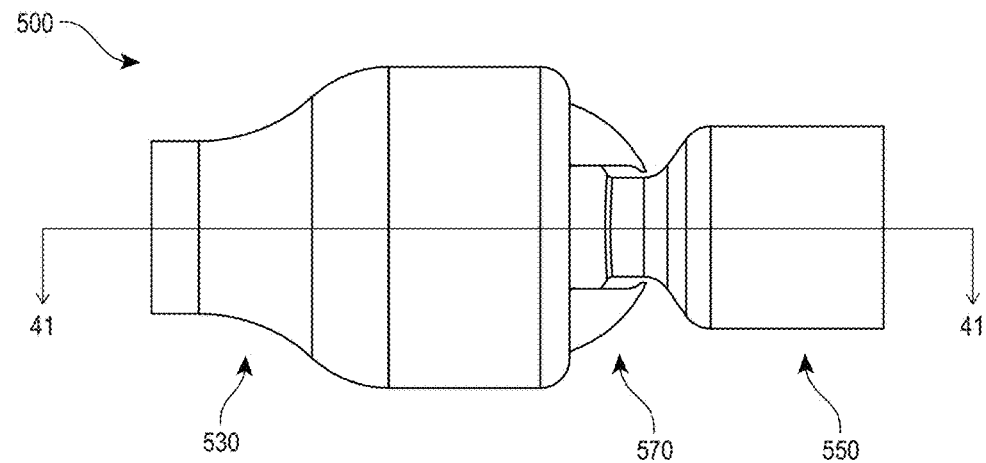
FIG. 40A is a top view of the assembly of the joint shown in FIG. 31.
Figure 40B:
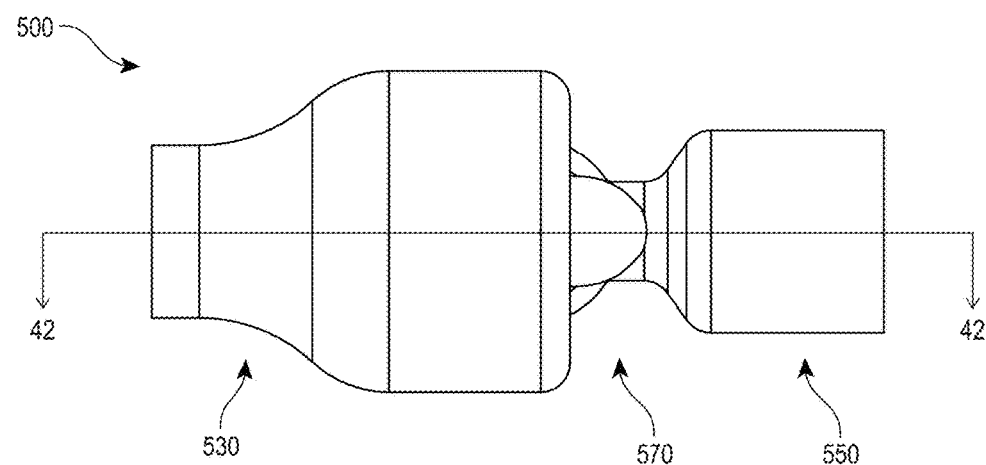
FIG. 40B is a front view of the assembly of the joint shown in FIG. 40A.
Figure 44:
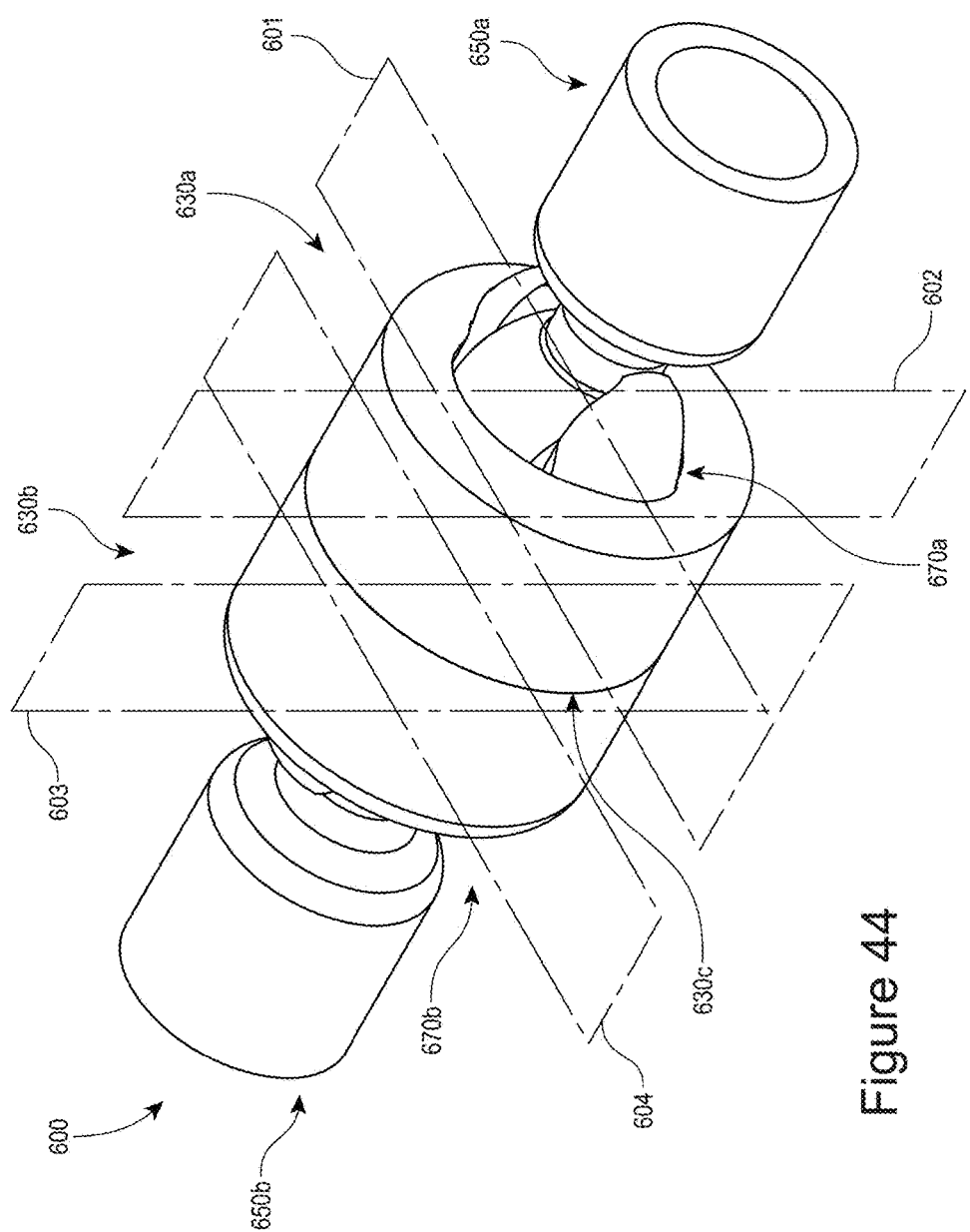
FIG. 44 shows a sixth embodiment of a joint.
Figure 45A:
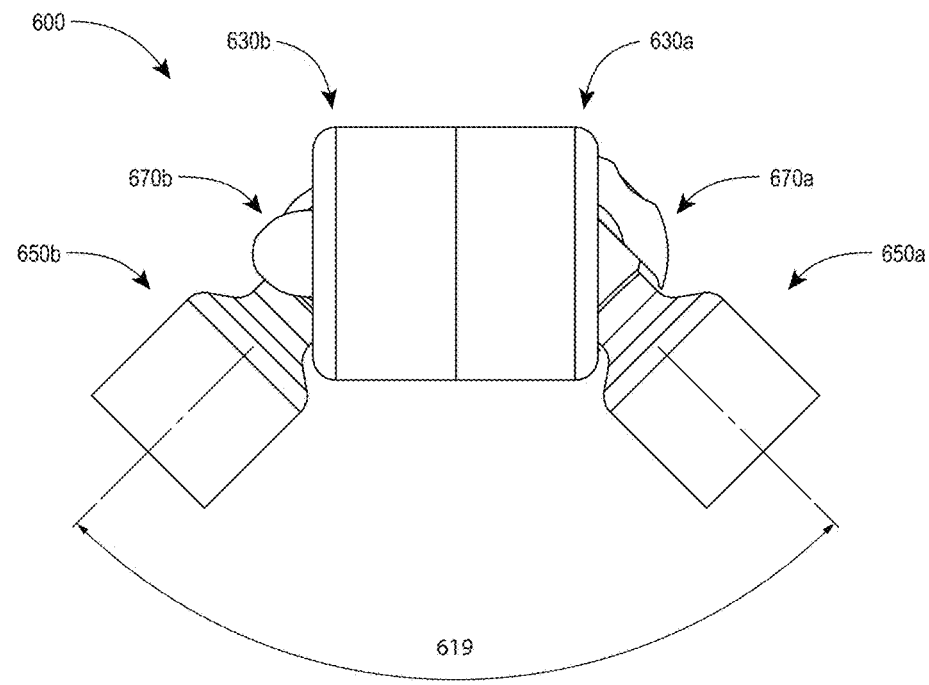
FIG. 45A is a side view of the joint shown in FIG. 44.
Figure 45B:
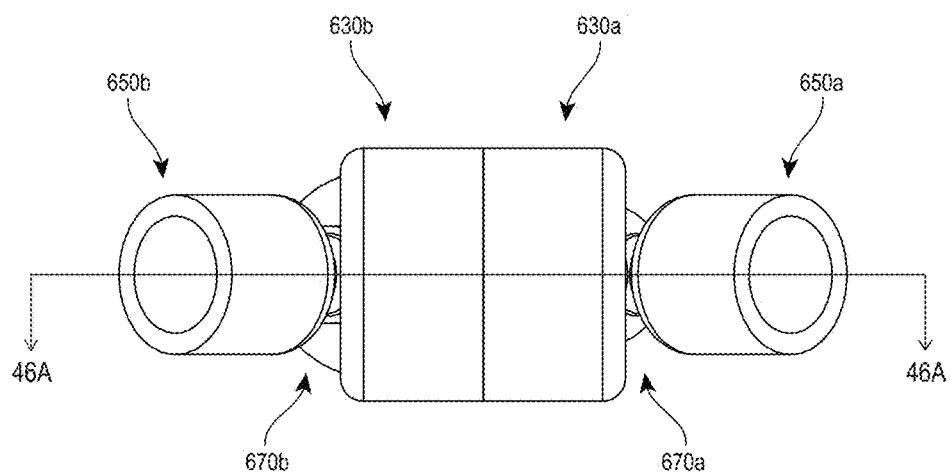
FIG. 45B is a front view of the joint of FIG. 45A.
Figure 46A:
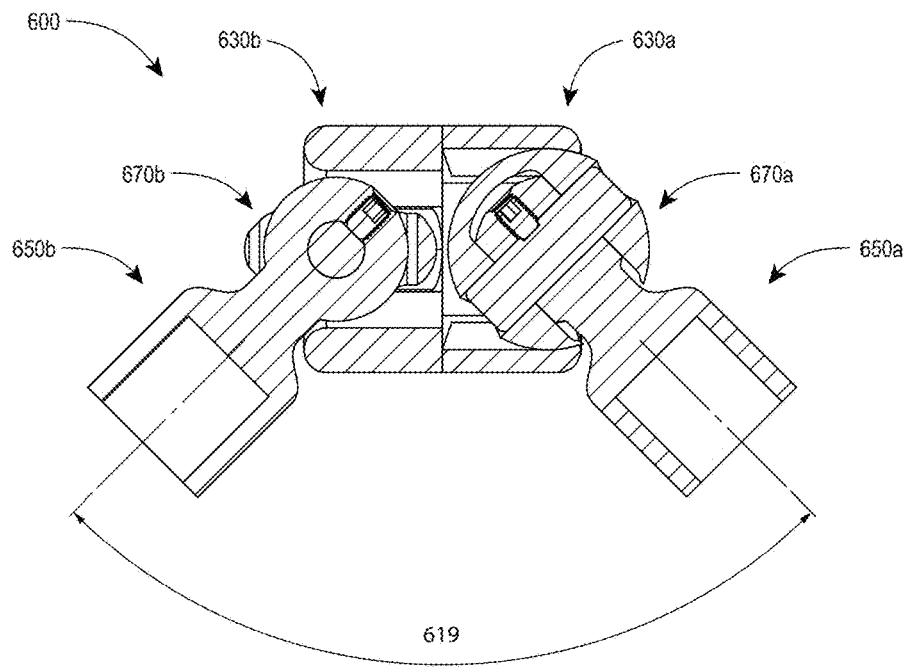
FIG. 46A is a section view along the line L-L in FIG. 45B.
Figure 46B:
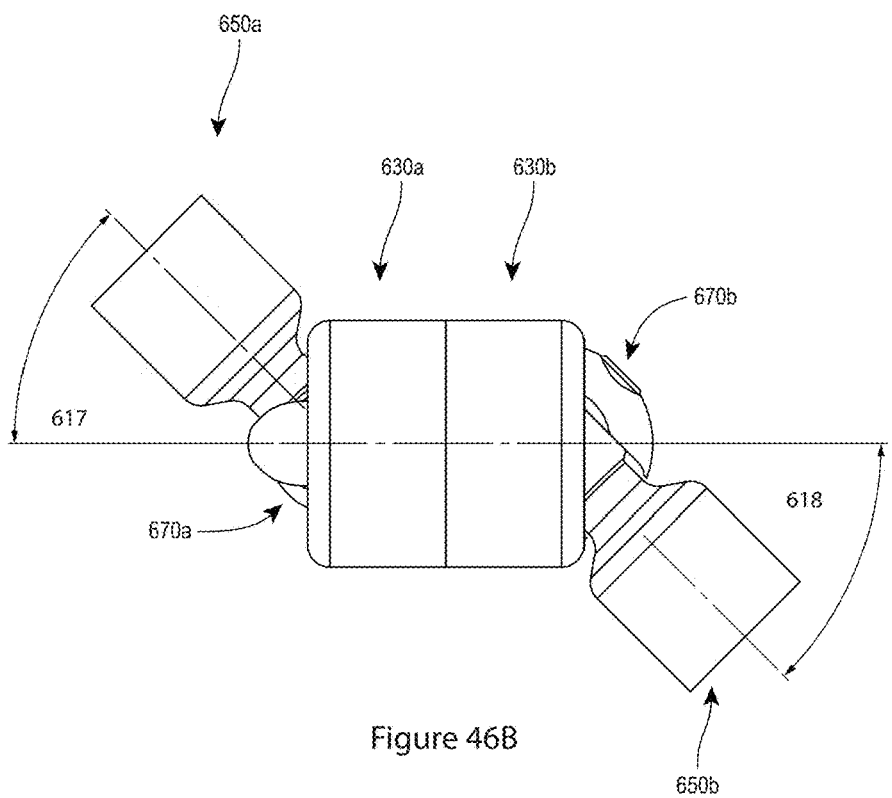
FIG. 46B is a side view of the joint shown in FIG. 44.
Figure 50A:
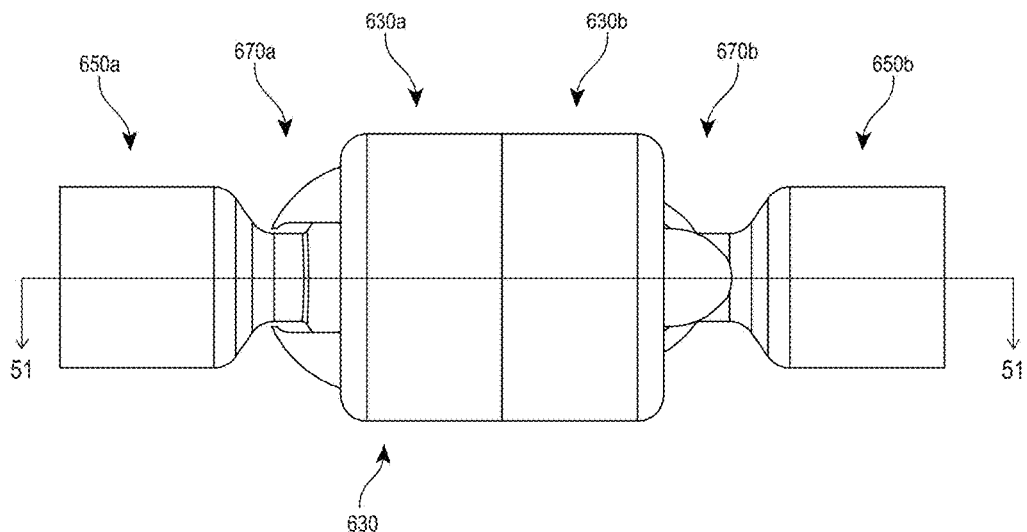
FIG. 50A is a top view of the assembly of the joint shown in FIG. 44.
Figure 50B:
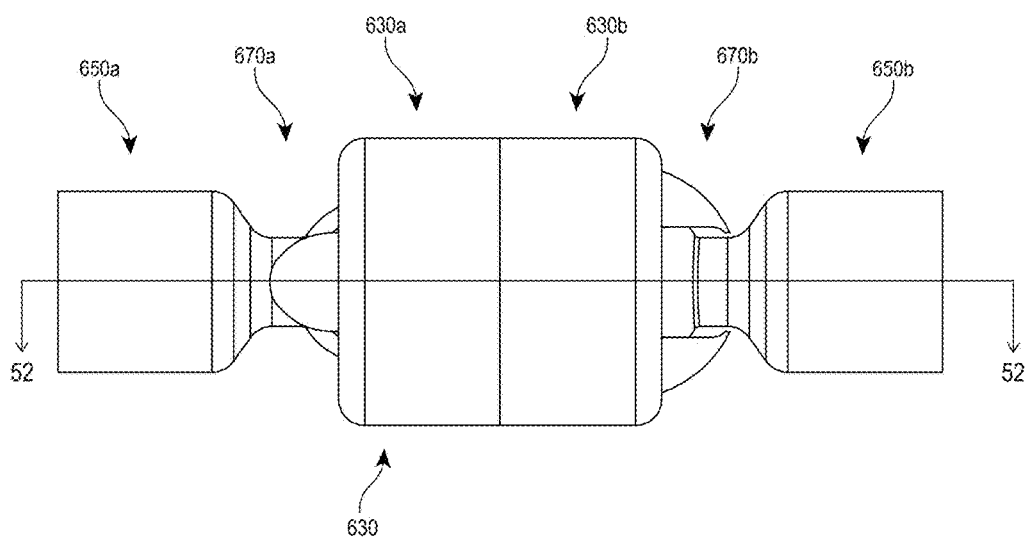
FIG. 50B is a side view of the joint shown in FIG. 50A.
Figure 51:
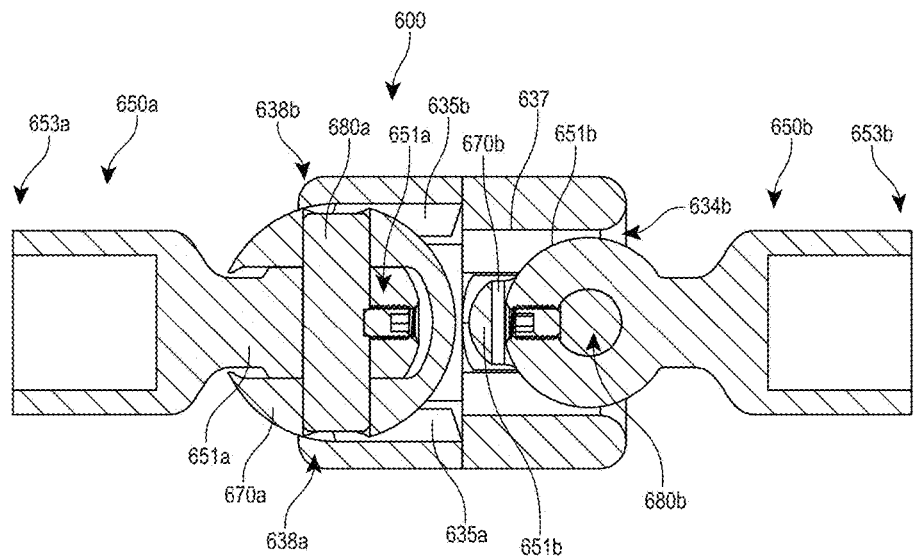
FIG. 51 is a section view along the line N-N in FIG. 50A.
Figure 52:
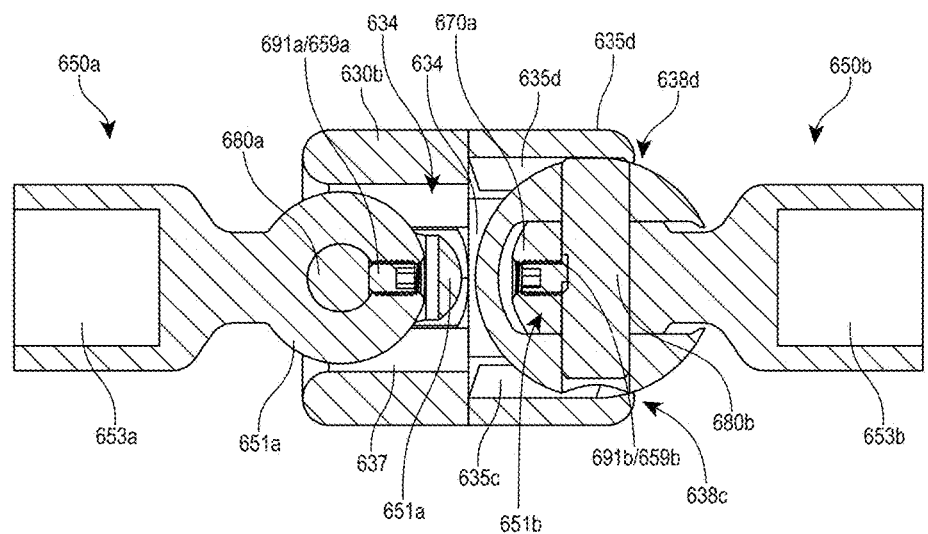
FIG. 52 is a section view along the line O-O in FIG. 50B.
Figure 55:
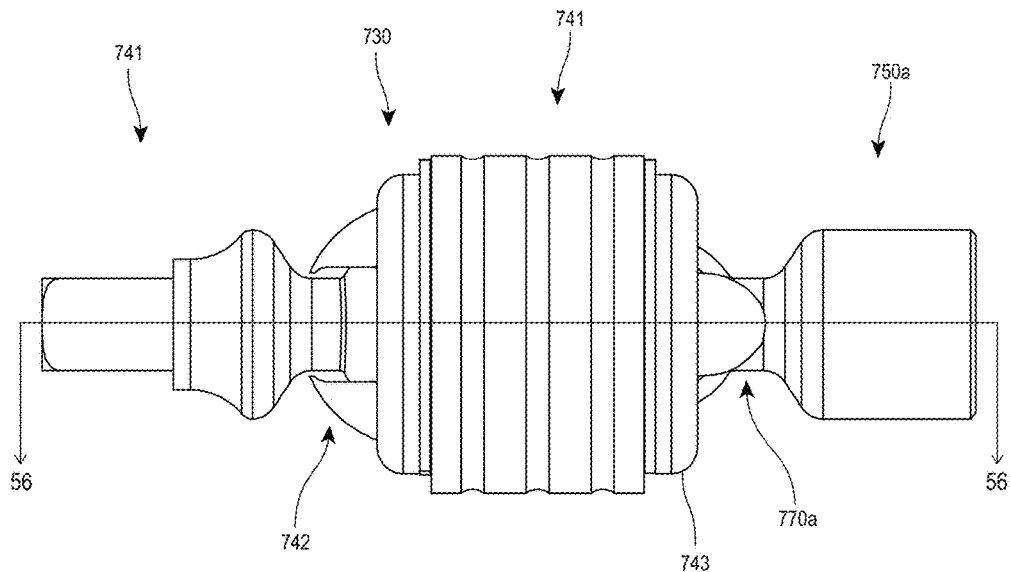
FIG. 55 is a side view of the joint of FIG. 53.

A pin 580, shown in detail in FIGS. 38A-C, has a first end 581, a second end 582. The pin 580 can be cylindrical, have a cylindrical shaft between the first and second ends 581, 582. Between the first and second ends 581, 582 can be a flattened portion 583. The flattened portion 583 can be used as a place in which a set screw 590 can be inserted in to the tapped hole 559 of the drive ball 550 and pressed against the pin 580 to hold it with within the aperture 557.

To assembly the joint 500, the drive puck 570 can be inserted within the first housing section 530a of the housing 530. The drive puck 570 can be inserted into the first and second grooves 535a, 535b. The first and second concave sliding surfaces 536a, 536b can be slidingly engaged with the convex sliding surface 572 of the drive puck 570. The drive puck 570 can be rotatable within the first and second grooves 535a, 535b.

The drive ball 550 can be coupled with the drive puck 570 by the pin 580. The pin 580 can extend into the apertures 557 and 577 of the drive ball 550 and drive puck 570, respectively. The pin can be secured within the apertures 557 and 577 by the set screw 590. The ball end 551 of the drive ball 550 can be inserted into the central cavity 534 of the first housing section 530a. The diameter of the ball end 551 must be smaller than the opening of the central cavity 534 at the first end 531 of the housing 530.

The second housing section 530b can be assembled with the first housing section 530a. The first housing section 530a is slid over the drive ball 550 and interfaced with the second housing section 530b. For example, the first and second housing sections 530a, 530b, can be welded together or otherwise assembled at the interface 530c. In some embodiments, this can be done with the drive puck 570 already inserted within the first housing section 530a and coupled with the drive ball 550.

A weld 530d at the interface 530c can extend into the outer casing 533, as shown in FIGS. 41 and 42. Desirably, the weld 530d and/or welding process can avoid altering the dimensions of the grooves 535a, 535b. Nonetheless, the altering of the grooves 535a, 535b at the first end 533a of the housing 530a can be acceptable where it does not interfere with rotation of the drive puck 570. As noted above, electron beam welding generates little heat and can create deep welds into a material to provide a firm coupling of the first and second housing sections 530a, 530b.

In some embodiments, the lips 538a, 538b can comprise a sharp or squared corner to prevent the drive puck 570 from being removed from the grooves 535a, 535b. In other embodiments, the toroidal surface portions 536e, 536f of the concave sliding surfaces 536a, 536b match the profile of the outer periphery 572a of the drive puck 570. This can reduce friction and prolong service life of the drive puck and the housing 530 by minimizing high-pressure contact areas between the drive puck 570 and the grooves 535a, 535b.

In some embodiments, the central cavity 534 can comprise a tensioning mechanism 520. For example, the tensioning mechanism 520 can comprise a spring-loaded steel ball bearing, as illustrated in FIG. 41. The ball bearing can contact the outer periphery 572a of the drive puck 570. In some embodiments, the ball bearing can apply pressure to the outer periphery 572a to bias the drive puck 570 against the lips 538a, 583b. This can reduce or minimize vibration and play in the joint 500 during rotation of the assembly. Other tensioning mechanisms 520 can include, but are not limited to, a plastic or metal insert with the central cavity 534 and a coating of the planar surface 539c of the section housing section 530a.

In some embodiments, the outer surface 551a of the ball end 551 does not contact the inner surface 537 of the outer casing 533, as illustrated in FIGS. 42-43. A through-space 534a can be disposed between the outer surface 551a and the inner surface 537. This arrangement can facilitate application of the lubricant into the central cavity 534. In embodiments where the central cavity 534 extends all the way through the housing 530, the through-space 534a facilitates the flow of the lubricant past the drive puck 570 and the drive ball 550. In some embodiments, the flow of the lubricant can be further facilitated by a plurality of perforations extending all the way through the drive puck 570 and/or the ball end 551 of the drive ball 550. The plurality of perforations can extend in any direction or various directions to facilitate the lubricant flow.

The manufacturing process 100 and 200, described above, can also be applied to the components of the joint 500. For example, the housing 530, including the first and second concave sliding surfaces 536, 536b and/or the drive puck 570 can be hardened or differentially hardened to prolong the service life of the joint 500. In some embodiments of the joint 500, the vapor deposition, cryogenic hardening, case hardening and/or shot peening described above can be applied to drive puck 570 and/or the concave sliding surfaces 536, 536b.

Sixth Embodiments of a Universal Joint

FIGS. 44-52 illustrate another embodiment of joint assembly 600. Like the joint 400, the joint 600 can couple together a first shaft and a second shaft (not shown) such that rotation of the first shaft about its longitudinal axis transfers to rotation of the second shaft about its longitudinal axis. For example, rotation of the first shaft can match rotation of the second shaft. Joint 600 can include a housing 630 with first and second housing sections 630a, 630b. Each of the first and second housing sections 630a, 630b can include a structure similar to the housing 630 described above. The manufacturing processes described above (including processes 100 and 200) can also be applied in conjunction with the sliding components and surfaces of the joint 600.

The joint 600 can include first and second drive pucks, 670a, 670b, first and second drive balls 650a, 650b and first and second pins 680a, 680b. The first shaft can be coupled with the first drive ball 650a. The second shaft can be coupled with the second drive ball 650b. The first and second drive balls 650a, 650b can be coupled with first and second housing sections 630a, 630b of the housing 630 by the first and second drive pucks 670a, 670b, respectively. The first drive puck 670a can be coupled with the first housing section 630a and rotate with respect to the housing 630 in a first plane 601. The first drive ball 650a can be coupled with the first drive puck 670a by the first pin 680a and thereby rotate with respect to the housing 630 in a second plane 602. In this manner, the first drive ball 650a can be rotatable with respect to the housing 630 in both the first and second planes 601, 602. In some embodiments, the first and second planes 601, 602 are substantially orthogonal to each other.

The second housing section 630b can couple with the second drive puck 670b. The second drive puck 670b can be rotatable with respect to the housing 630 in a third plane 603. The second drive ball 650b can be coupled with the second drive puck 670b by the second pin 680b and thereby rotate with respect to the housing 630 in a fourth plane 604. In some embodiments, the third and fourth planes 603, 604 are substantially orthogonal to each other.

The first drive ball 650a can be rotated to an angle 617 with respect to a longitudinal axis of the housing 630. Angle 617 can be maintained during rotation of the first shaft and joint 600 by sliding of the first drive ball 650a and/or the first drive puck 670a with respect to the housing 630 within the first and/or second planes 601, 602, respectively. The second drive ball 650b can be rotated to an angle 618 with respect to a longitudinal axis of the housing 630. Angle 618 can be maintained with respect to a longitudinal axis of the housing 630 during rotation of the second shaft and joint 600 by rotation of the second drive ball 650b and/or the second drive puck 670b within the third and/or fourth planes 603, 604, respectively.

An angle 619 between the first and the second shafts can be adjusted between approximately 0° and a maximum of approximately 90° to 100°. In some embodiments of the joint 600, it can be advantageous to create maximum angle of 90°. The angle 619 across the joint 600 can be maintained as the joint 600 rotates by corresponding rotations of the first and second drive pucks 670a, 670b within the first and third planes 601, 603 and by rotation of the first and second drive balls 650a, 650b within the second and fourth planes, 602, 604.

As explained above in relation to joint 400, in a joint with a single rotational angle (e.g., joint 500), the rotational speed of the first shaft coupled with the joint does not always match the rotational speed of the second shaft coupled with the joint, depending on the angle 517. The joint 600 can be used as a constant velocity joint provided the angles 617 and 618 are approximately equivalent and the first and third planes 601, 603 and the second and fourth planes 602, 604 are substantially orthogonal to each other. This configuration provides the advantages of substantially reducing vibration of the joint 600 during rotation.

The first and second drive pucks 670a, 670b can have the same structure as described above in relation to the drive puck 570. The first and second drive balls 650a, 650b can have the same structure as described above in relation to the drive ball 550. The first and second drive balls 650a, 650b can include first ends 651a, 651b, and second ends 653a, 653b, respectively. The first and second pins 680a, 680b can have the same structure as described above in relation to pin 580.

As shown in FIGS. 47A-C, housing 630 can include a housing casing 633 with the first and second housing sections 630a, 630b. The housing casing 633 can be tubular in nature and an inner wall 637 of the housing casing 633 can define an central cavity 634. In some embodiments, the central cavity 634 extends through the housing casing 633. In some embodiments, the second housing section 630b can be configured to be machined separately and coupled with the first housing section 630a at an interface 630c, such as by welding or mechanical fasteners, as described above in connection with the housing 530.

Each of the first and second housing sections 630a, 630b can have substantially the same structural components as the first housing section 530a of the joint 500. In some embodiments, the first housing section 530a can be manufactured as a modular component that can be coupled with the second housing section 530b as a part of the joint 500 or it can be coupled with another modular housing section (e.g., housing section 630b) to form a part of the joint 600. The modular nature of the first housing section 630a provides the advantages of reducing the necessary inventory that a manufacturing needs on hand and reduces the cost and complexity of building parts for each of the joints 500 and 600.

The first housing section 630a can include first and second grooves 635a, 635b. The first and second grooves 635a, 635b can be disposed on opposite sides of the central cavity 634. The first and second grooves 635a, 635b can be disposed within the inner surface 637 of the housing casing 633. The first and second grooves 635a, 635b can include first and second concave sliding surfaces 636a, 636b, respectively. The first and second concave sliding surfaces 636a, 636b can extend from an inner end 633c to the outer end 633a of the first housing section 630a.

The first housing section 630a can include first and second lips 638a, 638b. In some embodiments, the first and second lips 638a, 638b are at the outer end 633a of the housing section 630a. The first and second concave sliding surfaces 636a, 636b can extend at least partially across the lips 638a, 638b, respectfully. Where the concave sliding surfaces 636a, 636b cross the lips 638a, 638b, the concave sliding surfaces 636a, 636b can each comprise a circular radius of curvature that is circular or substantially circular and/or matches the shape of the drive puck 670a. The second housing section 630b can have the same structure as the first housing section 630a.

The joint 600 can be assembled by inserting an inner end 651a of the first drive ball 650a within an inner slot 673a of the first drive puck 670a. The first drive puck 670a can be pivotally coupled with the inner end 651a with the first pin 680a. In some embodiments a set screw 690 can secure first pin 680a in place through a hole 659a. The first drive puck 670a can be inserted within the grooves 635a, 635b. An outer surface 672a of the first drive puck 670a can be slidingly engaged with the concave sliding surfaces 636a, 636b. The first drive puck 670a can rotate about within the grooves 635a, 635b and within the first plane 601. The first drive ball 650a can rotate about the first pin 680a within the second plane 602.

The second drive ball 650b can be assembled with an inner slot of the second drive puck 670b and assembled therewith by the second pin 680b. The second drive puck 670b can be assembled within third and fourth grooves 635c, 635d and rotate within the third plane 603. The second drive ball 650b can rotate about the second pin 680b and within the fourth plane 604. Once assembled the first and second drive balls 650a, 650b can be pivoted to the angles, 617, 618, respectively, with respect to the housing 630.

In some embodiments, the central cavity 634 can comprise a tensioning mechanism (not shown). For example, the tensioning mechanism can comprise a plastic or metal insert within the central cavity 634. As an insert, the tensioning mechanism can comprise two grooves on opposite sides of the insert (either parallel or crossways at an angle to each other, depending on the orientation of the first and second drive pucks 670a, 670b) that contact the outer surfaces of the first and second drive pucks 670a, 670b. In some embodiments, the insert can apply pressure to the outer surfaces to bias the first and second drive pucks 670a, 670b against the respective lips 638a-b, 638c-d of the first and second housing sections 630a, 630b. For example, the insert can include one or more springs to apply pressure against the first and second drive pucks 670a, 670b. This can reduce or minimize vibration and play in the joint 600 during rotation and/or movement of the assembly.

In some embodiments, the central cavity 634 can extend all the way through both the first and second housing sections 630a, 630b. This configuration can allow for a lubricant to be inserted within the central cavity 634 from either end of the housing 630 and coat the sliding surfaces of the joint 600. In some embodiments, the lubricant can cool the components of the joint 600. In some embodiments, the central cavity 634 can thus provide advantages of facilitating the lubrication and/or cleaning of the joint 600 without the need to disassemble the components of the joint 600.

In some embodiments, the central cavity 634 can allow for the lubricant to flow through the housing 630 in a continuous or intermittent manner. A through-space, similar to through space 534a can be disposed between the drive balls 650a, 650b and the inner surface 637. This arrangement can facilitate application of the lubricant into and through the central cavity 634. In some embodiments, the flow of the lubricant can be further facilitated by a plurality of perforations extending all the way through either or both of the first and second drive pucks 670a, 670b and/or the first and second drive balls 650a, 650b. The plurality of perforations can extend in any direction or various directions to facilitate the lubricant flow.

Seventh Embodiments of a Universal Joint

The structures of either of the joints 400 or 600 can be used to form a joint, socket wrench attachment 700. The attachment 700 can be used in conjunction with a standard or customized socket wrench handle to enable the removal and/or installation of various fasteners (e.g., bolts and nuts) at an angle. This can provide access to locations and areas that were previously inaccessible to socket wrenches and/or facilitate ready access to these locations in a more straightforward manner. For example, the attachment 700 can facilitate the installation or tightening of a bolt in an automobile engine without requiring disassembly of surrounding components.

Figure 56:
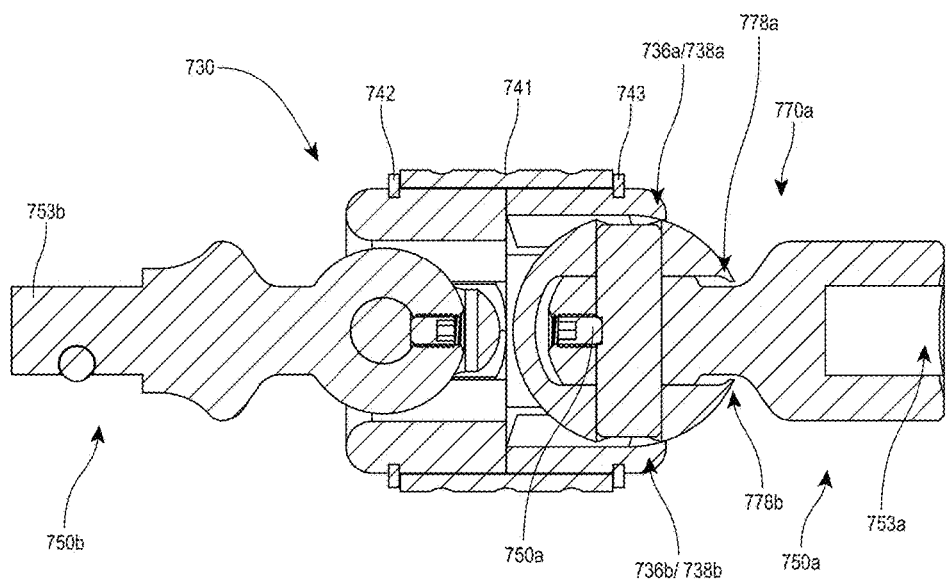
FIG. 56 is a section view along the line P-P in FIG. 55.

As shown in FIGS. 53-56 and described herein, the attachment 700 can include a housing 730, first and second connectors 750a, 750b, first and second drive pucks 770a, 770b, and first and second pins 780a, 780b. The first and second connectors 750a, 750b can be coupled with the first and second drive pucks, 770a, 770b by the first and second pins 780a, 780b, respectively. The first and second drive pucks 770a, 770b can be coupled with first and second housing halves 730a, 730b within grooves 735a, 735b, respectively. The first and second pins 780a, 780b can be retained within apertures of the first and second connectors 750a, 750b by first and second set screws 791a, 791b, respectively. The first connector 750a can rotate about the first drive puck 770a within the grooves 735a and about the pin 780a. The second connector 750b can rotate about the second drive puck 770b within the grooves 735b and about the pin 780b. FIG. 56 shows first and second overhang portions 778a, 778b in the first drive puck 770a. FIG. 56 shows lips 738a, 738b aligned with grooves 735a, 735b, respectively. FIG. 56 shows toroidal surface portions 736a, 736b on the lips 738a, 738b.

The housing 730 can further include a sleeve 741. The sleeve 741 can be disposed over a least a portion of the housing 730. The sleeve 741 can be a thin-walled cylinder or plastic, metal, or any suitable material. The sleeve 741 can be rotatable about approximately the longitudinal axis of the housing 730. In some embodiments, the sleeve 741 is slidingly engaged with an outer cylindrical surface 731 of the housing 730. In some embodiments, the sleeve 741 can include a grip surface.

The sleeve 741 can be maintained in place on the housing 730 by first and second retaining rings 742, 743. The retaining rings 742, 743 can each be disposed within corresponding slots 744a, 744b on the housing 730. The sleeve 741 can be removed from the housing 730 by removing one or more of the retaining rings 742, 743, such as for maintenance or replacement.

The first connecter 750a can include a socket aperture 753a. The socket aperture 753a can be sized to couple with a standard socket driver. For example, the socket aperture 753a can be sized to couple with any standard or custom drives for socket wrenches including square and splined drives in the following sizes: ¼", ⅜", ⅝", ½", ¾", 1", 1½", 2½", and 3½" or standard metric drives. The second connector 750b can comprise a socket driver or drive end 753b. The drive end 753b can include a drive in any standard or custom size, including those listed above. In some embodiments, the drive end 753b can include a friction ball or locking pin to secure the drive end 753b with a socket, extension or other wrench accessory.

The attachment 700 can be operated by a user by coupling the socket aperture 753a with a wrench handle in the conventional manner. A socket in the desired size can be coupled on the drive 753b. The user can maneuver the socket into the desired position (e.g., onto the head of a bolt or nut) by rotating the first and second connectors 750a, 750b and first and second drive pucks 770a, 770b of the attachment 700. In the desired position, the user can hold the sleeve 741 in one hand to provide a degree of stability to the attachment 700. This stability can aid in holding the attachment 700 at desired angle and/or enable the user to maintain the socket on the head of the bolt. The user's other hand can be used to rotate the wrench handle in the desired direction. The attachment 700 can transmit rotation from the wrench handle to the socket and head at the desired angle. The housing 730 of the attachment 700 can rotate with respect to the user's hand within the sleeve 741.

In some embodiments, an insert (not shown) can be placed within the housing 730 and contact outer surfaces of the first and second drive pucks 770a, 770b and/or the inner ends of the first and second connectors 750a, 750b. The insert can be made from a plastic and provide friction against the rotation of the first and second drive pucks 770a, 770b and the first and second connectors 750a, 750b within the housing 730. In this manner, the attachment 700 can be made positionable. This can facilitate the use of the attachment 700 while avoiding unwanted motion from the components thereof.

Additional Embodiments of a Universal Joint

FIGS. 57-58 illustrate another embodiment of a joint 800, similar to the joints described above. Joint 800 can comprise a housing 830, drive puck 870, drive ball 850, pin 880 and a cap ring 890. The housing 830 can comprise a first end 831 and a second end 832. In some embodiments, the housing 830 can comprise first and second housing components 830a and 830b coupled together at interface 830c. The first and second housing components 830a, 830b can be coupled together by welding or other mechanical means (e.g. electron beam welded, mechanical fasteners, or other). In some implementations (not shown), the first housing component 830a can be identical to the second housing component 803b to form a 90-degree joint similar to joint 400.

The housing 830 can comprise an inner cavity 834 and first and second channels 835a, 835b within an inner wall 837 of the inner cavity 834. The first and second channels 835a, 835b can be toroidal surfaces. In some embodiments, the first and second channels 835a, 835b can be a single channels. Alternatively, the housing 830 can include first and second grooves, similar to the first and second grooves 535a, 535b.

The cap ring 890 can comprise first and second contact surfaces 895a, 895b. The first and second contact surfaces 895a, 895b can be toroidal surfaces, similar to the toroidal surface portions 536e, 536f of the first and second grooves 535a, 535b. The cap ring 890 can couple with the first end 831 of the housing 830. In some embodiments, the first end 831 and the cap ring 830 can comprise corresponding posts/recesses 898 to align the cap ring 890 with the first end 831. In some embodiments, the first end 831 is welded (e.g., electron beam, friction stir, or otherwise welded) with the cap ring 890. In some embodiments, the first end 831 and the cap ring 890 include an enlarged outer edge to accommodate the welding without excess heat and/or deformation caused by the welding deforming the housing 830 (e.g., the inner wall 837, first or second channel 835a, 835b) or cap ring 890, which deformation would likely render the joint 800 inoperable.

The joint 800 can be assembled by coupling a first end 851 of the drive ball 850 with the of the drive puck 870 with the pin 880. The drive puck 870 can be inserted within the first and second channels 835a, 835b of the housing 830 and rotatable therein. The cap ring 890 can couple with the first end 831 to secure the drive puck 870 within the housing 830. The cap ring 890 can be mechanically coupled with the first end 831 in any suitable manner. In some embodiments, an outer surface 851a of the first end 851 of the drive ball 850 does not contact the inner wall 837 of the housing 830 and a through-space can be disposed therebetween.

A second end 853 of the drive ball can be rotatable with respect to the housing 830 about the drive puck 870 and the first end 851 of the drive ball 850. A first shaft can be coupled with the second end 832 of the housing 830 and a second shaft can be coupled with the second end 853 of the drive ball 850.

FIGS. 59-60 illustrate another embodiment of a joint 900, similar to the joints described above. Joint 900 can comprise a housing 930, drive puck 970, drive ball 950, pin 980 and a cap ring 990. The housing can comprise a first end 931 and a second end 932. The housing 930 can comprise an inner cavity 934 and first and second channels 935a, 935b within an inner wall 937 of the inner cavity 934. The first and second channels 935a, 935b can be similar to the first and second channels 335a, 335b. The inner wall 937 can also comprise first and second concave spherical surfaces 936a, 936b, similar to the first and second spherical surfaces 336a, 336b. Alternatively, the housing 830 can include first and second grooves instead of the first and second channels 935a, 935b, similar to the first and second grooves 535a, 535b.

The cap ring 990 can comprise third and fourth channels 995a, 995b. The cap ring 990 can couple with the first end 931 of the housing 930. The cap ring can comprise third and fourth concave spherical surfaces 996a, 996b. In some embodiments, the first end 931 and the cap ring 990 can comprise corresponding posts/recesses 998 to align the cap ring 990 with the first end 931.

The first and second channels 935a, 935b can each comprise a central cylindrical portion 935c and outer rounded portions 935e, 935f. Similarly, an outer contact surface 972 of the drive puck 970 can correspondingly comprise a central cylindrical portion 975c and outer rounded portions 975e, 975f. The outer contact surface 972 can slidingly engage within the first and second channels 935a, 935b. The third and fourth channels 995a, 995b of the cap ring 990 can also each comprise a central cylindrical portion 995c and outer rounded portions 995e, 995f. An outer spherical surface 951a of the drive ball 950 can slidingly engage with the first through fourth concave spherical surfaces 936a, 936b, 996a, 996b.

The joint 900 can be assembled by coupling a first end 951 of the drive ball 950 with the of the drive puck 970 with the pin 980. The drive puck 970 can be inserted within the first and second channels 935a, 935b of the housing 930 and rotatable therein. The cap ring 990 can couple with the first end 931 to secure the drive puck 970 within the housing 930. The cap ring 990 can be mechanically coupled with the first end 931 in any suitable manner. In some embodiments, the first end 931 is welded (e.g., electron beam, friction stir, or otherwise welded) with the cap ring 990. In some embodiments, the first end 931 and the cap ring 990 include an enlarged outer edge to accommodate the welding without excess heat and/or deformation caused by the welding deforming the housing 930 (e.g., first and second channels 935a, 935b and/or the first and second concave spherical surfaces 936a, 936b) or cap ring 990.

In some implementations, a thickness the outer edge of the housing 930 at the first end 931 is at least 16 mm. The thickness can be within the range of 10 mm to 25 mm or greater. In some implementations, the first end 931 is welded in a lateral welding pattern where only the sides of the first end 931 and sides cap ring 990 that do not include the channels 935a, 935b, 995a, 995b (e.g., at posts/recesses 998, as illustrated in FIG. 60) are welded. Similarly, the cap rings of the joint assemblies 10, 10a, 300, and 400 can include the enlarged outer edge (and/or the lateral welding pattern) and be welded to form both 45 and 90 degree joints. In some implementations, none of the joint assemblies 10, 10a, 300, and 400, 500, 600, 700, 800 or 900 include mechanical fasteners and are instead assembled using any suitable welding techniques.

A second end 953 of the drive ball can be rotatable with respect to the housing 930 about the drive puck 970 and the first end 951 of the drive ball 950. A first shaft can be coupled with the second end 932 of the housing 930 and a second shaft can be coupled with the second end 953 of the drive ball 950.

Figure 61:
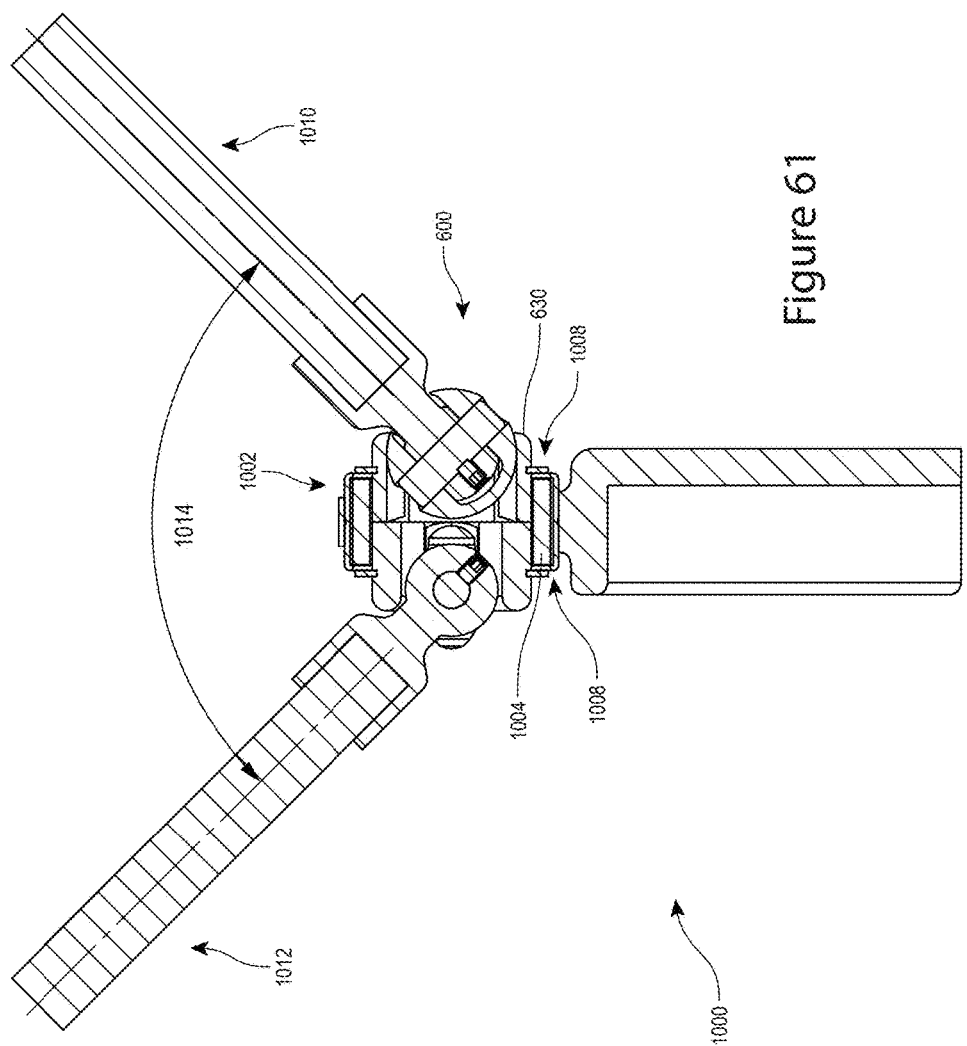
FIG. 61 is a section view of the joint of FIG. 44 within a carrier bearing.

FIG. 61 illustrates the joint 600 coupled within a carrier bearing assembly 1000. The carrier bearing assembly 1000 can include an outer casing 1002 and bearings 1004. The bearings 1004 can be any type of bearing (e.g., ball, needle or other) and contact either directly or indirectly the housing 630. The carrier bearing assembly 1000 can couple with the housing 630 by one or more retainer rings 1006 that couple within a slot on the housing 630. The joint 600 can be rotatable within the outer casing 1002. The outer casing 1002 can be rigidly coupled with any structure. For example, the outer casing can be rigidly coupled with a frame member of an automobile. The carrier bearing assembly 1000 can allow for the joint 600 to couple with first and second shafts 1010, 1012 with rotation form the first shaft 1010 being transmitted to the second shaft 1012 through the joint 600. The first and second shafts 1010, 1012 can be maintained at an angle 1014. The angle 1014 can be up to approximately 90-100°. In some embodiments, the angle 1014 can be maintained or at the joint 600 rotates within the outer casing 1002 about the bearings 1004.

Figure 62:
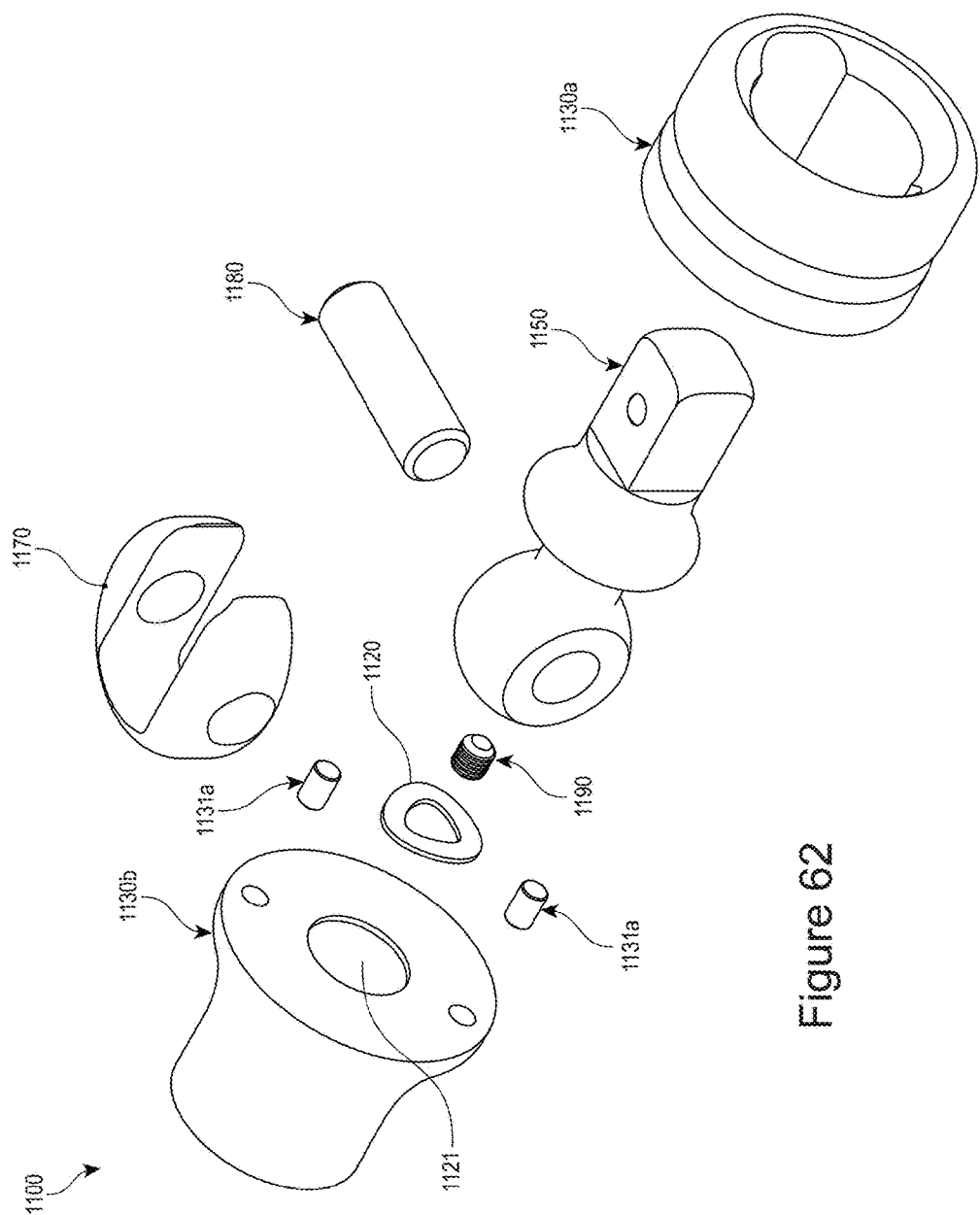
FIG. 62 is an exploded view of another embodiment of a joint.

FIG. 62 illustrates an exploded view of another embodiment of a joint. The joint 1100 is similar in construction to the joint 500 as shown in FIGS. 31-43. Similar components have been given similar element callouts and have been updated to the 1100 series. The joint 1100 can include a housing base 1130*b* and a housing 1130*a*. The housing 1130*a* can include internal grooves similar to the grooves 535 described above. The housing component 1138 can be coupled with the base component 1130*b*. In some implementations, one or more pins 1131*a* and 1131*b* can be used between the base component 1130*b* and the housing 1130*a* to provide alignment to the two pieces before they are coupled together. The base component 1130*b* and the housing 1130*a* can be coupled in a permanent fashion using, for example, electron beam welding or other welding or suitable means. A drive puck 1170 can be received within the grooves within the first housing component 1130*a*. A drive shaft 1150 can be pivotally coupled with the drive puck 1170 by a pin 1180. An outer end of the drive shaft 1150 can be a male socket attachment, as described above in relation to the socket wrench attachment shown in FIGS. 53-56. The base component 1130*b* can have a recess in it that is a female socket attachment. In this manner, the joint 1100 can be used in conjunction with a socket system or socket wrench. A male socket attachment, such as coupled with a wrench or impact drill, can be coupled with the base 1130 at its recess and a socket tool attachment (e.g., socket) can be coupled with the outer end of the drive shaft 1150. The function of the joint 1100 can be similar to that of the joint 500 and other joints described herein.

The joint 1100 can also include an insert 1120. In some implementations, the insert 1120 can be donut-shaped and/or received within a recess portion 1121 within the base component 1130*b*. The insert 1120 is used to fill space between a ball end of the drive shaft 1150 and the base component 1130*b*. In certain implementations, the insert 1120 reduces movement and/or play of the drive shaft 1150 and/or drive puck 1170 within the housing 1130*a*. The insert 1120 can push the assembly of the drive puck 1170 and the drive shaft 1150 towards lips within the housing 1130 as described above (e.g., FIG. 41). Materials for the insert 1120 can include plastics and polymers, carbon fiber cloth, nylon fiber cloth, or other fibers or ceramic abrasive materials. In certain implementations, the insert 1120 can reduce noise of the joint 1100 (i.e., from rotation of the joint). Although shown in a donut shape, the insert 1120 can have any suitable form factor for filling spaced within the housing 1130*a*.

Figure 63:
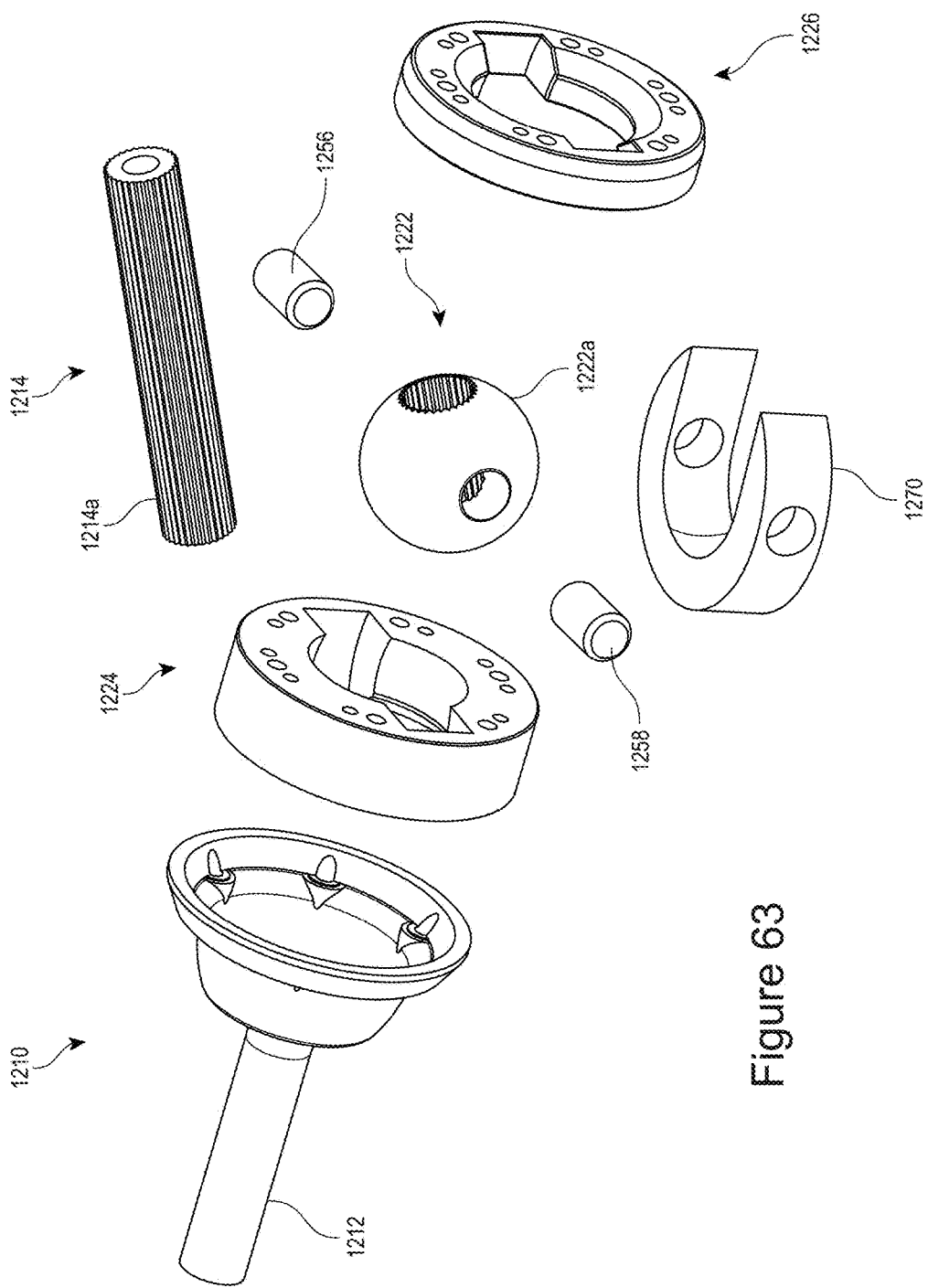
FIG. 63 is an exploded view of another embodiment of a joint.

With reference to FIG. 63, the joint 1210 is constructed similar to the joint 10 and the joint 300 described above. Elemental callouts of the joint 1200 have been updated with similar components having numbers and being updated to the 1200 series numerals. The joint 1200 can include a first housing 1212, a second housing 1224, and cap ring 1226. The first and second housings 1212, 1224 can be coupled together with mechanical fasteners such as that all three of these components can be coupled together. For example, one or more bolts can be inserted around an outer periphery of the components. The second housing 1224 can include a cylindrical channel and one or more spherical hemispheres for receiving a drive puck 1270 and a drive ball 1222. The drive puck 1270 can rotate within the channel of the second housing 1224. The drive ball 1222 can be pivotally coupled with the drive puck 1270 by first and second pins 1256, 1258 that can be inserted through apertures of the drive puck 1270 and coupled with the drive ball 1222. In another implementation, a pin can be received through the drive puck 1270 and the drive ball 1222. An inner end 1214*a* of a shaft 1214 can be received within a recess 122*a* of the drive ball 1222. The function of the joint 1200 can be similar to that of the joints 10 and 300 and other joints described herein.

While any suitable materials can be used to construct the components of the joint 1200 (e.g., steel aluminum or other metals), in one implementation, the joint 1200 uses steel for the construction of the first housing 1212 and the cap ring 1226. In some implementations, the second housing 1224 can be constructed out of a different material than steel. For example, by using an aluminum material for the second housing 1224, the advantageous heat properties of aluminum can be utilized in the joint 1200. Aluminum can have up to four times the thermal conductivity (approximately 205 W/MA) than that of the thermal conductivity of steel (approximately 50.2 W/MA). Thus, during high speed operation of the joint 1200, heat generated by movement of the puck and drive ball within the second housing 1224 can be dissipated very quickly as compared to heat generated in the first housing 1212 or the cap ring 1226 (or compared with a steel second housing 1224). Any combination of materials having either the same or different thermal conductivity can be substituted for the steel and aluminum components used variously in the first housing 1212, second housing 1224, and the cap ring 1226. For example, other materials, such as steel, stainless steel, aluminum, iron, brass, tungsten, tool steel and/or the like can be used for the second housing 1224, first housing 1212 and/or cap ring 1226.

Although specific embodiments have been described above, the above embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A mechanical joint for transferring rotational motion from a first shaft to a second shaft, comprising:
   a housing comprising an outer casing, a central cavity, a first end and a second end;
   a first groove comprising a first straight-cut contact surface, a second groove comprising a second straight-cut contact surface, the first and second grooves disposed on opposite sides of the central cavity;
   a first lip comprising a third contact surface at the first end of the housing, the first lip aligned with the first groove;
   a second lip comprising a fourth contact surface at the first end of the housing, the second lip aligned with the second groove;
   a drive puck comprising a circular outer perimeter, an outer contact surface, and an inner slot;
   a drive shaft comprising a first end and a second end, the first end pivotably coupled with the drive puck by a pin, the second end configured to couple with the first shaft;

wherein the drive puck is disposed within the first and second grooves, the outer contact surface slidingly engaged with the first and second straight-cut contact surfaces of the first and second grooves, respectively, the drive puck maintained within the first and second grooves at the first end of the housing by the third and fourth contact surfaces of the first and second lips; and wherein the drive puck rotates within the first and second grooves in a first plane and the drive shaft rotates about the pin in a second plane, the first plane being orthogonal to the second plane.

2. The mechanical joint for transferring rotational motion of claim 1, wherein:
the housing comprises a first housing component coupled with a second housing component;
the first housing component comprises an outer end and an inner end, the first and second grooves, and the first end of the housing;
the second housing component comprises an outer end and an inner end, the second end of the housing, and an aperture for coupling with the second shaft at the outer end; and
the inner ends of the first and second housing components are welded together to form the housing with the drive puck disposed within the first and second grooves.

3. The mechanical joint for transferring rotational motion of claim 2, further comprising:
a recess on a face of the inner end of the second housing; and
an insert disposed within the recess;
wherein the insert engages with the drive puck to reduce movement of the drive puck within the first and second grooves.

4. The mechanical joint for transferring rotational motion of claim 1, wherein the second end of the drive shaft is a standard socket drive and the second end of the housing comprises a standard socket aperture.

5. The mechanical joint for transferring rotational motion of claim 1, wherein:
the inner slot of the drive puck includes a first flat side on a first wing and a second flat side on a second wing, the first flat side being substantially parallel to the second flat side, the first aperture extending through the first and second flat sides;
the first end of the drive shaft includes a first planar portion and a second planar portion, the first and second planar portions disposed on opposite sides of the first end of the drive shaft, the second aperture extending through the first and second planar portions; and
the first and second planar portions slidingly engaged with the first and second flat sides of the inner slot, respectively.

6. The mechanical joint for transferring rotational motion of claim 5, further comprising:
a first overhang portion at an upper opening of the inner slot, the outer contact surface of the first wing of the drive puck extending onto the first overhang portion;
a second overhang portion at the upper opening of the inner slot, the outer contact surface of the second wing of the drive puck extending onto the second overhang portion; and
a central portion of the drive shaft located between the first and second ends of the drive shaft;
wherein the central portion is passable between the first and second overhang portions at the upper opening of the inner slot.

7. The mechanical joint for transferring rotational motion of claim 1, wherein:
the housing comprises a first housing component coupled with a second housing component, the first housing component comprising an outer end and an inner end, the first and second grooves, and the first end of the housing;
the second housing component comprises a third groove having a fifth contact surface, a fourth groove having a sixth contact surface, the third and fourth grooves disposed on opposite sides of the central cavity;
a third lip comprises a seventh contact surface at the second end of the housing, the third lip aligned with the third groove;
a fourth lip comprises an eighth contact surface at the second end of the housing, the fourth lip aligned with the fourth groove;
a second drive puck comprises a circular outer perimeter, an outer contact surface, and an inner slot;
a second drive shaft comprises a first end and a second end, the first end pivotably couples with the second drive puck by a second pin, the second end configured to couple with the second shaft;
the second drive puck is disposed within the third and fourth grooves and maintained therein by the third and fourth lips; and
the inner end of the first housing component is welded to the inner end of the second housing component.

8. The mechanical joint for transferring rotational motion of claim 7, further comprising:
a rotational sleeve, the rotational sleeve disposed around the housing, the rotational sleeve slidingly engaged with a cylindrical outer casing of the housing such that the rotational sleeve can rotate about a longitudinal axis of the housing;
wherein a user can rotate the housing while grasping the rotational sleeve and the second end of the drive shaft is a socket driver and the second end of the second drive shaft comprises a socket aperture.

9. The mechanical joint for transferring rotational motion of claim 7, further comprising:
a through-path defining a lubricant space extending from the outer end of the first housing component to the outer end of the second housing component through the central cavity;
wherein a lubricant can flow through the central cavity and lubricate the drive pucks and the grooves.

10. The mechanical joint for transferring rotational motion of claim 7, wherein the drive puck rotates in a first plane and the second drive puck rotates in a second plane, the first and second planes being orthogonal.

11. The mechanical joint for transferring rotational motion of claim 1, wherein the outer contact surface of the drive puck is toroidal and the first and second lips each comprise a toroidal contact surface.

12. The mechanical joint for transferring rotational motion of claim 1, wherein the first and second contact surfaces of the first and second grooves, respectively, are cylindrical and convex.

13. A mechanical joint for transferring rotational motion from a first shaft to a second shaft, comprising:
a housing, the housing having a first open end and a second end;
a first drive puck disposed in the first open end, the first drive puck comprising a first wing, a second wing, an inner slot, and a circular outer perimeter having an outer contact surface;

a first drive shaft coupled with the first drive puck, the first drive shaft comprising a first end and a second end, the first end pivotably coupled within the inner slot of the first drive puck by a first pin, the second end configured to couple with the first shaft;

wherein the first and second wings of the first drive puck each comprise an inner planar surface forming the inner slot, and the first end of the first drive shaft comprises first and second opposite planar surfaces slidingly engaged with the inner planar surfaces, respectively;

wherein the first drive shaft rotates in a first plane with respect to the housing about the first pin and rotates in a second plane with respect to the housing on the first puck;

first and second straight-cut grooves disposed in the first open end of the housing on opposite sides of a central cavity; and first and second lips at the first open end, the first and second lips aligned with the first and second straight-cut grooves, respectively;

wherein the drive puck is slidingly engaged within the first and second straight-cut grooves and maintained within the first and second straight-cut grooves at the first open end of the housing by the first and second lips.

14. The mechanical joint of claim 13, further comprising:
a first channel disposed in the first open end; and
a first cap ring comprising a central opening and first and second channel segments, the first cap ring coupled with the first end of the housing with the first drive puck disposed within the first channel and the first and second channel segments, the outer contact surface of the first drive puck slidingly engaged with a bottom surface of the first channel, and the second end of the first drive shaft extending through the central opening of the first cap ring.

15. The mechanical joint of claim 14, further comprising:
a second channel disposed in the second end of the housing;
a second drive puck disposed in the second channel;
a second drive shaft coupled with the second drive puck, the second drive shaft comprising a first end and a second end, the first end pivotably coupled within an inner slot of the second drive puck by a second pin, the second end configured to couple with the second shaft;
a second cap ring comprising a central opening and first and second channel segments, the second cap ring welded with the second end of the housing with the second drive puck disposed within the second channel and the first and second channel segments of the second cap ring, and the second end of the second drive shaft extending through the central opening of the second cap ring;

wherein the second drive shaft rotates with respect to the housing about the second pin and also rotates with respect to the housing on the second puck.

16. The mechanical joint of claim 14, wherein a hardness of the bottom surface of the channel is at least 2 HRC above a hardness of the outer contact surface of the drive puck.

17. The mechanical joint of claim 14, wherein the housing is cryogenically hardened below −184° C. for at least 12 hours.

18. The mechanical joint of claim 14, wherein a physical vapor deposition coating is applied to the outer contact surface of the drive puck.

19. The mechanical joint of claim 14, wherein the first cap ring is electron beam welded with the first end of the housing.

20. The mechanical joint of claim 14, wherein the housing comprises a first housing component made of steel and a second housing component made of aluminum, the cap ring and the first housing component are mechanically coupled with the second housing component, the second housing component comprising the channel.

21. The mechanical joint of claim 13, further comprising
third and fourth straight-cut grooves disposed in the second end of the housing on opposite sides of the central cavity; and
third and fourth lips at the second end of the housing, the third and fourth lips aligned with the third and fourth grooves, respectively;
wherein the second drive puck is slidingly engaged within the third and fourth straight-cut grooves and maintained within the third and fourth straight-cut grooves at the second end of the housing by the third and fourth lips.

* * * * *